US009786213B2

(12) United States Patent
Nakanishi et al.

(10) Patent No.: US 9,786,213 B2
(45) Date of Patent: Oct. 10, 2017

(54) DISPLAY DEVICE WITH BASIC CONTROL MODE AND LOW FREQUENCY CONTROL MODE

(71) Applicant: PANASONIC LIQUID CRYSTAL DISPLAY CO., LTD., Hyogo (JP)

(72) Inventors: Hideyuki Nakanishi, Hyogo (JP); Junichi Maruyama, Hyogo (JP); Toshikazu Koudo, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 15/130,614

(22) Filed: Apr. 15, 2016

(65) Prior Publication Data

US 2016/0232831 A1     Aug. 11, 2016

Related U.S. Application Data

(63) Continuation of application No. PCT/JP2014/000932, filed on Feb. 21, 2014.

(30) Foreign Application Priority Data

Oct. 16, 2013   (JP) ................................. 2013-215339

(51) Int. Cl.
*G09G 3/36*     (2006.01)
*G09G 3/20*     (2006.01)
(Continued)

(52) U.S. Cl.
CPC ......... *G09G 3/2007* (2013.01); *G02F 1/1368* (2013.01); *G09G 3/2092* (2013.01);
(Continued)

(58) Field of Classification Search
USPC .......................................................... 345/99
See application file for complete search history.

(56) References Cited

U.S. PATENT DOCUMENTS 8,013,822 B2 *   9/2011   Nose .................... G09G 3/3629
                                                  345/87
2003/0052852 A1   3/2003   Oohira
(Continued)

FOREIGN PATENT DOCUMENTS

| JP | H05-188885 A  | 7/1993  |
| JP | 2003-091266 A | 3/2003  |
| JP | 2003-280578 A | 10/2003 |
| JP | 2006-064964 A | 3/2006  |

OTHER PUBLICATIONS

International Search Report issued in corresponding International Patent Application No. PCT/JP2014/000932, mailed on May 27, 2014, with English translation.

*Primary Examiner* — Roy Rabindranath
(74) *Attorney, Agent, or Firm* — McDermott Will & Emery LLP

(57) ABSTRACT

A display device including a display portion, a source driver, a gate driver and a controller, wherein the controller is configured to control the source driver and the gate driver based on a control mode for displaying the frame image on the display portion, in a basic control mode, the controller is configured to display a frame image on the display portion by causing the gate driver to progressively scan gate signal lines, in a low frequency control mode, the controller is configured to determine whether a regional signal is on in a specific region corresponding to specific gate signal lines, when it is determined that the regional signal is off, the controller is configured to display a sub-frame image on the display portion by causing the gate driver to perform interlaced scanning of the gate signal lines every K lines in the first frame frequency F1.

10 Claims, 30 Drawing Sheets

(51) Int. Cl.
*G02F 1/1368* (2006.01)
*G09G 5/00* (2006.01)
*G09G 5/395* (2006.01)

(52) U.S. Cl.
CPC ......... *G09G 3/3614* (2013.01); *G09G 3/3648* (2013.01); *G09G 3/3677* (2013.01); *G09G 3/3688* (2013.01); *G09G 5/001* (2013.01); *G09G 5/395* (2013.01); *G09G 2300/0426* (2013.01); *G09G 2310/027* (2013.01); *G09G 2310/0224* (2013.01); *G09G 2310/0227* (2013.01); *G09G 2310/08* (2013.01); *G09G 2320/103* (2013.01); *G09G 2330/021* (2013.01); *G09G 2340/0435* (2013.01); *G09G 2360/18* (2013.01)

(56) References Cited

U.S. PATENT DOCUMENTS

| | | | | |
|---|---|---|---|---|
| 2006/0044251 | A1* | 3/2006 | Kato | G09G 3/3611 345/98 |
| 2007/0070010 | A1* | 3/2007 | Oohira | G09G 3/3648 345/89 |
| 2010/0066728 | A1* | 3/2010 | Oohira | G09G 3/3648 345/214 |
| 2014/0168281 | A1* | 6/2014 | Ahn | G09G 3/3648 345/690 |
| 2014/0362073 | A1* | 12/2014 | Huang | G09G 3/3674 345/213 |
| 2015/0062100 | A1* | 3/2015 | Tanaka | G09G 3/3648 345/204 |
| 2015/0187308 | A1* | 7/2015 | Shin | G09G 3/3614 345/209 |

\* cited by examiner

| | COMBINATION OF DATA ENABLE SIGNALS (20Hz) | | | | SG23 |
|---|---|---|---|---|---|
| | SG7 | SG7D1 | SG7D2 | SG70 | |
| 1 | High | Low | Low | High | SG21 |
| 2 | don't care | High | Low | High | SG21D1 |
| 3 | don't care | don't care | High | High | SG21D2 |
| 4 | OTHER THAN ABOVE | | | | SG210 |

High: ENABLED, Low: DISABLED, don't care: NO REQUIREMENT

| CONTROL MODE | MD1 (60Hz) | | | MD2 (20Hz) | | | | | | | | MD1 (60Hz) | | |
|---|---|---|---|---|---|---|---|---|---|---|---|---|---|---|
| FRAME | FR1 | FR2 | FR3 | SF4 | SF5 | SF6 | SF7 | SF8 | SF9 | SF10 | SF11 | SF12 | FR13 | FR14 |
| IMAGE | IM1 | IM2 | IM3 | IM3 | IM3 | IM3+A1 | IM3+A1 | IM3+A1+A2 | IM3+A1+A2 | IM3+A1+A2 | IM3+A1+A2 | IM12 | IM13 | IM14 |
| G1 | + | − | + | − | | | + | | | − | | − | + | − |
| G2 | + | − | + | | + | | | − | | | + | − | + | − |
| G3 | + | − | + | | | − | | | + | | | − | + | − |
| G4 | + | − | + | − | | | + | | | − | | − | + | − |
| G5 | + | − | + | | + | | | − | | | + | − | + | − |
| G6 | + | − | + | | | − | | | + | | | − | + | − |
| G7 | + | − | + | − | | − | + | | | − | | − | + | − |
| G8 | + | − | + | | + | − | | | − | | + | − | + | − |
| G9 | + | − | + | | | − | | | + | | | − | + | − |
| G10 | + | − | + | − | | − | + | | | − | | − | + | − |
| G11 | + | − | + | | + | − | | | − | | + | − | + | − |
| G12 | + | − | + | | | − | | − | + | | | − | + | − |
| G13 | + | − | + | − | | − | + | − | | − | | − | + | − |
| G14 | + | − | + | | + | | | − | | | + | − | + | − |
| G15 | + | − | + | | | − | | − | + | | | − | + | − |
| G16 | + | − | + | − | | | + | − | | − | | − | + | − |
| G17 | + | − | + | | + | | | − | | | + | − | + | − |
| G18 | + | − | + | | | − | | − | + | | | − | + | − |
| G19 | + | − | + | − | | | + | − | | − | | − | + | − |
| G20 | + | − | + | | + | | | − | | | + | − | + | − |

DISPLAY DEVICE WITH BASIC CONTROL MODE AND LOW FREQUENCY CONTROL MODE

CROSS-REFERENCE TO RELATED APPLICATION

This application is bypass continuation of international patent application PCT/JP14/000932, filed: Feb. 21, 2014 designating the United States of America, the entire disclosure of which is incorporated herein by reference. Priority is claimed based on Japanese patent applications JP 2013-215339, filed: Oct. 16, 2013. The entire disclosures of this Japanese patent application are incorporated herein by reference in its entirety.

TECHNICAL FIELD

This disclosure is related with a display device including a display portion configured to display a frame image.

BACKGROUND

A liquid crystal display device is one example of display devices that are used as high-definition color monitors for computers and other information devices, and as television receivers. A liquid crystal display device fundamentally includes a display portion in which liquid crystals are sandwiched between two substrates at least one of which is made of transparent glass or the like. In addition, a liquid crystal display device includes a driver for selectively applying voltages to pixel electrodes formed on the substrate of the display portion. Pixels of the respective pixel electrodes are controlled based on the voltage applied by the driver.

The display portion generally includes gate signal lines, source signal lines, and pixel electrodes. The gate signal lines, for example, respectively extend in a horizontal direction (main scanning direction), and are aligned in a vertical direction (sub scanning direction). The source signal lines, for example, respectively extend in the vertical direction (sub scanning direction), and are aligned in the horizontal direction (main scanning direction). Thin film transistors (TFTs) and the pixel electrodes are disposed in a matrix at intersection points of the gate signal lines and the source signal lines. A gate driver outputs voltages (gate signals) to the gate signal lines for turning the TFTs on and off. A source driver outputs voltages (source signals) based on an input image signal to the pixel electrodes via the source signal lines to thereby control transmittance of liquid crystals provided corresponding to the pixel electrodes to values according to the source signals.

A display device smoothly displays images on a display portion by successively switching frame images to be displayed on the display portion, for example, based on image signals input from outside. A framefrequency, a frequency of switching a frame image is generally 60 Hz. A display device is conventionally known to detect whether an input image signal is a signal representing still picture or moving picture, and switch the framefrequency depending on a result of detection, for example, described in a prior art (See Japanese Unexamined Patent Application Publication No. JP 2003-280578). This prior art discloses a display device which detects whether an image signal is a still picture or a moving picture, and switches to lower the framefrequency when it detects a still picture. It can decrease power consumption when the display device displays an image.

The display device according to the prior art, however, does not lower the frame frequency, in a case that even if an input image signal represents a still picture in a part of an image, it represents a moving picture in the other part of an image. Therefore, there is a problem in that it does not reduce power consumption enough.

SUMMARY

The present disclosure has been made in view of above, and an object of this application is to provide a display device which can reduce power consumption.

In one general aspect, the instant application describes a display device including a display portion including source signal lines, gate signal lines, and pixel electrodes, each pixel electrode being connected to one of the source signal lines and one of the gate signal lines. The display portion is configured to display a frame image in a frame frequency for every vertical synchronizing signal. The frame image is represented by image signals corresponding to the pixel electrodes. The display device includes source driver being configured to apply voltages to the pixel electrodes corresponding to the image signals via the source signal lines, a gate driver configured to scan the gate signal lines by outputting a gate signal to each of the gate signal lines, and a controller configured to control the source driver and the gate driver based on a control mode for displaying the frame image on the display portion. The control mode includes a basic control mode and a low frequency control mode. In the basic control mode, the frame frequency is determined to be a first frame frequency F1, and in the low frequency control mode, the frame frequency is determined to be a second frame frequency F2 (F2<F1). The controller is configured to control the gate driver such that a horizontal scanning period (H) is constant regardless of the control mode being the basic control mode or the low frequency control mode. In the basic control mode, the controller is configured to display the frame image on the display portion by causing the gate driver to progressively scan the gate signal lines. In the low frequency control mode, the controller is configured to determine whether a regional signal is on in a specific region corresponding to specific gate signal lines in a frame image. When it is determined that the regional signal is off, the controller is configured to display a sub-frame image on the display portion by causing the gate driver to perform interlaced scanning of the gate signal lines every K lines in the first frame frequency F1. The K is an integer expressed by F1/F2, and the controller is configured to display the frame image constituted by K sub-frame images on the display portion by repeating display of the sub-frame image for K times. When it is determined that the regional signal is on, the controller is configured to cause the gate driver to progressively scan the specific gate signal lines every time the sub-frame image is displayed.

According to one aspect of this disclosure, even in the low frequency control mode, the controller is configured to cause the gate driver to progressively scan in the specific region of the frame image every time the sub-frame image is displayed. Thereby, quality of image display in the specific region of the frame image is the same as that in the basic control mode. And, in the low frequency mode, in a region other than the specific region, where the regional signal is off, the gate signal lines are performed interlaced scanning of every K lines in the first frame frequency F1. Therefore, it can achieve a lot of reduction of power consumption.

BRIEF DESCRIPTION OF DRAWINGS

FIG. 6 is a diagram schematically showing polarities of voltages applied to one of the source signal lines in performing an operation shown in FIG. 5 of the control mode shifting from the basic control mode to the low frequency control mode and returning to the basic control mode from the low frequency control mode;

FIG. 10 is a truth table of a selector in a data delay portion shown in FIG. 9;

FIG. 19 is a configuration schematically showing on and off of an input voltage input to one source signal line when an image shown in FIG. 18 is displayed;

FIG. 27 is a diagram schematically showing polarities of voltages applied to one of the source signal lines in performing the operation shown in FIG. 25;

DETAILED DESCRIPTION

Figure 1:
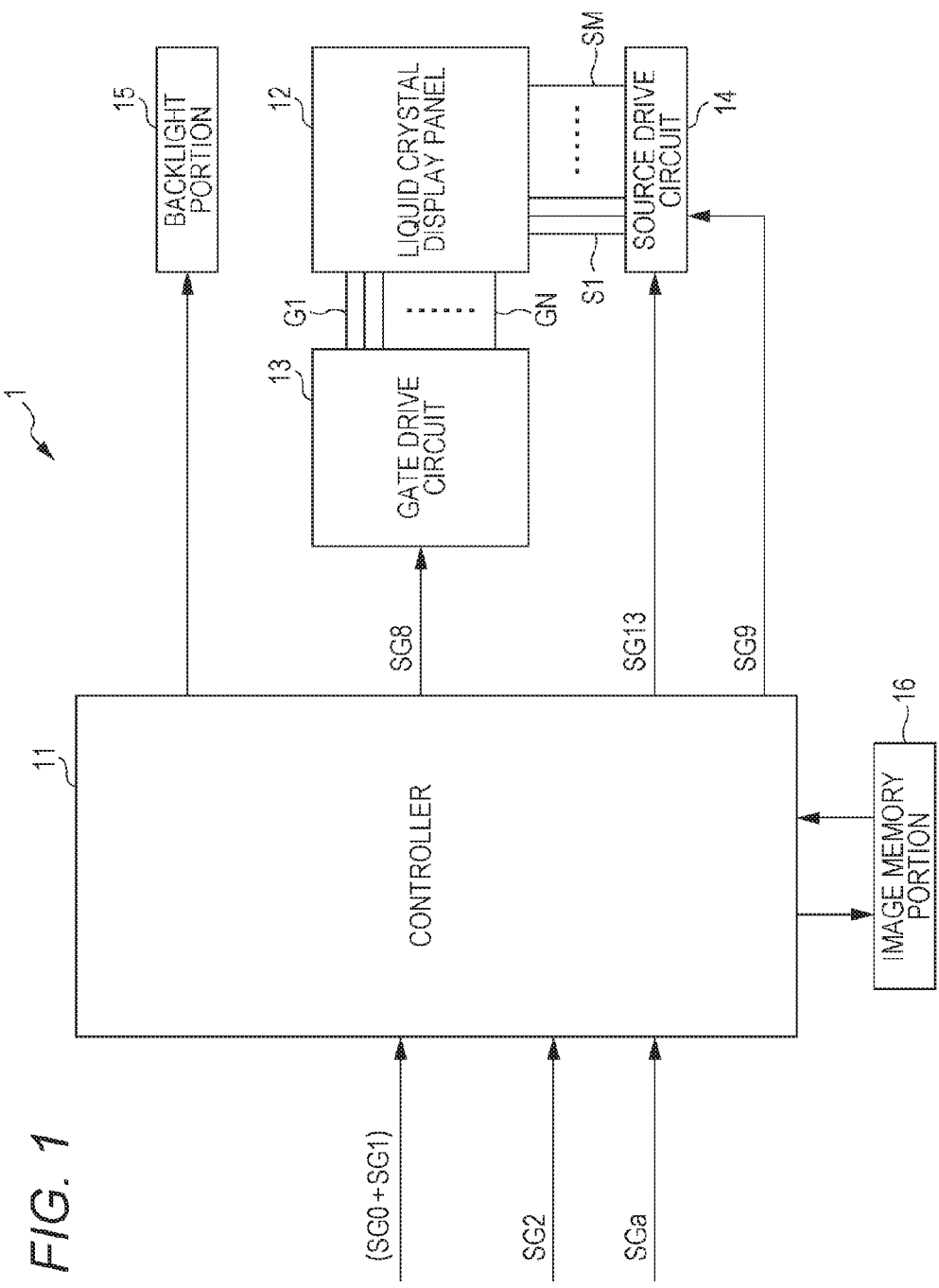
FIG. 1 is a block diagram showing a configuration of a display device according to a first embodiment.

Exemplary display devices are described below with reference to the drawings. In the following numerals. Redundant explanation is omitted as appropriate to clarify the description. Configurations, arrangements and shapes shown in the drawings and description relating to the drawings aim to make principles of the embodiments easily understood. Therefore, the principles of the present embodiments are not limited thereto.

First Embodiment

Figure 2:
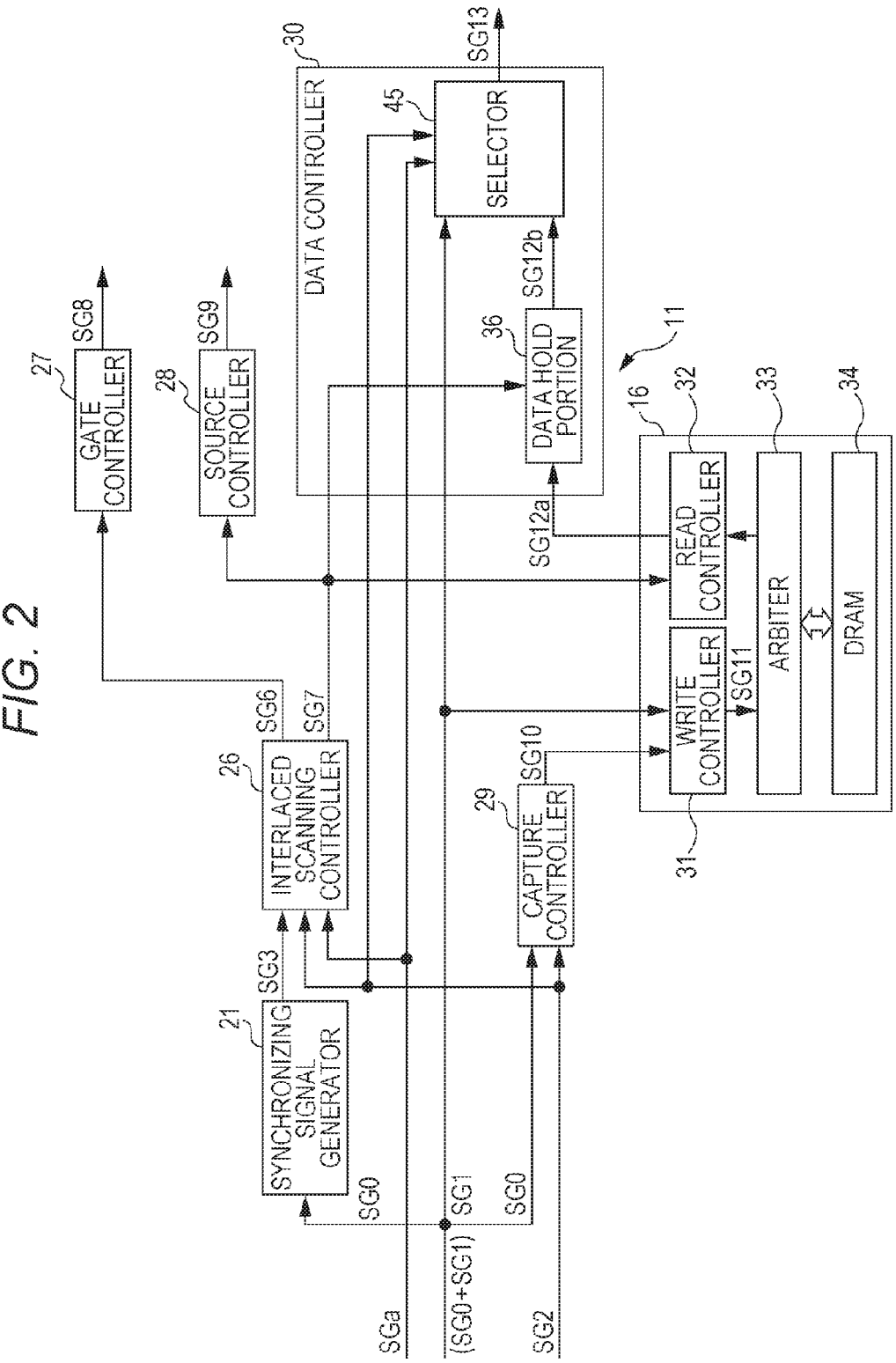
FIG. 2 is a block diagram showing a configuration of a controller and an image memory portion shown in FIG. 1.
Figure 3:
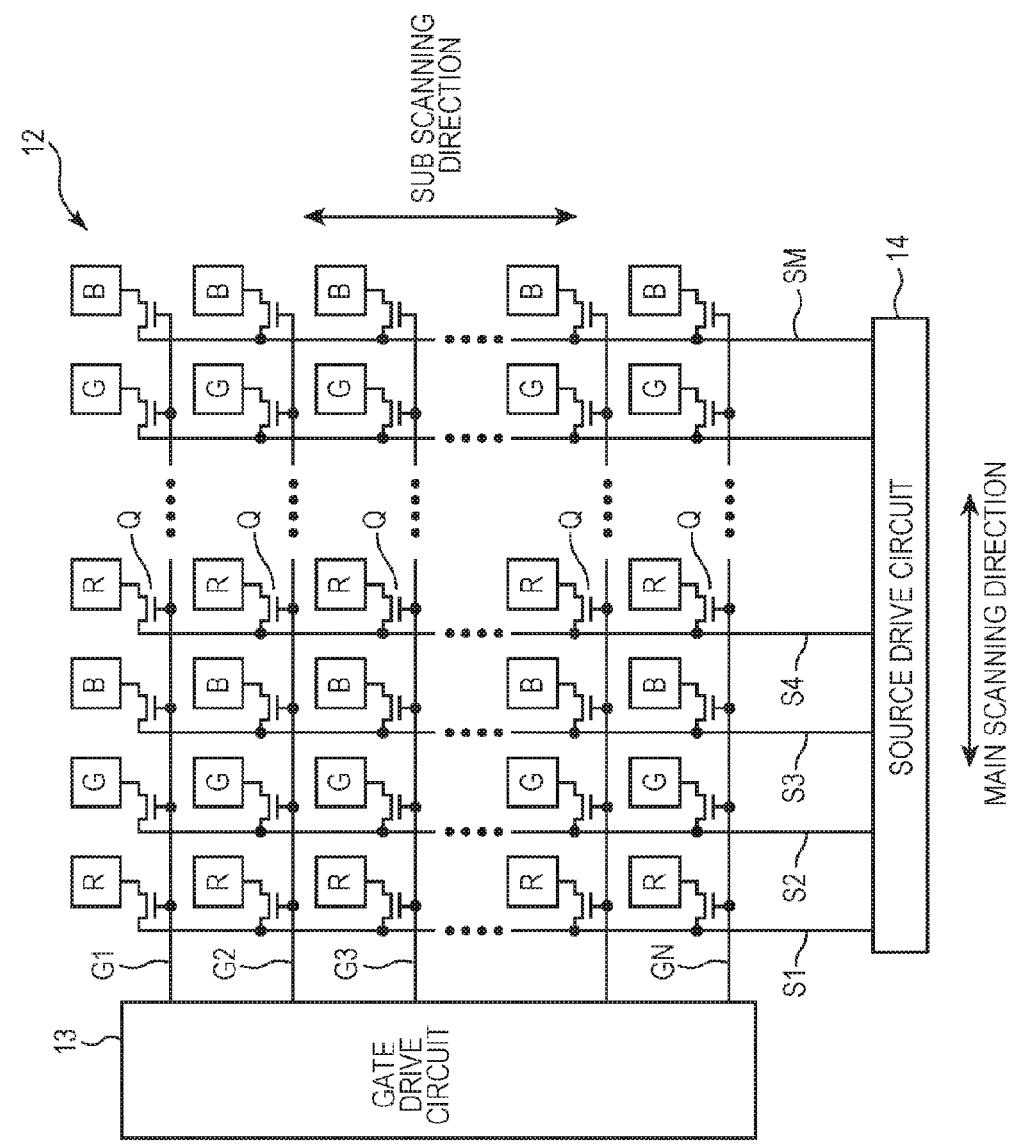
FIG. 3 is a circuit diagram showing a state of connection of signal lines in a liquid crystal display panel shown in FIG. 1.
Figure 4:
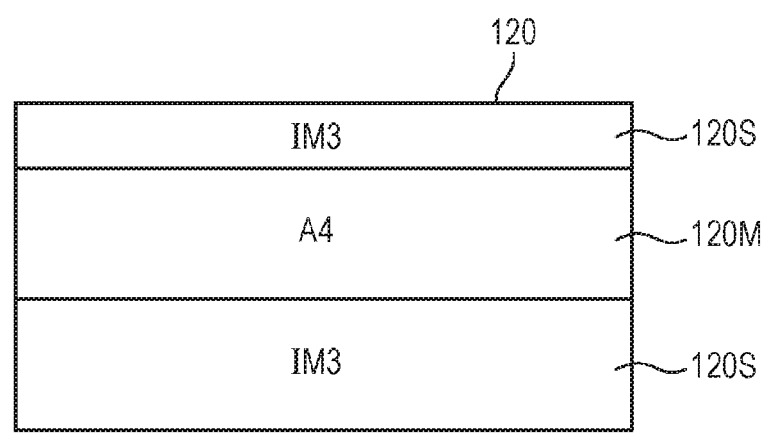
FIG. 4 is a configuration schematically showing a mixing image of a moving picture region and a still picture region displayed in a display portion of the liquid crystal display panel shown in FIG. 1.

FIG. 1 is a block diagram showing a configuration of a display device according to the first embodiment. FIG. 2 is a block diagram showing a configuration of a controller and an image memory portion shown in FIG. 1. FIG. 3 is a circuit diagram showing a state of connection of signal lines in a liquid crystal display panel shown in FIG. 1. FIG. 4 is a configuration schematically showing a mixing image of a moving picture region and a still picture region displayed in a display portion of the liquid crystal display panel shown in FIG. 1.

Referring to FIG. 1, a display device 1 includes a controller 11, a liquid crystal display panel 12, a gate drive circuit 13, a source drive circuit 14, a backlight portion 15, and an image memory portion 16. The controller 11 includes, as shown in FIG. 2, a synchronizing signal generator 21, an interlaced scanning controller 26, a gate controller 27, a source controller 28, a capture controller 29, and a data controller 30. The data controller 30 includes a selector 45 and a data hold portion 36. The image memory portion 16 includes a write controller 31, a read controller 32, an arbiter 33, and a dynamic random access memory (DRAM) 34.

The liquid crystal display panel 12 includes, as shown in FIG. 3, source signal lines S1, S2, . . . , SM, gate signal lines G1, G2, . . . , GN, thin film transistors Q, pixel electrodes R, G, and B (i. e., the pixel electrode R corresponding to a red sub-pixel, the pixel electrode G corresponding to a green sub-pixel, and the pixel electrode B corresponding to a blue sub-pixel). The source signal lines S1, S2, ..., SM extend along a vertical direction (sub scanning direction), and are aligned in a horizontal direction (main scanning direction). The gate signal lines G1, G2, ..., GN extend along the horizontal direction (main scanning direction), and are aligned in the vertical direction (sub scanning direction). The thin film transistors Q and the pixel electrodes R, G, and B are disposed in a matrix at intersections between the source signal lines S1, S2, ..., SM and the gate signal lines G1, G2, ..., GN.

The backlight portion 15 includes a light source, and is configured to illuminate the liquid crystal display panel 12 from the back side of the liquid crystal display panel 12. The backlight portion 15 may employ a lighting method of either of an edge lighting type and a direct lighting type.

To the controller 11, an input signal including a synchronizing signal SG0 and an image signal SG1, a standby mode signal SG2 and a regional signal SGa are input from outside. The synchronizing signal SG0 includes a vertical synchronizing signal Vsync and a horizontal synchronizing signal Hsync. The image signal SG1 represents a frame image. The image signal SG1 includes image signals respectively corresponding to the pixel electrodes R, G, and B of the liquid crystal display panel 12. The standby mode signal SG2 is turned on when the frame image represented by the image signal SG1 that has been input is switched from a moving picture to a still picture. When the standby mode signal SG2 is turned on, then, an input of the image signal SG1 representing the still picture is stopped. This helps reduction of power consumption. Further, the standby mode signal SG2 is turned off when the frame image represented by the image signal SG1 that has been input is switched from a still picture to a moving picture.

The regional signal SGa is turned on, while the image signal SG1 representing a moving picture is input. And the regional signal SGa is turned on corresponding to a region representing a moving picture in an image signal SG1, when the image signal SG1 which represents a moving picture mixed with a still picture is input while the standby mode signal SG2 is turned on.

FIG. 4 shows a mixing image of a moving picture region 120M displaying a moving picture A4 and a still picture region 120S displaying a still picture IM3 in a display portion 120 of the liquid crystal display panel 12. In the FIG. 4, the regional signal SGa is turned on corresponding to a region in which a moving picture A4 is displayed in a moving picture region 120M within the display portion 120 of the liquid crystal display panel 12. In this manner, when the standby mode signal SG2 is turned on, and then a still picture and a moving picture are mixed, the image signal SG1 which represents only the moving picture is input, and the image signal SG1 which represents the still picture is not input. This helps reduction of power consumption.

The controller 11 controls the source drive circuit 14 to apply a voltage, in a column inversion drive mode, to the pixel electrodes R, G, and B, which are disposed in a matrix, of the liquid crystal display panel 12. The column inversion drive mode is a drive mode in which voltages of the same polarity are applied to pixel electrodes connected to the same source signal line in each frame, polarities of voltages applied to pixel electrodes connected to adjacent ones of source signal lines are inverted, and polarities of the voltages applied to pixel electrodes are inverted for each frame.

The controller 11 controls the gate drive circuit 13 and the source drive circuit 14 according to a control mode. The controller 11 includes a basic control mode and a low frequency control mode as the control mode. The controller 11 normally takes the basic control mode as the control mode. The controller 11 causes the control mode to shift from the basic control mode to the low frequency control mode when the standby mode signal SG2 is turned on. When the standby mode signal SG2 is turned off, the controller 11 causes the control mode to return to the basic control mode from the low frequency control mode.

In the basic control mode, as a result of completion of application of the voltage to the gate signal lines G1, G2, ..., GN from the top to the bottom (that is, the gate signal lines G1, G2, ..., GN are progressively scanned) by the gate drive circuit 13 and the source drive circuit 14, image data corresponding to the image signal SG1 is written once into pixels (liquid crystals) of all of pixel electrodes R, G, and B. Writing of the image data to all of the pixels generates an image for one frame. The liquid crystal display panel 12 is a holding-type display portion that holds the written image data for one frame period until the image data is next written. The liquid crystal display panel 12 may employ an IPS (In Plane Switching) method, a VA (Vertical Alignment) method, or any other methods.

In the basic control mode, the controller 11 repeats image generation for one frame at a frame frequency F1. In the first embodiment, F1=60 Hz. This allows a moving picture displayed on the liquid crystal display panel 12 to be visually recognized by a viewer. When the standby mode signal SG2 is turned on, the controller 11 stores an image signal representing a frame image at this time in the DRAM 34 of the image memory portion 16, and causes the control mode to shift from the basic control mode to the low frequency control mode.

In the low frequency control mode, the controller 11 repeats image generation for one frame at a frame frequency F2 using the image signal stored in the DRAM 34. In the first embodiment, F2=20 Hz. In the low frequency control mode, the controller 11 displays an image for one frame on the liquid crystal display panel 12 by performing interlaced scanning of the gate signal lines by every three gate signal lines (that is, thinning the gate signal lines to be scanned), generating a sub-frame image at the same frequency as the frame frequency F1, and repeating an operation of displaying the generated sub-frame image on the liquid crystal display panel 12 three times. This allows a still picture displayed on the liquid crystal display panel 12 to be visually recognized by the viewer.

The controller 11 does not perform interlaced scanning of gate signal lines, but progressively scans the gate signal lines in a region in which a moving picture is displayed, that is a region where the regional signal SGa is turned on, in a case when a part of a still picture is switched to a moving picture in the low frequency control mode. It can prevent image qualities of a moving picture from deteriorating.

The controller 11 controls light-on and light-off of the backlight portion 15. The controller 11 repeats light-on and light-off of the backlight portion 15 at the same frequency as the frame frequency F1 regardless of the frame frequency.

In FIG. 2, when the synchronizing signal SG0 and the image signal SG1 are input, the synchronizing signal generator 21 generates the input synchronizing signal SG0 as a synchronizing signal SG3 for display an image. When the synchronizing signal SG0 and the image signal SG1 are not input, the synchronizing signal generator 21 generates the synchronizing signal SG3 for displaying an image. The synchronizing signal generator 21 outputs the generated synchronizing signal SG3 to the interlaced scanning controller 26. The synchronizing signal SG3 includes the vertical synchronizing signal Vsync and the horizontal synchronizing signal Hsync, as the synchronizing signal SG0 does.

While the standby mode signal SG2 is turned off, that is, during the basic control mode, the interlaced scanning controller 26 generates an output enable signal SG6 and a data enable signal SG7 to scan the gate signal lines G1~GN in order at the frame frequency F1 of 60 Hz in synchronization with the synchronizing signal SG3. Further, during the low frequency control mode in which the standby mode signal SG25 is turned on, the interlaced scanning controller 26 generates the output enable signal SG6 and a data enable signal SG7 to perform interlaced scanning of the gate signal lines G1~GN at the frame frequency F2 of 20 Hz.

The interlaced scanning controller 26 generates the output enable signal SG6 and the data enable signal SG7 to perform interlaced scanning of gate signal lines G1~GN in a region corresponding to a still picture, that is a region where the standby mode signal SG2 is turned on and the regional signal SGa is turned off. And the interlaced scanning controller 26 generates the output enable signal SG6 and the data enable signal SG7 to progressively scan the gate signal lines G1~GN in a region corresponding to a moving picture, that is a region where the standby mode signal SG2 is turned on and the regional signal SGa is turned on.

The interlaced scanning controller 26 outputs the generated output enable signal SG6 to the gate controller 27. The interlaced scanning controller 26 outputs the generated data enable signal SG7 to the source controller 28, the read controller 32 and data hold portion 36.

The capture controller 29 generates a range signal SG10 when the standby mode signal SG2 is turned on. The range signal SG10 represents a range of data stored in the DRAM 34 of the image memory portion 16 out of the image signal SG1. The capture controller 29 outputs the generated range signal SG10 to the write controller 31 of the image memory portion 16.

The write controller 31 generates a write address, and makes a write request to the arbiter 33 for the range of the range signal SG10 out of the image signal SG1. The write controller 31 outputs an image signal SG11 of the write request to the arbiter 33. The read controller 32 generates a read address, and makes a read request to the arbiter 33. The arbiter 33 coordinates and arbitrates the write request and the read request, and writes data to the DRAM 34 and reads data written in the DRAM 34.

The read controller 32 outputs an image signal SG12 that has been read by the arbiter 33 to the data hold portion 36. Further, when the data enable signal SG7 is turned off, the read controller 32 holds a read address of DRAM34. As a result, the image signal SG12a output from the read controller 32 includes only the thinned data, when the data enable signal SG7 is turned on.

The data hold portion 36 possesses a memory of a capacity in which single line data out of the gate signal lines (that is, an image signal of source signal lines S1~SM) can be stored. The data hold portion 36 stores image signal SG12a output from the read controller 32 in the memory. The data hold portion 36 outputs the image signal SG12a written in the memory to the selector 45 as image signals 12b every one horizontal scanning period (1H).

When the data enable signal SG7 is turned off, the data hold portion 36 holds a read address. As a result, the image signal SG12b at a time when data enable signal SG7 is turned off is the same as data when the data enable signal SG7 is turned on immediately before.

When the standby mode signal SG2 is turned off, selector 45 outputs an input of the image signal SG1 to the source drive circuit 14 as the image signal SG13. And when the standby mode signal SG2 is turned on and the regional signal SGa is turned on, the selector 45 outputs an input image signal SG1 to the source drive circuit 14 as the image signal SG13. And when the standby mode signal SG2 is turned on and the regional signal SGa is turned off, the selector 45 outputs an image signal SG12b output from the data hold portion 36 to the source drive circuit 14 as the image signal SG13.

The gate controller 27 generates a gate drive signal SG8. The gate controller 27 outputs the generated gate drive signal SG8 to the gate drive circuit 13. The gate drive signal SG8 includes a gate start signal, a gate shift clock signal, and an output enable signal.

The gate controller 27 outputs a gate start signal after predetermined delay time from rising of the vertical synchronizing signal Vsync. The gate drive circuit 13 starts outputting a gate signal to the gate signal line G1 in synchronization with the gate start signal. The gate controller 27 outputs a gate shift clock signal with the same period as the horizontal synchronizing signal Hsync. The gate drive circuit 13 switches the gate signal line to which the gate signal is output every time the gate shift clock signal is input.

Figure 7:
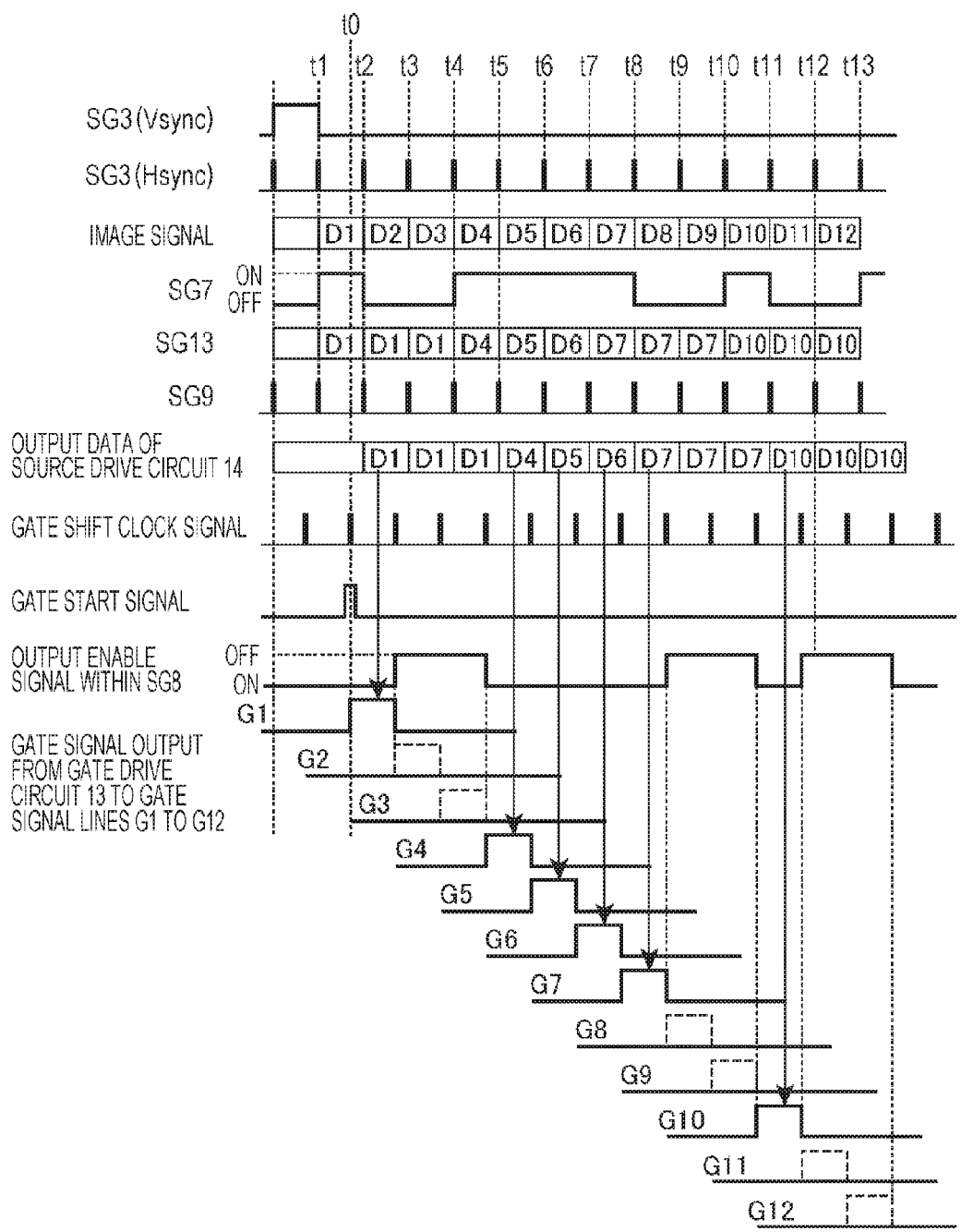
FIG. 7 is a timing chart schematically showing operations of a gate drive circuit and a source drive circuit in a sub-frame in FIG. 5 in which the control mode is the low frequency control mode.

The gate controller 27 outputs a signal obtained by delaying the output enable signal SG6 input from the interlaced scanning controller 26 by a predetermined time as an output enable signal. In the first embodiment, according to aftermentioned FIG. 7 shown, the output enable signal in the gate drive signal SG8 enables output of the gate signal from the gate drive circuit 13 at a low level, and masks output of the gate signal from the gate drive circuit 13 at a high level.

In the basic control mode, the gate drive circuit 13 applies a scan voltage (gate signal) progressively to the gate signal lines G1, G2, . . . , GN in the sub scanning direction based on the gate drive signal SG8, and sequentially turns thin film transistors Q of the corresponding gate signal lines G1, G2, . . . , GN on.

In the low frequency control mode, the gate drive circuit 13 repeats interlaced scanning of applying a scan voltage (gate signal) to the gate signal lines G1, G2, . . . , GN every three gate signal lines based on the gate drive signal SG8 in this embodiment, and sequentially turns the thin film transistors Q of the corresponding gate signal lines G1, G2, . . . , GN on.

In the low frequency control mode, when the regional signal SGa is input, the gate drive circuit 13 turns the thin film transistors Q of the corresponding gate signal lines G1, G2, . . . , GN on based on the gate drive signal SG8. Here, the gate drive circuit 13 repeats interlaced scanning of applying a scan voltage (gate signal) to the gate signal lines G1, G2, . . . , GN every three gate signal lines in a region corresponding to a still picture. The gate drive circuit 13 applies a scan voltage (gate signal) progressively to the gate signal lines G1, G2, . . . , GN in a region corresponding to moving picture.

The source controller 28 generates a latch timing signal SG9 based on the data enable signal SG7 from the interlaced scanning controller 26. The source controller 28 outputs the generated latch timing signal SG9 to the source drive circuit 14.

The latch timing signal SG9 is for controlling operational timing of the source drive circuit 14. The latch timing signal SG9 is output in synchronization with the horizontal synchronizing signal Hsync. The latch timing signal SG9 indicates a leading head of the data input to the source drive circuit 14. Specifically, the image signal SG13 is input to the source drive circuit 14 in synchronization with the latch timing signal SG9.

Further, the source drive circuit 14 outputs a voltage based on the image signal SG13 that has been input, to the source signal lines in synchronization with the latch timing signal SG9. Specifically, the source drive circuit 14 outputs the voltage based on the image signal SG13 that has been input in synchronization with the latch timing signal SG9, to the source signal lines in synchronization with the latch timing signal SG9 that comes next.

In this manner, when one latch timing signal SG9 is input to the source drive circuit 14, in synchronization with the input, the image signal SG13 is input to the source drive circuit 14, and the source drive circuit 14 outputs, to the source signal lines, the voltage based on the image signal SG13 that has been input in synchronization with the previous latch timing signal SG9.

The source drive circuit 14 outputs a voltage (source signal) based on the input image signal SG13 to the source signal lines S1, S2, . . . , SM. This allows a voltage (source signal) based on the image signal SG13 to be applied to the pixels (liquid crystals) of the pixel electrodes R, G, and B corresponding to the gate signal lines G1, G2, . . . , GN selected by the gate drive circuit 13 (that is, the pixel electrodes whose thin film transistors Q are turned on), and thus transmittance of the pixels (liquid crystals) of pixel electrodes R, G, and B is controlled. In this embodiment, the liquid crystal display panel 12 corresponds to one example of the display portion, the gate drive circuit 13 corresponds to one example of the gate driver, the source drive circuit 14 corresponds to one example of the source driver, the DRAM 34 corresponds to one example of an image storage, the moving picture region 120M corresponds to one example of the specific region, the still picture region 120S corresponds to one example of the interlaced region.

Figure 5:
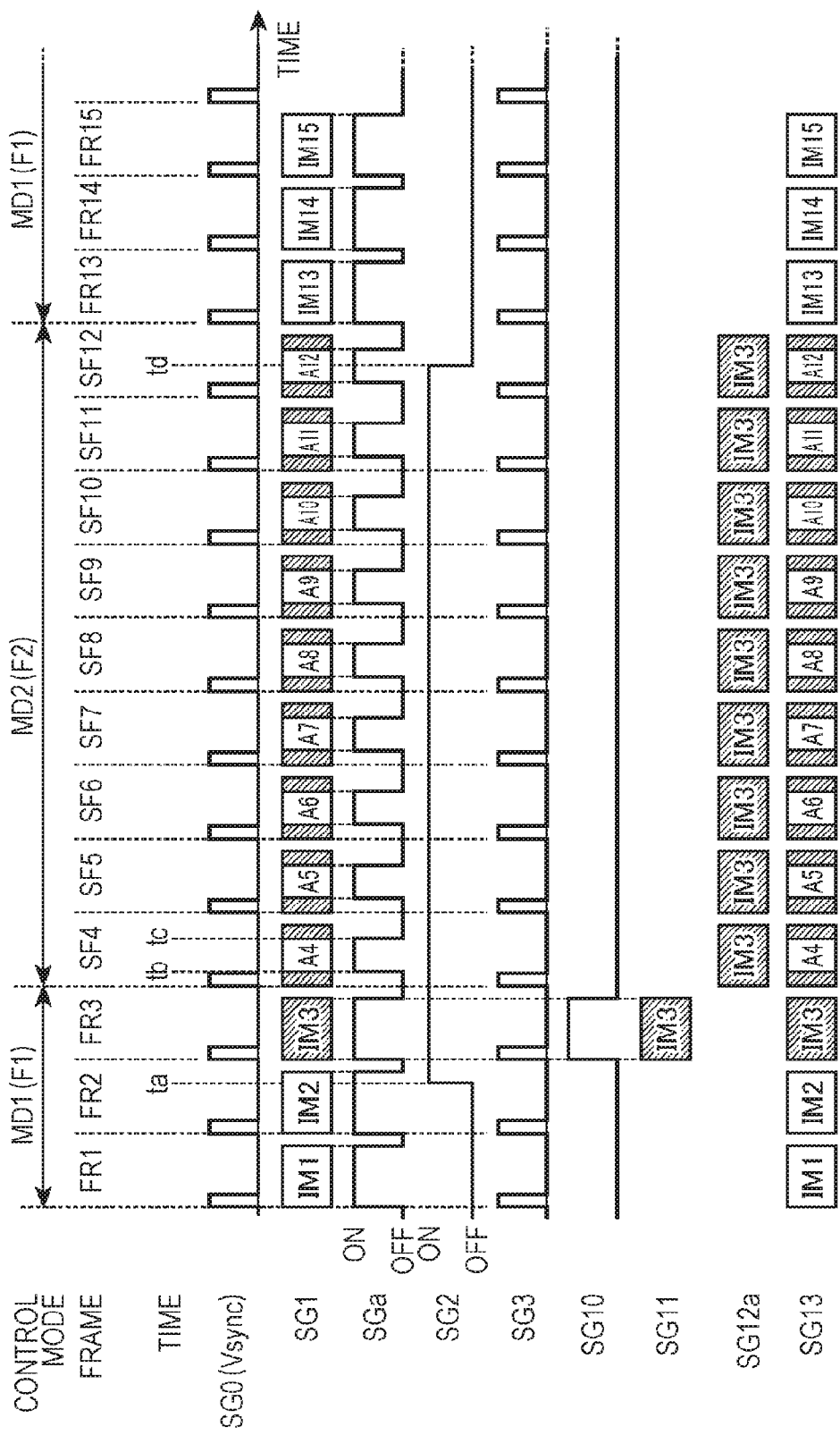
FIG. 5 is a timing chart schematically showing main signals shown in FIG. 2 in a case in which the control mode shifts from a basic control mode to a low frequency control mode, and in the low frequency control mode, a part of a still picture is shifted to a moving picture.

FIG. 5 is a timing chart schematically showing main signals shown in FIG. 2 in a case in which the control mode shifts from a basic control mode to a low frequency control mode, and in the low frequency control mode, a part of a still picture is shifted to a moving picture. An operation of the display device 1 according to the first embodiment will be described with reference to FIGS. 1 to 5.

Referring to FIG. 5, in frames FR1 and FR2, the image signal SG1 representing images IM1 and IM2 is input from outside every frame in synchronization with the synchronizing signal SG0 (the vertical synchronizing signal Vsync). During this time, as described above, the synchronizing signal SG0 input from outside is output as the synchronizing signal SG3 from the synchronizing signal generator 21. In this first embodiment, as images IM1 and IM2 are moving pictures, the standby mode signal SG2 is turned off. Therefore, the selector 45 outputs image signal SG1 representing images IM1 and IM2 as the image signals 13 to the source drive circuit 14.

When the standby mode signal SG2 is turned on at time to in the course of the frame FR2, the capture controller 29 generates the range signal SG10 corresponding to image signal SG1 representing the image IM3 in synchronization with the synchronizing signal SG0 that comes next. As a result, the image signal SG11 representing the image IM3 is output from the write controller 31 by way of the arbiter 33 and stored in the DRAM 34.

In frames FR1 to FR3, because input images IM1 to IM3 are moving pictures, regional signal SGa is turned on during an input of the image signal SG1. In addition, in frame FR3, the standby mode signal SG2 is turned on. Therefore, the image IM3 which is input is a still picture from in and after the frame F3. However, in a step of the frame FR3, the image IM3 is a moving picture for the image IM2. As described later, after the frame FR3, a sub-frame appears. Specifically, one frame image is displayed with three sub-frames SF4 to SF6, three sub-frames SF7 to SF9 and three sub-frames SF10 to SF12.

In the sub-frame SF4 that comes next, the moving picture A4 shown in FIG. 4, that is image signal SG1 only representing the moving picture A4 displayed in a part of the display portion 120 in the liquid crystal display panel 12. And the regional signal SGa is turned on, while image signal SG1 representing the moving picture A4 is input during the time tb to tc.

Therefore, in the sub-frame SF4, until the time tb when the standby mode signal SG2 is turned on and the regional signal SGa is turned off, the selector 45 outputs the image signal SG12b output from the data hold portion 36 as the image signal SG13 to the source drive circuit 14. And, in the sub-frame SF4, from time tb to time tc when the standby mode signal SG2 is turned on and the regional signal SGa is turned on, the selector 45 outputs the image signal SG12b input from outside as the image signal SG13 to the source drive circuit 14. Further, in the sub-frame SF4, after time tc when an input of the image signal SG1 representing the moving picture A4 ends, and the standby mode signal SG2 is turned on and the regional signal SGa is turned off, the selector 45 outputs the image signal SG12b output from data hold portion 36 as the image signal SG13 to the source drive circuit 14.

In the sub-frames SF5 to SF12, the display device 1 operates in the same way as the sub-frame SF4. As a result, in the sub-frames SF 5 to SF12, mixing images of moving pictures A5 to A12 and a still picture IM3 are displayed in the liquid crystal display panel 12, respectively.

Further, at time td in the course of the sub-frame SF12, the standby mode signal SG2 is turned off. As a result, in the sub-frames SF 13 to SF 15, the selector 45 outputs the image signal SG1 representing frame images IM13 to IM15 which are moving pictures input from outside as the image signal SG13 to the source drive circuit 14

In addition, in the sub-frames SF4 to SF12, because image signal SG1 representing moving pictures A4 to A12 is continuously input from outside, the synchronizing signal SG0 is continuously input from outside. Therefore, in the sub-frames SF4 to SF12, the synchronizing signal generator 21 outputs the synchronizing signal SG0 from outside as the synchronizing signal SG3.

In the frames FR1 to FR3, the control mode is the basic control mode MD1. The frame frequency F1 is expressed by F1=60 Hz in this first embodiment. In the frames FR4 to FR12, the control mode is the low frequency control mode MD2. The frame frequency F2 is expressed by F2=20 Hz in this first embodiment. The frame frequency F2 is less than the frame frequency F1. In the frames FR13 to FR15, the control mode is the basic control mode MD1. The frame frequency F1 is expressed by F1=60 Hz in this first embodiment.

Figure 6:
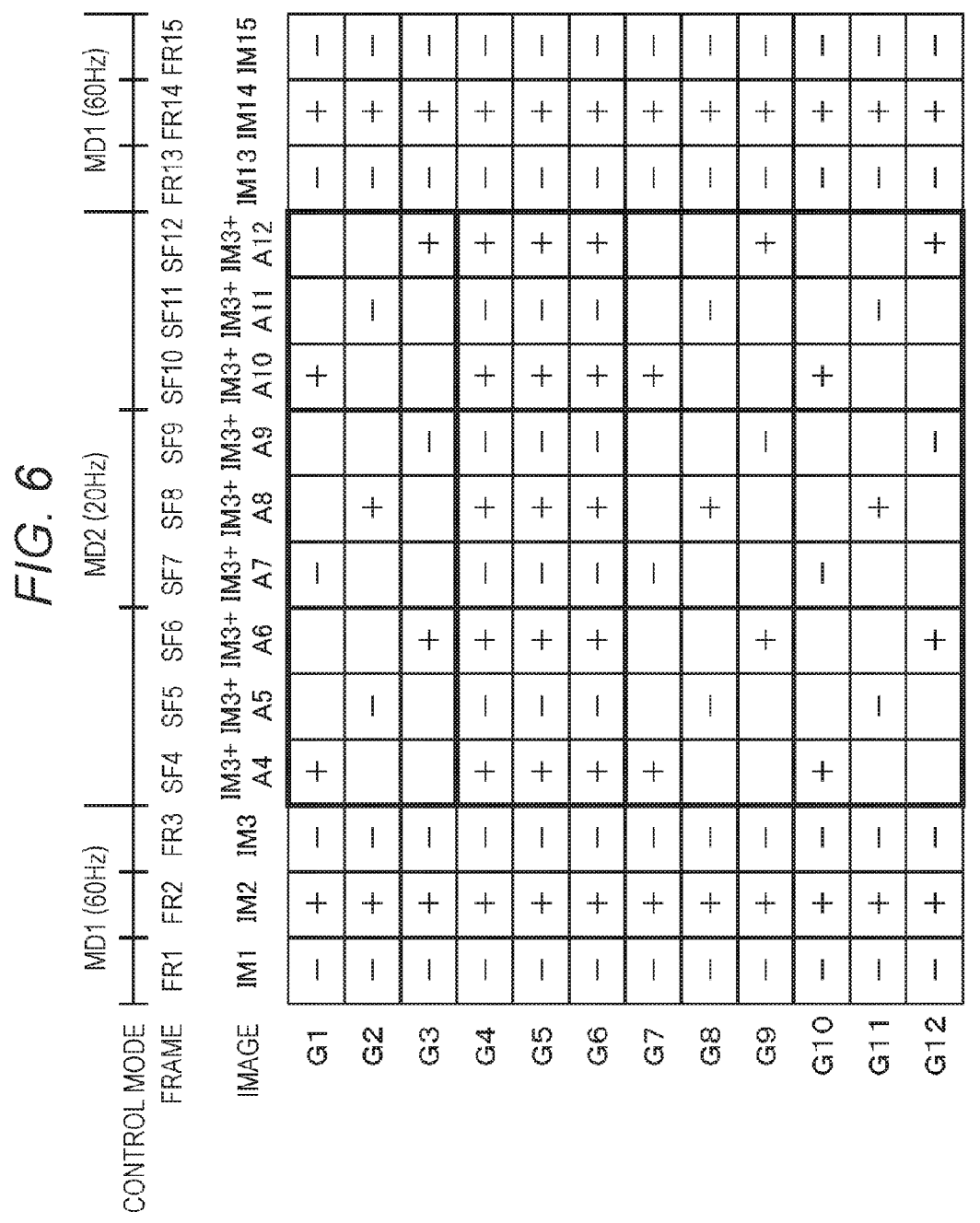

FIG. 6 is a diagram schematically showing polarities of voltages applied to one of the source signal lines (in this embodiment, e. g., the source signal line S1) in performing the operation shown in FIG. 5 of the control mode shifting from the basic control mode to the low frequency control mode and returning to the basic control mode from the low frequency control mode. In FIG. 6, similarly to FIG. 5, the frames FR1 to FR3, the sub-frames SF4 to SF12, and the frames FR13 to FR15 are shown, similarly to FIG. 5.

Further, in FIG. 6, the number N of the gate signal lines is expressed by N=12. A scanning to the gate signal lines in a case of an operation in FIG. 5 will be described with reference to FIGS. 4 to 6.

As described with reference to FIG. 5, in the frames FR1 to FR3 in FIG. 6, the control mode is the basic control mode MD1, and the frame frequency F1 for image display is expressed by F1=60 Hz. As shown in FIG. 6, pixel electrodes are driven in the column inversion drive mode taking the polarity of a voltage applied to the source signal line S1 in the frame FR1 as "−", the polarity of a voltage applied to the source signal line S1 in the frame FR2 as "+", and the polarity of a voltage applied to the source signal line S1 in the frame FR3 as "−".

As described with reference to FIG. 5, in the frame FR4, the control mode is switched from the basic control mode MD1 to the low frequency control mode MD2. In the sub-frames SF4 to SF12, the control mode is the low frequency control mode MD2. In the low frequency control mode MD2, the frame frequency F2 is expressed by F2=20 Hz. In the low frequency control mode MD2, scanned gate signal lines are thinned in a part of gate signal lines. This leads to reduction of power consumption.

Here, among gate signal lines G1 to G12 in FIG. 6, gate signal lines G1 to G3 correspond to the still picture region 120S shown in a upper part of FIG. 4, gate signal lines G4 to G6 correspond to the moving picture region 120M shown in FIG. 4 and gate signal lines G7 to G12 correspond to the still picture region 120S shown in a bottom part of FIG. 4.

Thus, in the sub-frames SF4 to SF12, the gate signal lines G4 to G6 are not subjected to interlaced scanning, but are progressively scanned. In this manner, moving pictures A4 to A12 which partially consist of frame images are displayed in the gate signal lines G4 to G6 (the moving picture region 120M in FIG. 4) at the frame frequency of 60 Hz. It can prevent image quality of moving pictures A4 to A12 from deteriorating.

On the other hand, the gate signal lines G1 to G3 and G7 to G12 are subjected to interlaced scanning every three gate signal lines at the frame frequency of 60 Hz, the interlaced scanning is repeated three times, and thus all of the gate signal lines G1 to G3 and G7 to G12 are scanned. In other words, three sub-frame images are respectively displayed in the three sub-frames SF4 to SF6 at 60 Hz. With this, the image IM3 which is one frame of a still image is displayed. Similarly to sub-frames SF7 to SF9 and sub-frames SF10 to SF12, three sub-frame images are respectively displayed at 60 Hz, and then a still picture of the image IM3 which is a part of frame image is displayed. Thus, the frame images IM3, A4 and so on are displayed in the liquid crystal display panel 12 at the frame frequency of 20 Hz.

Then, as described with reference to FIG. 5, the control mode returns to the basic control mode MD1 in the frame FR13, and a voltage is applied to the source signal line S1 at the frame frequency of F1, F1=60 Hz in the frames FR13 to FR15.

FIG. 7 is a timing chart schematically showing operations of the gate drive circuit and the source drive circuit in the sub-frame SF7 in FIG. 6 in which the control mode is the low frequency control mode MD2. Similarly to FIG. 6, in FIG. 7, the number N of the gate signal lines is expressed by N=12, which comprises of gate signal lines G1 to G12. With reference to FIG. 2, FIG. 6, and FIG. 7, a description will be given of operations of the gate drive circuit 13 and the source drive circuit 14 in the sub-frame SF7 in FIG. 6 in which the control mode is the low frequency control mode MD2.

In FIG. 7, first, the vertical synchronizing signal Vsync is output and the horizontal synchronizing signal Hsync is output in synchronization with rising of the vertical synchronizing signal Vsync. In synchronization with the latch timing signal SG9 at time t1 after the vertical synchronizing signal Vsync is output, the image signal SG13 corresponding to the gate signal line G1 is input to the source drive circuit 14 from the selector 45. A voltage based on the image signal SG13, that is, a voltage corresponding to the gate signal line G1 is output from the source drive circuit 14 in synchronization with the latch timing signal SG9 at time t2 that comes next.

On the other hand, at time t0 between time t1 and time t2, a gate start signal is output. Specifically, the gate controller 27 outputs the gate start signal after delay time of a time period (1+Tg)*H (0≤Tg<1) from the rising of the vertical synchronizing signal Vsync. The delay time is the same as that in the basic control mode MD1. In other words, in the basic control mode MD 1, the gate controller 27 also outputs the gate start signal after the delay time of the time period (1+Tg)*H from the rising of the vertical synchronizing signal Vsync.

At time t0, the output enable signal in the gate drive signal SG8 is turned on. Accordingly, a gate signal corresponding to the gate signal line G1 is output in synchronization with the gate start signal. Therefore, while the gate signal is output to the gate signal line G1, a voltage corresponding to the image signal D1 corresponding to the gate signal line G1 is output from the source drive circuit 14. Thus, a voltage corresponding to the image signal D1 is input to pixel electrodes.

Further, an image signal SG13 is input to the source drive circuit 14 from the selector 45 in synchronization with the latch timing signal SG9 at time t2. At time t2, the data enable signal SG7 is turned off. Therefore, this image signal SG13 is an image signal D1 when the data enable signal SG7 is turned on immediately before, that is, an image signal D1 corresponding to gate signal lines G1

In synchronization with the latch timing signal SG9 at time t3 that comes next, a voltage corresponding to the image signal D1 that has been input in synchronization with the latch timing signal SG9 at time t2 is output to the source signal lines from the source drive circuit 14. However, as the output enable signal in the gate drive signal SG8 is turned off, a gate signal is not output to the gate signal line G2 from the gate drive circuit 13. Therefore, a voltage corresponding to the image signal that has been output to the source signal lines from the source drive circuit 14 is not applied to pixel electrodes.

Further, an image signal SG13 inputs to the source drive circuit 14 from the selector 45 in synchronization with the latch timing signal SG9 at time t3. At time t3, the data enable signal SG7 is turned off. Therefore, this image signal SG13 is an image signal D1 when the data enable signal SG7 is turned on immediately before, that is, an image signal D1 corresponding to gate signal lines G1

In synchronization with the latch timing signal SG9 at time t4 that comes next, a voltage corresponding to the image signal D1 that has been input in synchronization with the latch timing signal SG9 at time t3 is output to the source signal lines from the source drive circuit 14. However, as the output enable signal in the gate drive signal SG8 is turned off, a gate signal is not output to the gate signal line G3 from the gate drive circuit 13. Therefore, a voltage corresponding to the image signal that has been output to the source signal lines from the source drive circuit 14 is not applied to pixel electrodes.

Further, an image signal SG13 is input to the source drive circuit 14 from the selector 45 in synchronization with the latch timing signal SG9 at time t4. At time t4, the data enable signal SG7 is turned on. Therefore, this image signal SG13 is an image signal D4 corresponding to next gate signal lines G4. As described with FIGS. 5 and 6, the standby mode signal SG2 is turned on and the regional signal SGa is turned on. Therefore, this image signal D4 is an image signal SG1 which had been input from outside.

In synchronization with the latch timing signal SG9 at time t5 that comes next, a voltage corresponding to the image signal D4 that has been input in synchronization with the latch timing signal SG9 at time t4 is output to the source signal lines from the source drive circuit 14. At the time, the output enable signal in the gate drive signal SG8 is turned on. Therefore, a voltage corresponding to the image signal D4 that is output to the source signal lines from the source drive circuit 14 is applied to pixel electrodes.

Further, an image signal SG13 is input to the source drive circuit 14 from the selector 45 in synchronization with the latch timing signal SG9 at time t5. At time t5, the data enable signal SG7 is turned on. Therefore, this image signal SG13 is an image signal D5 corresponding to next gate signal lines G5. As described with FIGS. 5 and 6, the standby mode signal SG2 is turned on and the regional signal SGa is turned on. Therefore, this image signal D5 is an image signal SG1 input from outside.

In the latch timing signal SG9 at times t6 and t7 that come next, the data enable signal SG7 is continuously turned on. Thus, similarly to time t5, image signals D6 and D7 corresponding to gate signal lines G6 and G7 are output to the source drive circuit 14 as the image signal SG13, respectively.

In the latch timing signal SG9 at times t6 and t7, the data enable signal SG7 in the gate drive signal SG8 is continuously turned on. Thus, similarly to time t5, voltages corresponding to the image signals D5 and D6 are applied to pixel electrodes.

In synchronization with the latch timing signal SG9 at time t8 that comes next, a voltage corresponding to the image signal D7 that has been input in synchronization with the latch timing signal SG9 at time t7 is output to the source signal lines from the source drive circuit 14. At the time, the output enable signal in the gate drive signal SG8 is turned on. Therefore, a voltage corresponding to the image signal D7 that is output to the source signal lines from the source drive circuit 14 is applied to pixel electrodes.

Further, an image signal SG13 is input to the source drive circuit 14 from the selector 45 in synchronization with the latch timing signal SG9 at time t8. At time t8, the data enable signal SG7 is turned off. Therefore, this image signal SG13 is an image signal D7 when the data enable signal SG7 is turned on immediately before, that is, an image signal D7 corresponding to gate signal lines G7.

In synchronization with the latch timing signal SG9 at time t9 that comes next, a voltage corresponding to the image signal D7 that has been input in synchronization with the latch timing signal SG9 at time t8 is output to the source signal lines from the source drive circuit 14. However, the output enable signal in the gate drive signal SG8 is turned off. Thus, a gate signal is not output to the gate signal line G2 from the gate drive circuit 13. Therefore, a voltage corresponding to the image signal D7 that has been output to the source signal lines from the source drive circuit 14 is not applied to pixel electrodes.

Further, an image signal SG13 is input to the source drive circuit 14 from the selector 45 in synchronization with the latch timing signal SG9 at time t9. At time t9, the data enable signal SG7 is turned off. Therefore, this image signal SG13 is an image signal D7 when the data enable signal SG7 is turned on immediately before, that is, an image signal D7 corresponding to gate signal lines G7.

In synchronization with the latch timing signal SG9 at time t9 that comes next, a voltage corresponding to the image signal D7 that has been input in synchronization with the latch timing signal SG9 at time t9 is output to the source signal lines from the source drive circuit 14. However, the output enable signal in the gate drive signal SG8 is turned off. Thus, a gate signal is not output to the gate signal line G2 from the gate drive circuit 13. Therefore, a voltage corresponding to the image signal D7 that has been output to the source signal lines from the source drive circuit 14 is not applied to pixel electrodes.

Further, an image signal SG13 is input to the source drive circuit 14 from the selector 45 in synchronization with the latch timing signal SG9 at time t10. At time t10, the data enable signal SG7 is turned on. Therefore, this image signal SG13 is an image signal D10 corresponding to next gate signal line SG10. As described with FIGS. 5 and 6, the standby mode signal SG2 is turned on and the regional signal SGa is turned on. Therefore, this image signal D10 is an image signal SG12b output from the data hold portion 36.

At times t11 to t13 which come next, the same operation is performed similarly to times t8 to t10. In FIG. 10, gate signals are not output to the gate signal lines G2, G3, and G10, and so they are indicated by broken lines.

Here, in the sub-frame SF4 of the low frequency control mode MD2 shown in FIG. 7, a description will be given of a relation between an interval of scanning of the gate signal lines by the gate drive circuit 13 and a voltage output from the source drive circuit 14.

In the low frequency control mode MD2 shown in FIG. 7, the gate drive circuit 13 first scans the first gate signal line G1, and then the fourth gate signal line G4, for example. In this case, the data controller 30 causes the source drive circuit 14 to output a voltage corresponding to the first gate signal line G1 output from the source drive circuit 14 in response to the scanning of the first gate signal line G1 continuously for a period 3H. Specifically, for two horizontal scanning period 2H corresponding to the gate signal lines G2 and G3 that are not scanned, a voltage corresponding to the image signal D7 output corresponding to the gate signal line G1 is continuously output.

Further, the gate drive circuit 13 scans, for example, the fourth gate signal line G4, and then the fifth gate signal line G5. In this case, the data controller 30 causes the source drive circuit 14 to output a voltage corresponding to the image signal D4 output from the source drive circuit 14 in response to the scanning of the fourth gate signal line G4 continuously for one horizontal scanning period 1H.

Further, the gate drive circuit 13 scans, for example, the fifth gate signal line G5, and then the sixth gate signal line G6. In this case, the data controller 30 causes the source drive circuit 14 to output a voltage corresponding to the image signal D5 output from the source drive circuit 14 in response to the scanning of the fifth gate signal line G5 continuously for one horizontal scanning period 1H. This also applies to a case of the next seventh gate signal line G7

Further, the gate drive circuit 13 scans, for example, the seventh gate signal line G7, and then the tenth gate signal line G10. In this case, the data controller 30 causes the source drive circuit 14 to output a voltage corresponding to the image signal D5 output from the source drive circuit 14 in response to the scanning of the seventh gate signal line G7 continuously for three horizontal scanning period 3H. Specifically, for the horizontal scanning period 2H corresponding to the gate signal lines G7 and G8 that are not scanned, a voltage corresponding to the image signal D7 output corresponding to the gate signal line G7 is continuously output.

In this manner, in the low frequency control mode MD2, in a case in which the gate drive circuit 13 first scans a U-th gate signal line out of the N gate signal lines (U is an integer that is not less than 1 and less than N), and then a (U+V)-th gate signal line (V is an integer that is not less than 1 and not greater than K), the data controller 30 causes the source drive circuit 14 to output a voltage output from the source drive circuit 14 in response to scanning of the U-th gate signal line for a period V*H (V times of the horizontal scanning period 1H).

As described above, in the first embodiment, after the control mode is switched from the basic control mode MD1 to the low frequency control mode MD2, the image signal SG1 representing a moving picture which is displayed in a part of the display portion 120 of the liquid crystal display panel 12 is input, and then a mixing image of the moving picture and the still picture is displayed in the display portion 120. At the time, the gate signal lines corresponding to the region of the moving picture are progressively scanned at the frequency of 60 Hz. As a result, according to the first embodiment, it is possible to prevent image qualities of moving pictures from excessively deteriorating.

Further, in this first embodiment, image signal SG1 representing a still picture is stored in the DRAM 34, and then the image signal SG1 is read from the DRAM 34 and is displayed in the liquid crystal display panel 12. Therefore, it is possible to prevent power consumption from increasing.

Further, in this first embodiment, at timings at which gate signals are output to the gate signal lines G2, G3, G8, G9, G11, and G11, the source drive circuit 14 outputs a voltage which had been output immediately before, that is, the voltage based on image signal D1, D7 and D10 corresponding to the gate signal lines G1, G7, and G10. As a result, as compared to a case where the source drive circuit 14 outputs different voltages, wasteful discharge and charge may not occur in the source drive circuit 14. Therefore, it is possible to prevent power consumption from increasing.

Further, in the first embodiment, a voltage is output from the source drive circuit 14 every time the latch timing signal SG9 is output. However, at timing at which gate signals are output to the gate signal lines G2, G3, G8, G9, G11 and G12, the output enable signal in the gate drive signal SG8 is turned off, and gate signals are not output from the gate drive circuit 13 to the gate signal lines G2, G3, G8, G9, G11 and G12. Therefore, it is possible to preferably perform mixing operation of interlaced scanning and progressive scanning of the gate signal lines G1 to G12 with a configuration in which the latch timing signal SG9 is output every time the horizontal synchronizing signal Hsync is output.

Second Embodiment

Figure 8:
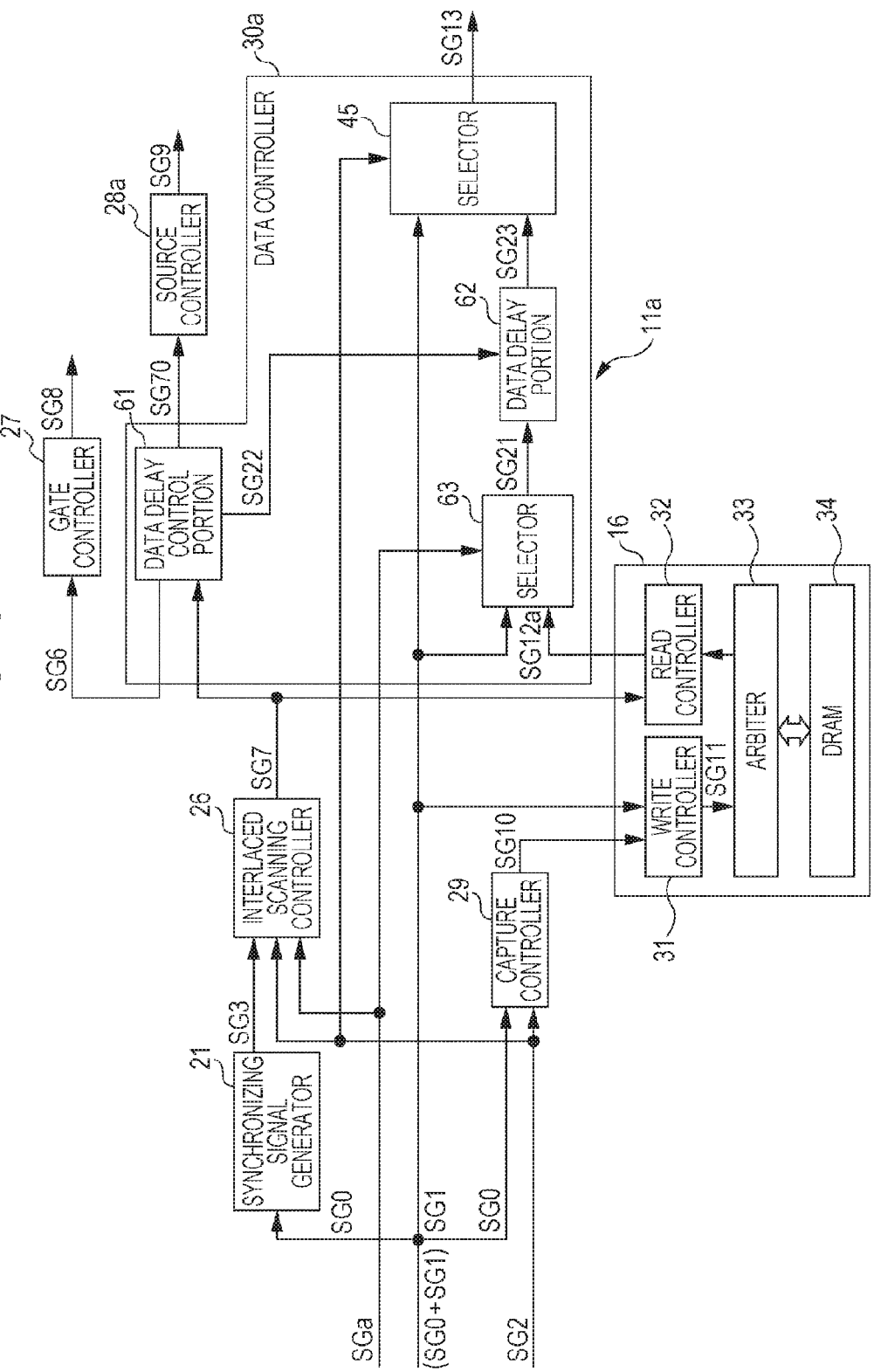
FIG. 8 is a block diagram showing a configuration of a controller and an image memory portion of a display device according to a second embodiment.
Figure 9:
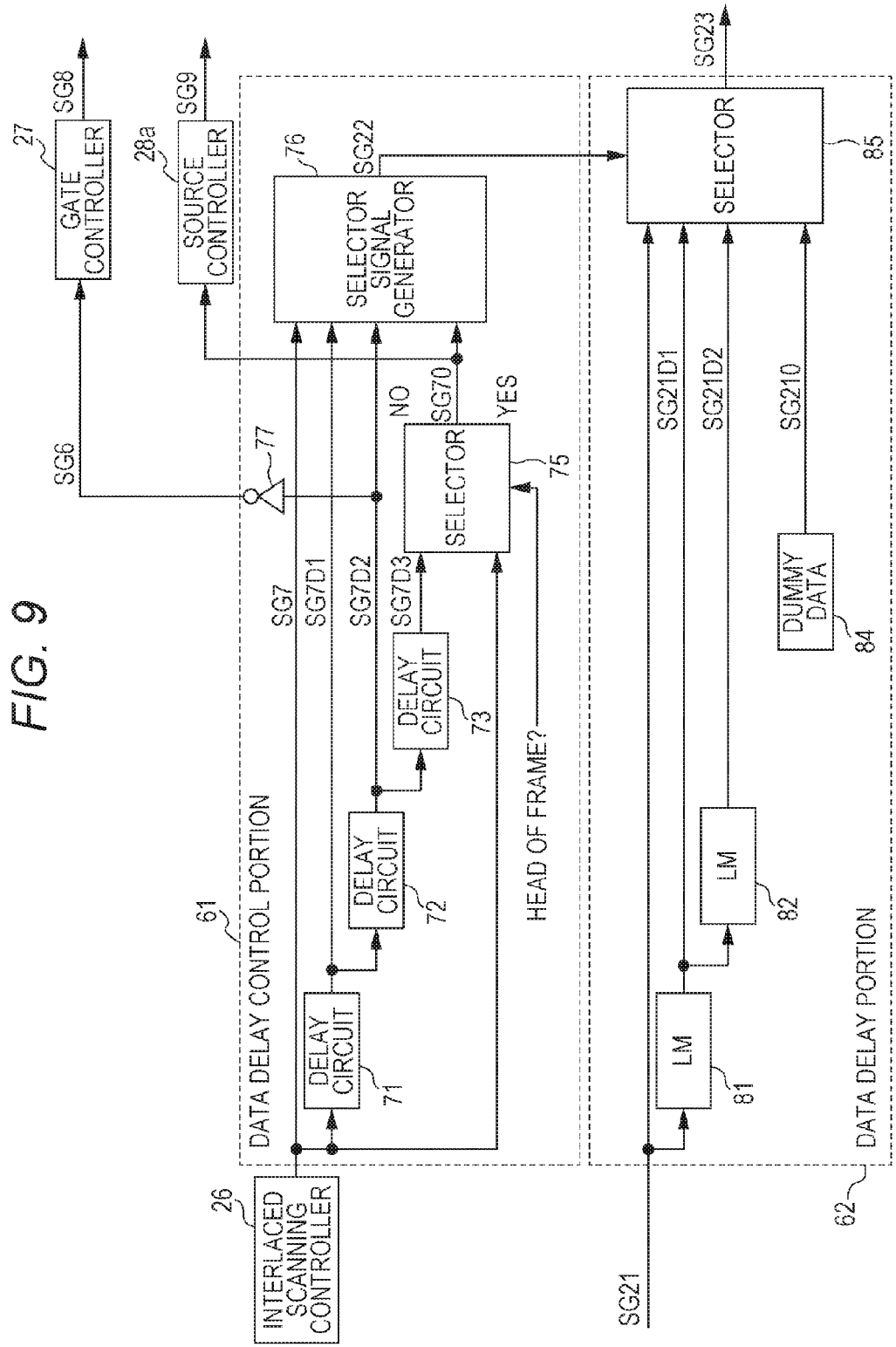
FIG. 9 is a block diagram showing a configuration of a data delay control portion and a data delay portion shown in FIG. 8.

FIG. 8 is a block diagram showing a configuration of a controller and an image memory portion of a display device according to a second embodiment. FIG. 9 is a block diagram showing a configuration of a data controller shown in FIG. 8. FIG. 10 is a truth table of a selector in a data delay portion shown in FIG. 9. In the second embodiment, similar components as in the first embodiment are denoted by similar reference numerals.

The configuration of the display device according to the second embodiment is substantially the same as the display device 1 according to the first embodiment shown in FIG. 1. The display device according to the second embodiment includes a controller 11a in place of the controller 11 according to the first embodiment. In the second embodiment, similarly to the first embodiment, a frame frequency F1 in the basic control mode is expressed by F1=60 Hz, and a frame frequency F2 in the low frequency control mode is expressed by F2=20 Hz. Therefore, similarly to the first embodiment, in the second embodiment, K=F1/F2=3. Hereinafter, the second embodiment will be described focusing on differences from the first embodiment.

Referring to FIG. 8, the controller 11a includes the synchronizing signal generator 21, the interlaced scanning controller 26, the gate controller 27, a source controller 28a, the capture controller 29, and a data controller 30a. The data controller 30a includes a selector 45, a data delay control portion 61, a data delay portion 62 and the selector 63.

Referring to FIG. 9, the data delay controller 61 includes delay circuits 71 to 73, a selector 75, a selection signal generator 76, and an inverter 77. The data delay portion 62 includes line memories (LMs) 81 and 82, a dummy data generator 84, and a selector 85.

The interlaced scanning controller 26 outputs the generated data enable signal SG7 to the delay circuit 71, the selector 75, and the selection signal generator 76 of the data delay controller 61. The delay circuit 71 delays the data enable signal SG7 by one horizontal scanning period (1H), and outputs a delayed data enable signal SG7D1 to the delay circuit 72.

The delay circuit 72 delays the data enable signal SG7D2 further by 1H, and outputs a delayed data enable signal SG7D2 to the delay circuit 73 and the selection signal generator 76. Further, the delay circuit 72 outputs the data enable signal SG7D2 to the gate controller 27 via the inverter 77. The delay circuit 73 delays the data enable signal SG7D2 further by 1H, and outputs a delayed data enable signal SG7D3 to the selector 75.

The selector 75 outputs the data enable signal SG7 as the data enable signal SG7 to the selection signal generator 76 at the head of a frame, that is, immediately after the vertical synchronizing signal Vsync. If not at the head of the frame, the selector 75 outputs the data enable signal SG7D3 as the data enable signal SG70 to the selection signal generator 76. The selector 75 also outputs the data enable signal SG70 to the source controller 28a.

The source controller 28a outputs the latch timing signal SG9 to the source drive circuit 14 in synchronization with the horizontal synchronizing signal Hsync when the data enable signal SG70 is turned on. The source controller 28a does not output the latch timing signal SG9 to the source drive circuit 14 when the data enable signal SG70 is turned off. In this manner, unlike the source controller 28 of the first embodiment, an interval at which the latch timing signal SG9 is output from the source controller 28a of the second embodiment is not a constant one-horizontal scanning period (1H).

The selection signal generator 76 outputs, as a selection signal SG22 to the selector 85, information indicating whether each of the data enable signals SG7, SG7D1 to SG7D2, and SG70 that are input is enabled or disabled.

The read controller 32 outputs an image signal SG12a that has been read to the selector 63. The selector 63 outputs the image signal SG1 which had been input from outside as image signal SG21 to a line memory 81 of the data delay portion 62 and the selector 85 while the regional signal SGa is turned on. Further, the selector 63 outputs the image signal SG1 which had been input from the read controller 32 as an image signal SG21 to the line memory 81 of data delay portion 62 and the selector 85 while the regional signal SGa is turned off.

The line memory 81 delays the image signal SG21 for one line by further 1H, and outputs a delayed image signal SG21D2 to the line memory 82 and the selector 85. The line memory 82 delays the image signal SG21D2 for one line by further 1H, and outputs a delayed image signal SG21D2 to the selector 85. The dummy data generator 84 outputs an image signal SG210 of 0 Gray levels as dummy data to the selector 84.

The selector 85 outputs, out of the input image signals, an image signal selected based on the truth table shown in FIG. 10 as an image signal SG23 to the selector 45. Specifically, the selector 85 outputs the image signal SG21 as the image signal SG23 to the selector 45 when the data enable signals SG7 and SG70 are enabled and the data enable signals SG7D1 and SG7D2 are disabled.

Further, the selector 85 outputs the image signal SG21D1 as the image signal SG23 to the selector 45 when the data enable signals SG7D1 and SG70 are enabled and the data enable signals SG7D2 is disabled. Moreover, the selector 85 outputs the image signal SG21D2 as the image signal SG23 to the selector 45 when the data enable signal SG7D2 and SG70 are enabled. In addition, the selector 85 outputs the image signal SG210 as the image signal SG23 to the selector 45 when a combination of the data enable signals is other than the above.

In this embodiment, the liquid crystal display panel 12 corresponds to one example of the display portion, the gate drive circuit 13 corresponds to one example of the gate driver, the source drive circuit 14 corresponds to one example of the source driver, the DRAM 34 corresponds to one example of the image storage and data enable signals SG7D1 to SG7D3 correspond to one example of delay data enable signals.

Figure 11:
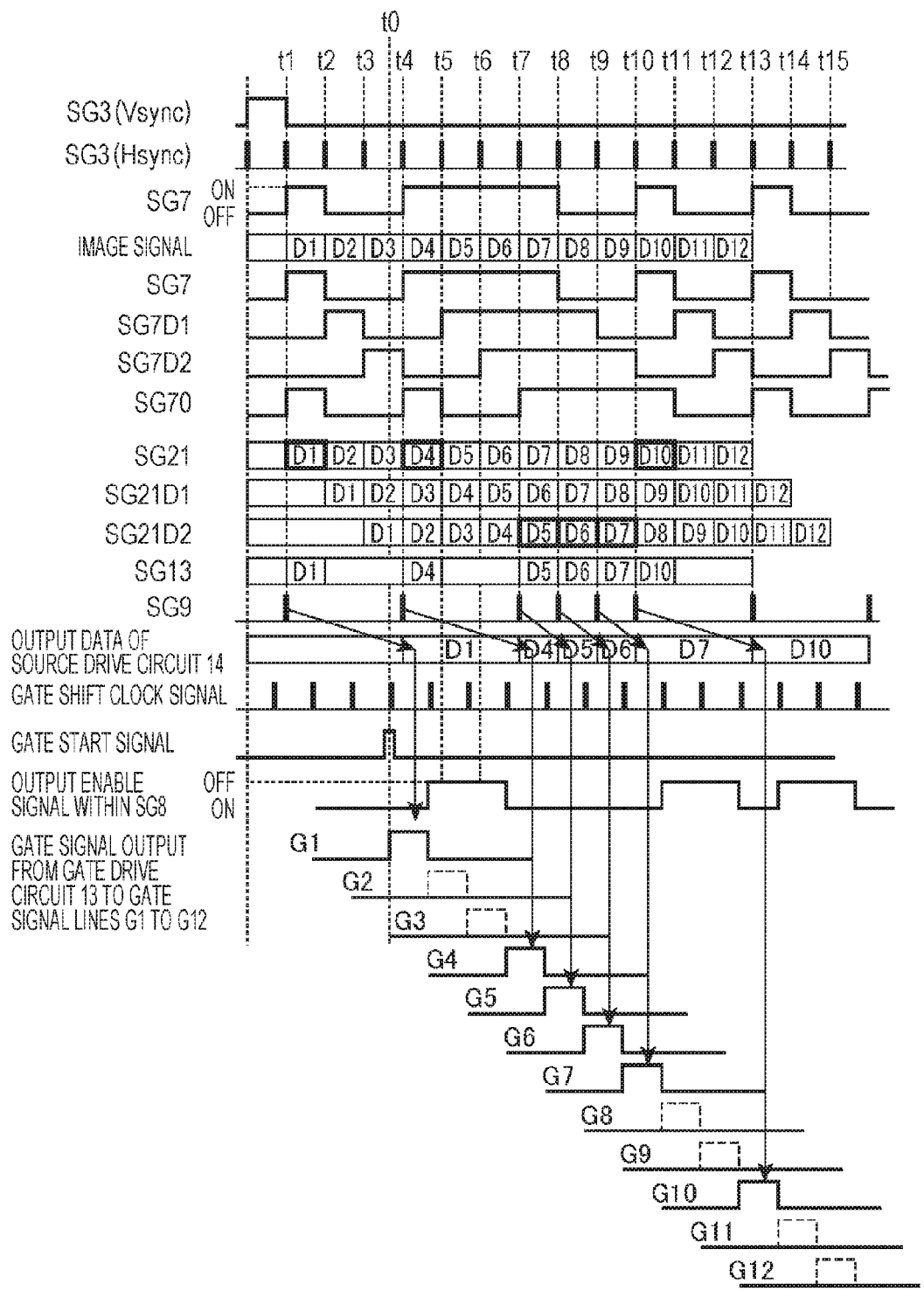
FIG. 11 is a timing chart schematically showing operations of a gate drive circuit and a source drive circuit according to the second embodiment
Figure 12:
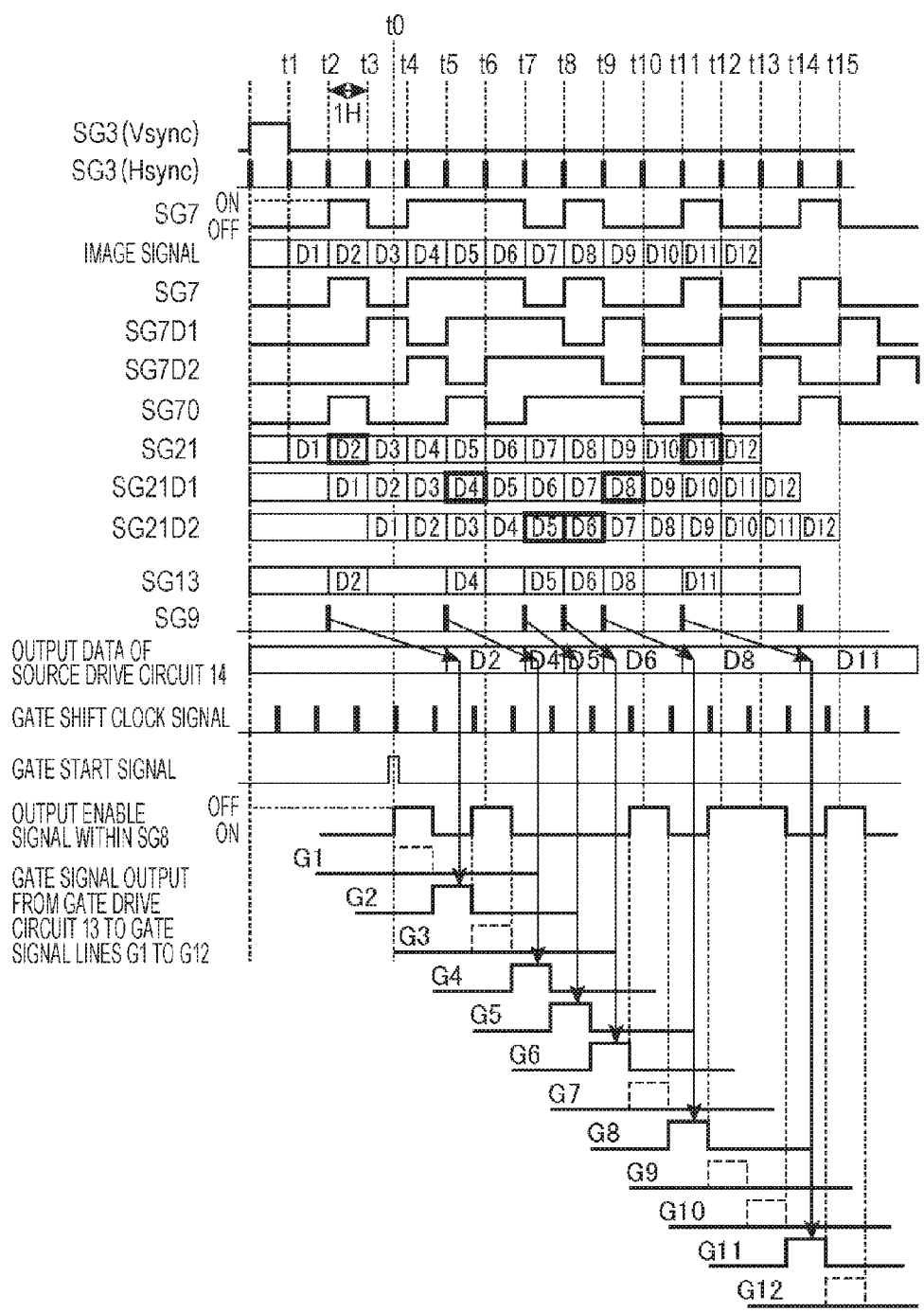
FIG. 12 is a timing chart schematically showing operations of the gate drive circuit and the source drive circuit according to the second embodiment.
Figure 13:
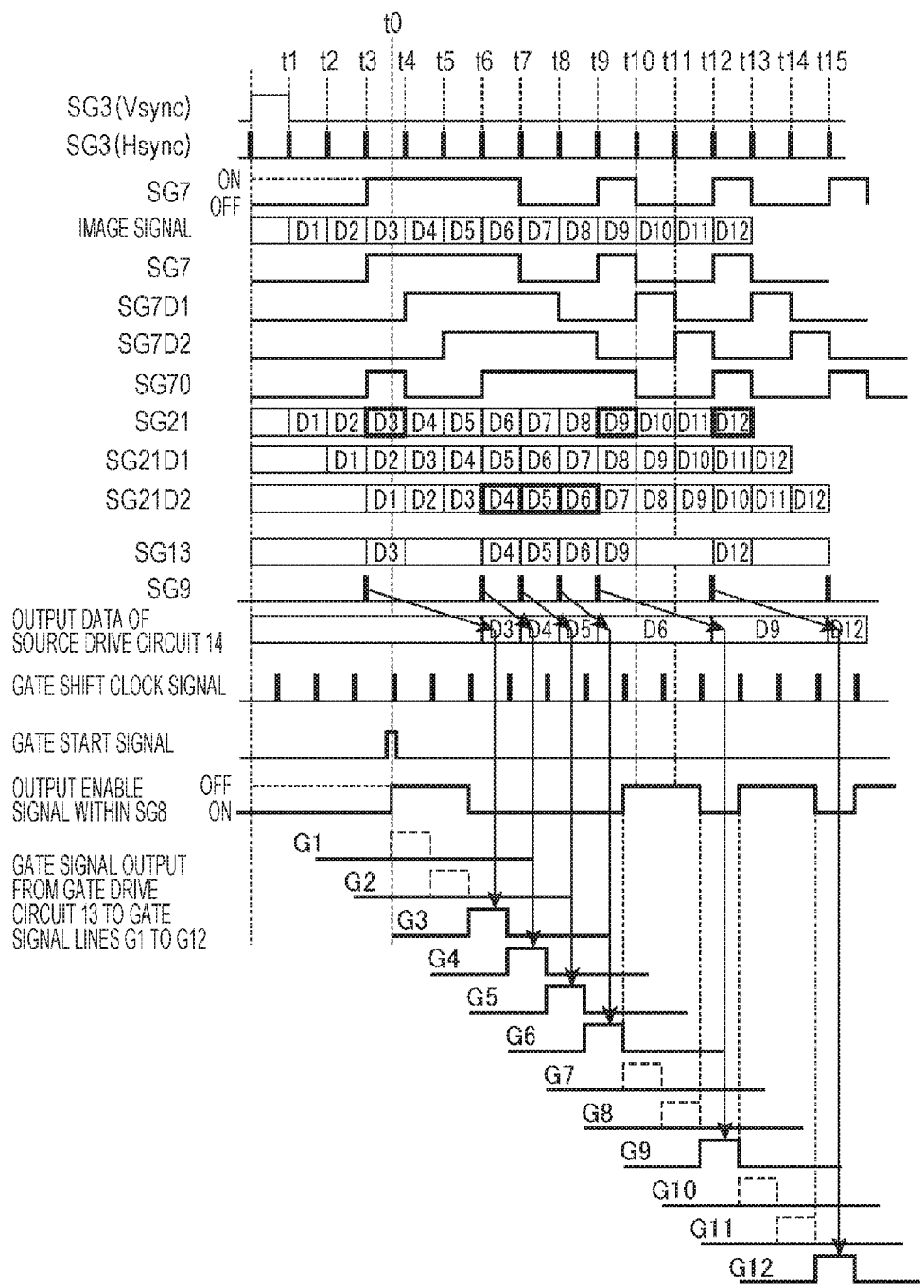
FIG. 13 is a timing chart schematically showing operations of the gate drive circuit and the source drive circuit according to the second embodiment.

FIGS. 11 to 13 are timing charts schematically showing operations of a gate drive circuit and a source drive circuit according to the second embodiment. FIG. 11 shows an operation of the sub-frame SF7 shown in FIG. 6. FIG. 12 shows an operation of the sub-frame SF8 shown in FIG. 6. FIG. 13 shows an operation of the sub-frame SF9 shown in FIG. 6. Similarly to FIG. 6, in FIGS. 11 to 13, a number of the gate signal lines G1 to G12 is expressed by N=12.

In the second embodiment, similarly to FIG. 5 of the first embodiment, image signal SG1 is input and, similarly to FIG. 6, gate signals are output to the gate signal lines G1 to G13. However, an operation of the gate drive circuit 13 and the source drive circuit 14 is different from those in the first embodiment. An operation of the gate drive circuit 13 and the source drive circuit 14 in the sub-frames SF7 to SF9 in FIG. 6 according to the second embodiment will be described with reference to FIGS. 8 to 13.

In FIG. 11, first, the vertical synchronizing signal Vsync is output and the horizontal synchronizing signal Hsync is output in synchronization with rising of the vertical synchronizing signal Vsync. As time t1 after the vertical synchronizing signal Vsync has been output corresponds to the head of the frame, the selector 75 outputs the data enable signal SG7 as the data enable signal SG70 in synchronization with the horizontal synchronizing signal Hsync at time t1. Therefore, the data enable signals SG7 and SG70 are enabled, and the data enable signals SG7D1 to SG7D3 are disabled.

Accordingly, based on the truth table in FIG. 10, the selector 85 outputs the image signal SG21 as the image signal SG23. As a result, the image signal D1 (the image signal SG21) corresponding to the gate signal line G1 is input as the image signal SG13 to the source drive circuit 14 in synchronization with the latch timing signal SG9 at time t1. As described with FIGS. 5 and 6, the standby mode signal SG2 is turned on and the regional signal SGa is turned on. Therefore, this image signal D10 is an image signal SG12$b$ which had been output from the data hold portion 36.

For the horizontal synchronizing signal Hsync at each of succeeding times t2 and t3, the data enable signal SG70 is disabled. Accordingly, from the truth table in FIG. 10, the selector 85 outputs the image signal SG210 of 0 Gray level as the image signal SG23 at each time. Further, at times t2 and t3, the latch timing signal SG9 is not output from the source controller 28$a$ as the data enable signal SG70 is disabled. Therefore, during this period, an image signal is not input to the source drive circuit 14 and an voltage is not output from the source drive circuit 14.

For the horizontal synchronizing signal Hsync at succeeding time t7, the data enable signals SG70 are enabled. Thus, the latch timing signal SG9 is output in synchronization with the horizontal synchronizing signal Hsync at time t4.

Further at time t4, the data enable signals SG7 and SG70 are enabled and the data enable signals SG7D1 and SG7D2 are disabled. Accordingly, based on the truth table in FIG. 10, the selector 85 outputs the image signal SG21 as the image signal SG23 in synchronization with the latch timing signal SG9 at time t4. As a result, the selector 45 outputs the image signal D4 (image signal SG21) corresponding to the gate signal line G4 to the source drive circuit 14 as the image signal SG13 in synchronization with the latch timing signal SG9 at time t4.

Further in the latch timing signal SG9 at time t4, a voltage based on image signal SG13 which had been input to the source drive circuit 14 in synchronization with the latch timing signal SG9 at previous time t1, that is, the voltage corresponding to image signal D1 is input from the source drive circuit 14 to the source signal lines.

On the other hand, a gate start signal is output at time t0 between time t3 and time t4. Specifically, the gate controller 27 outputs the gate start signal after delay time of a time period (3+Tg)*H (0≤Tg<1) from the rising of the vertical synchronizing signal Vsync. As described above, in the basic control mode MD1, the gate controller 27 outputs the gate start signal after the delay time of the time period (1+Tg)*H from the rising of the vertical synchronizing signal Vsync.

Therefore, in the second embodiment, a difference between timing for outputting a gate start signal in the basic control mode MD 1 and timing for outputting a gate start signal in the low frequency control mode MD2 is expressed as follows.

$$(3+Tg)*H-(1+Tg)*H=2H$$

Here, K=3 is established in FIG. 5 as described above. Therefore, in the second embodiment, the gate controller 27 delays timing for outputting a gate start signal by a time period (K−1)*H in the low frequency control mode MD2 as compared to the case in the basic control mode MD1.

At this time, the output enable signal in the gate drive signal SG8 is turned on. Accordingly, a gate signal is output to the gate signal line G1 in synchronization with a gate start signal. Therefore, a voltage corresponding to the image signal D1 that has been output to the source signal lines from the source drive circuit 14 at time t4 is applied to pixel electrodes.

For the horizontal synchronizing signal Hsync at succeeding times t5 and t6, the data enable signal SG70 is disabled. Accordingly, based on the truth table in FIG. 10, the selector 85 outputs the image signal SG210 of 0 Gray level as the image signal SG23.

Further, at times t5 and t6, the latch timing signal SG9 is not output from the source controller 28a as the data enable signal SG70 is disabled. Therefore, during this period, an image signal is not input to the source drive circuit 14 and a voltage is not output to the source drive circuit 14.

Further, at times t5 and t6, the output enable signal in the gate drive signal SG8 is turned off. Accordingly, a voltage is not output to the gate signal lines G2 and G3 from the gate drive circuit 13.

For the horizontal synchronizing signal Hsync at succeeding time t7, the data enable signals SG70 are enabled. Therefore, the latch timing signal SG9 is output from the source controller 28a in synchronization with the latch timing signal SG9a.

Further at time t7, the data enable signals SG7D2 and SG70 are enabled. Accordingly, based on the truth table in FIG. 10, the selector 85 outputs the image signal SG21D2 as the image signal SG23 in synchronization with the latch timing signal SG9 at time t7. As a result, the image signal D5 (image signal SG21D2) corresponding to the gate signal line G5 is input from the selector 45 to the source drive circuit 14 as the image signal SG13 in synchronization with the latch timing signal SG9 at time t7.

Moreover, for the latch timing signal SG9 at time t7, a voltage based on the image signal SG13 that has been input to the source drive circuit 14 in synchronization with the latch timing signal SG9 at previous time t4, that is, a voltage corresponding to the image signal D4 is output from the source drive circuit 14 to the source signal lines.

On the other hand, at time t7, the output enable signal in the gate drive signal SG8 is turned on. Accordingly, a gate signal is output to the gate signal line G4. Therefore, a voltage corresponding to the image signal D4 that has been output to the source signal lines from the source drive circuit 14 at time t7 is applied to pixel electrodes.

At times t8 and t9 that come next, the data enable signals SG7D2 and Sg70 are continuously turned on, and the output enable signals in the gate drive signal SG8 are continuously turned on. Thus, similarly to time t7, the same operation is performed. As a result, at times t8 and t9, the image signal G6 and G7 corresponding to image signal D6 and D7 (image signal SG13) is input to source drive circuit 14, respectively. And at times t8 and t9, voltages corresponding to image signal D5 and D6 are applied to pixel electrodes from the source drive circuit 14, respectively.

As described with FIGS. 5 and 6, the standby mode signal SG2 is turned on and the regional signal SGa is turned on. Therefore, image signals D4 to D6 are an image signal SG1 which had been input from outside. As described with FIGS. 5 and 6, the standby mode signal SG2 is turned on and the regional signal SGa is turned off. Therefore, image signal D7 is an image signal SG1b which had been output from the data hold portion.

For the horizontal synchronizing signal Hsync at succeeding time t10, the data enable signals SG70 are enabled. Therefore, the latch timing signal SG9 is output in synchronization with the horizontal synchronizing signal Hsync at time t10. Moreover, for the latch timing signal SG9 at time t10, a voltage based on the image signal SG13 that has been input to the source drive circuit 14 in synchronization with the latch timing signal SG9 at previous time t9, that is, a voltage corresponding to the image signal D7 is output from the source drive circuit 14 to the source signal lines.

On the other hand, at time t8, the output enable signal in the gate drive signal SG8 is turned on. Accordingly, a gate signal is output to the gate signal line G7. Therefore, a voltage corresponding to the image signal D7 is applied to pixel electrodes.

Further at time t7, the data enable signals SG7D2 and SG70 are enabled. And at time t10, the data enable signals SG7 and SG70 are enabled. Accordingly, based on the truth table in FIG. 10, the selector 85 outputs the image signal SG21 as the image signal SG23 in synchronization with the latch timing signal SG9 at time t10. As a result, the selector 45 outputs the image signal D10 (image signal SG21) corresponding to the gate signal line G10 to the source drive circuit 14 as the image signal SG13 in synchronization with the latch timing signal SG9 at time t10. As described with FIGS. 5 and 6, the standby mode signal SG2 is turned on and the regional signal SGa is turned off. Therefore, this image signal D10 is an image signal SG12b which had been output from the data hold portion 36.

For the horizontal synchronizing signal Hsync at succeeding times t10 and t11, the data enable signal SG70 is disabled. Accordingly, based on the truth table in FIG. 10, the selector 85 outputs the image signal SG210 of 0 Gray level as the image signal SG23.

Further, at times t11 and t12, the latch timing signal SG9 is not output from the source controller 28a as the data enable signal SG70 is disabled. Therefore, during this period, image signal is input to source drive circuit 14 and a voltage is not output from the source drive circuit 14.

On the other hand, at times t11 and t12, the output enable signal in the gate drive signal SG8 is turned off. Accordingly, a gate signal is not output from the gate drive circuit 13 to the gate signal lines G8 and G9. As a result, a voltage is not applied to pixel electrodes corresponding to the gate signal line G6 from the source drive circuit 14.

For the horizontal synchronizing signal Hsync at succeeding time t13, the data enable signals SG70 are enabled. Therefore, the latch timing signal SG9 is output in synchronization with the horizontal synchronizing signal Hsync at time t13. Moreover, for the latch timing signal SG9 at time t13, a voltage based on the image signal SG13 that has been input to the source drive circuit 14 in synchronization with the latch timing signal SG9 at previous time t10, that is, a voltage corresponding to the image signal D10 is output from the source drive circuit 14 to source signal lines.

On the other hand, the output enable signal in the gate drive signal SG8 is turned on. Accordingly, a gate signal is output to the gate signal line G10 from the gate drive circuit 13. Therefore, a voltage corresponding to the image signal D10 is applied to pixel electrodes.

For the horizontal synchronizing signal Hsync at succeeding times t14 and t15, the data enable signal SG70 is disabled. Accordingly, based on the truth table in FIG. 10, the selector 85 outputs the image signal SG210 of 0 Gray level as the image signal SG23.

Further, at times t14 and t15, the latch timing signal SG9 is not output from the source controller 28a as the data enable signal SG70 is disabled. Therefore, during this period, image signal is input to source drive circuit 14 and a voltage is not output from the source drive circuit 14.

On the other hand, at times t14 and t15, the output enable signal in the gate drive signal SG8 is turned off. Accordingly, a gate signal is not output from the gate drive circuit 13 to the gate signal lines G11 and G12. In FIG. 11, as gate signals are not output to the gate signal lines G2, G3, G8, G9, G11 and G12, they are indicated by broken lines.

As described in FIG. 11, voltages are input to the gate signal lines G1 to G12 shown in sub-frame SF7 of FIG. 6 by an operation of the gate drive circuit 13 and source drive circuit 14.

In FIG. 12, first, the vertical synchronizing signal Vsync is output and the horizontal synchronizing signal Hsync is output in synchronization with rising of the vertical synchronizing signal Vsync. As time t1 after the vertical synchronizing signal Vsync has been output, the data enable signal SG70 is disabled. Thus at time t1, the latch timing signal SG9 is not output. And based on the truth table in FIG. 10, the selector 85 outputs the image signal SG210 as the image signal SG23.

At succeeding time t2, the data enable signal SG7 is turned on. The time t2 corresponds to the head of the sub-frame after the vertical synchronizing signal Vsync has been output. The selector 75 outputs the data enable signal SG7 as the data enable signal SG70 in synchronization with the horizontal synchronizing signal Hsync at time t2. Therefore, the data enable signals SG7 is enabled. Thus in this time t2, the latch timing signal SG9 is output.

Further in the time t2, the data enable signals SG7 and SG70 are enabled and the data enable signals SG7D1 and SG7D2 are disabled. Accordingly, from the truth table in FIG. 10, the selector 85 outputs the image signal SG21 as the image signal SG23 in synchronization with the latch timing signal SG9 at time t4. As a result, the image signal D2 (image signal SG21) corresponding to the gate signal line G2 is input from the selector 45 to the source drive circuit 14 as the image signal SG13 in synchronization with the latch timing signal SG9 at time t2.

As described with FIGS. 5 and 6, the standby mode signal SG2 is turned on and the regional signal SGa is turned off. Therefore, this image signal D10 is an image signal SG12b which had been output from the data hold portion 36.

For the horizontal synchronizing signal Hsync at succeeding times t3 and t4, the data enable signal SG70 is disabled. Accordingly, from the truth table in FIG. 10, the selector 85 outputs the image signal SG210 of 0 Gray level as the image signal SG23. Further, at times t3 and t4, the latch timing signal SG9 is not output from the source controller 28a as the data enable signal SG70 is disabled. Therefore, during this period, image signal is not input to source drive circuit 14 and a voltage is not output from the source drive circuit 14.

On the other hand, a gate start signal is output at time t0 between time t3 and time t4. Specifically, the gate controller 27 outputs the gate start signal after delay time of a time period (3+Tg)*H (0≤Tg<1) from the rising of the vertical synchronizing signal Vsync. Further, at time t0, the output enable signal in the gate drive signal SG8 is turned off. Thus, the gate signal is not output to the gate signal line G1 by this gate start signal.

Further, at succeeding time t5, the latch timing signal SG9 is output from the source controller 28a as the data enable signal SG70 is enabled. Further in the time t5, the data enable signals SG7D1 and SG70 are enabled and the data enable signals SG7D2 is disabled. Accordingly, based on the truth table in FIG. 10, the selector 85 outputs the image signal SG21D1 as the image signal SG23 in synchronization with the latch timing signal SG9 at time t5. As a result, the image signal D4 (image signal SG21D1) corresponding to the gate signal line G4 is input from the selector 45 to the source drive circuit 14 as the image signal SG13 in synchronization with the latch timing signal SG9 at time t5.

Further in the latch timing signal SG9 at time t5, a voltage based on image signal SG13 which had been input to the source drive circuit 14 in synchronization with the latch timing signal SG9 at previous time t2, that is, the voltage corresponding to image signal D2 is input from the source drive circuit 14 to the source signal lines.

At this time t5, the output enable signal in the gate drive signal SG8 is turned on. Accordingly, a gate signal corresponding to the gate signal lines G2 is output in synchronization with this gate shift clock signal to the gate signal line G7. Therefore, a voltage corresponding to the image signal D2 is applied to pixel electrodes at time t5.

For the horizontal synchronizing signal Hsync at succeeding time t6, the data enable signal SG70 is disabled. Accordingly, based on the truth table in FIG. 10, the selector 85 outputs the image signal SG210 of 0 Gray level as the image signal SG23. Further, at time t6, the latch timing signal SG9 is not output from the source controller 28a, as the data enable signal SG70 is disabled. Therefore, at time t6, image signal is not input to source drive circuit 14 and a voltage is not output from the source drive circuit 14. Further, at time t6, the output enable signal in the gate drive signal SG8 is turned off. Thus, the gate signal is not output to the gate signal line from the gate drive circuit 13.

For the horizontal synchronizing signal Hsync at succeeding times t7 and t8, the data enable signal SG70 is enabled, respectively. Therefore, the latch timing signal SG9 is output in synchronization with the horizontal synchronizing signal Hsync at times t7 and t8.

Further in the times t7 and t8, the data enable signals SG7D2 and SG70 are enabled. Accordingly, based on the truth table in FIG. 10, the selector 85 outputs the image signal SG21D2 as the image signal SG23 in synchronization with the latch timing signals SG9 at times t7 and t8, respectively. As a result, the image signals D5 and D6 (image signal SG21D1) corresponding to the gate signal lines G5 and G6 are input from the selector 45 to the source drive circuit 14 as the image signal SG13 in synchronization with the latch timing signal SG9 at times t7 and t8, respectively.

As described with FIGS. 5 and 6, the standby mode signal SG2 is turned on and the regional signal SGa is turned on. Therefore, the image signals D4 to D6 are image signals SG1 which had been input from outside.

Further in the latch timing signal SG9 at times t7 and t8, voltages based on image signal SG13 which had been input to the source drive circuit 14 in synchronization with the latch timing signal SG9 at previous times t5 and t7, that is, the voltage corresponding to image signal D1 is input from the source drive circuit 14 to the source signal lines, respectively.

On the other hand, at the times t7 and t8, the output enable signal in the gate drive signal SG8 is turned on. Thus, gate signals are output to the gate signal lines G4 and G5. Therefore, voltages corresponding to the image signals D4 and D5 are applied to pixel electrodes from the source drive circuit 14.

Similarly to time t5, at the succeeding time t9, the image signal D8 (image signal SG21D1) corresponding to the gate signal line G8 as the image signal SG13 from the selector 45 to the source drive circuit in synchronization with the latch timing signal SG9. As described with FIGS. 5 and 6, the standby mode signal SG2 is turned on and the regional signal SGa is turned off. Therefore, this image signal D8 is an image signal SG12*b* which had been output from the data hold portion 36.

Further in the latch timing signal SG9 at time t5, a voltage based on image signal SG13 which had been input to the source drive circuit 14 in synchronization with the latch timing signal SG9 at previous time t8, that is, the voltage corresponding to image signal D6 is input from the source drive circuit 14 to the source signal lines. And in this time t9, a voltage corresponding to the image signal D6 is input from the source drive circuit 14 to pixel electrodes Similarly to time 6, at succeeding time t10, the latch timing signal SG9 is not output from the source controller 28*a*. Therefore, at time t10, image signal is not input to source drive circuit 14 and a voltage is not output from source drive circuit 14. Further, similarly to time 6, gate signal is not output to gate signal line G7 from the gate drive circuit 13 at time 10.

At the succeeding times t11, the data enable signal SG70 is enabled. Therefore, the latch timing signal SG9 is output in synchronization with the horizontal synchronizing signal Hsync at time t11. Similarly to time 2, the selector 45 outputs the image signal D11 (image signal SG21) corresponding to the gate signal line G11 from the selector 45 to the source drive circuit 14 as the image signal SG13 in synchronization with the latch timing signal SG9 at time t11. As described with FIGS. 5 and 6, the standby mode signal SG2 is turned on and the regional signal SGa is turned off. Therefore, this image signal D11 is an image signal SG12*b* which had been output from the data hold portion 36.

Further in the latch timing signal SG9 at time t11, a voltage based on image signal SG13 which had been input to the source drive circuit 14 in synchronization with the latch timing signal SG9 at previous time t9, that is, the voltage corresponding to image signal D8 is input from the source drive circuit 14 to the source signal lines. And in this time t11, a voltage corresponding to the image signal D8 is input from the source drive circuit 14 to pixel electrodes Similarly to time t6, at succeeding to times t11 and t12, the latch timing signal SG9 is not output from the source controller 28*a*. Therefore, during this period, image signal is not input to source drive circuit 14 and a voltage is not output from the source drive circuit 14. Similarly to time 6, at times t12 and t13, gate signals are not output to gate signal lines G9 and G10 from the gate drive circuit 13.

Further in the latch timing signal SG9 at time t14, a voltage based on image signal SG13 which had been input to the source drive circuit 14 in synchronization with the latch timing signal SG9 at previous time t11, that is, the voltage corresponding to image signal D6 is input from the source drive circuit 14 to the source signal lines. And in this time t14, a voltage corresponding to the image signal D11 is input from the source drive circuit 14 to pixel electrodes Similarly to time 6, at succeeding time t15, the latch timing signal SG9 is not output from the source controller 28*a*. Therefore, at time t15, image signal is not input to source drive circuit 15 and a voltage is not output from source drive circuit 14. Further, similarly to time 6, at the time 15, gate signal is not output to gate signal line G12 from the gate drive circuit 13. In FIG. 12, as gate signals are not output to the gate signal lines G1, G3, G7, G9, G10 and G12, they are indicated by broken lines.

In FIG. 13, first, the vertical synchronizing signal Vsync is output and the horizontal synchronizing signal Hsync is output in synchronization with rising of the vertical synchronizing signal Vsync. As times t1 and t2 after the vertical synchronizing signal Vsync has been output, the data enable signal SG70 is disabled. Thus at these times t1 and t2, the latch timing signal SG9 is not output. And based on the truth table in FIG. 10, the selector 85 outputs the image signal SG210 as the image signal SG23.

At succeeding time t3, the data enable signal SG7 is turned on. The time t3 corresponds to the head of the sub-frame after the vertical synchronizing signal Vsync has been output. The selector 75 outputs the data enable signal SG7 as the data enable signal SG70 in synchronization with the horizontal synchronizing signal Hsync at time t3. Therefore, the data enable signals SG7 is enabled. Thus in this time t3, the latch timing signal SG9 is output.

Further in the time t3, the data enable signals SG7 and SG70 are enabled and the data enable signals SG7D1 and SG7D2 are disabled. Accordingly, based on the truth table in FIG. 10, the selector 85 outputs the image signal SG21 as the image signal SG23 in synchronization with the latch timing signal SG9 at time t3. As a result, the image signal D3 (image signal SG21) corresponding to the gate signal line G3 is input from the selector 45 to the source drive circuit 14 as the image signal SG13 in synchronization with the latch timing signal SG9 at time t3.

As described with FIGS. 5 and 6, the standby mode signal SG2 is turned on and the regional signal SGa is turned off. Therefore, this image signal D3 is an image signal SG12*b* which had been output from the data hold portion 36.

For the horizontal synchronizing signal Hsync at succeeding times t4 and t5, the data enable signal SG70 is disabled. Accordingly, from the truth table in FIG. 10, the selector 85 outputs the image signal SG210 of 0 Gray level as the image signal SG23. Further, at times t4 and t5, the latch timing signal SG9 is not output from the source controller 28*a* as the data enable signal SG70 is disabled. Therefore, during this period, image signal is not input to source drive circuit 14 and a voltage is not output from the source drive circuit 14.

On the other hand, a gate start signal is output at time t0 between time t3 and time t4. Specifically, the gate controller 27 outputs the gate start signal after delay time of a time period (3+Tg)*H (0≤Tg<1) from the rising of the vertical synchronizing signal Vsync. Further, at time t0 and next gate shift clock signal, the output enable signal in the gate drive signal SG8 is turned off. Thus, the gate signal is not output to the gate signal lines G1 and G2. Accordingly, gate signal is not output to the gate signal lines G1 and G2.

Further, at succeeding time t6, the latch timing signal SG9 is output from the source controller 28*a* as the data enable signal SG70 is enabled. Further in the time t6, the data enable signals SG7D2 and SG70 are enabled. Accordingly, based on the truth table in FIG. 10, the selector 85 outputs the image signal SG21D2 as the image signal SG23 in synchronization with the latch timing signal SG9 at time t6. As a result, the image signal D4 (image signal SG21D2) corresponding to the gate signal line G4 is input from the selector 45 to the source drive circuit 14 as the image signal SG13 in synchronization with the latch timing signal SG9 at time t6.

Further in the latch timing signal SG9 at time t6, a voltage based on image signal SG13 which had been input to the source drive circuit 14 in synchronization with the latch timing signal SG9 at previous time t3, that is, the voltage corresponding to image signal D3 is input from the source drive circuit 14 to the source signal lines.

At this time t6, the output enable signal in the gate drive signal SG8 is turned on. Accordingly, a gate signal corresponding to the gate signal lines G3 is output in synchronization with this gate shift clock signal to the gate signal line G3. Therefore, a voltage corresponding to the image signal D3 is applied to pixel electrodes at time t6.

Similarly to time t6, at the succeeding times t7 and t8, the image signals D5 and D6 (image signal SG21D2) corresponding to the gate signal lines G5 and G6 as the image signal SG13 from the selector 45 to the source drive circuit in synchronization with the latch timing signal SG9.

As described with FIGS. 5 and 6, the standby mode signal SG2 is turned on and the regional signal SGa is turned on. Therefore, this image signals D4 to D6 are image signals SG1 which had been input from outside.

Further in the latch timing signal SG9 at times t7 and t8, voltages based on image signal SG13 which had been input to the source drive circuit 14 in synchronization with the latch timing signal SG9 at previous times t6 and t7, that is, the voltage corresponding to image signals D4 and D5 are output from the source drive circuit 14 to the source signal lines, respectively. And in these times t7 and t9, voltages corresponding to the image signals D4 and D5 are input from the source drive circuit 14 to pixel electrodes, respectively.

Similarly to time t2, at the succeeding time t9, the image signal D9 (image signal SG21) corresponding to the gate signal line G9 as the image signal SG13 is output from the selector 45 to the source drive circuit 14 in synchronization with the latch timing signal SG9. As described with FIGS. 5 and 6, the standby mode signal SG2 is turned on and the regional signal SGa is turned on. Therefore, this image signal D9 is an image signal SG12b which had been output from the data hold portion 36.

Further in the latch timing signal SG9 at times t9, a voltages based on image signal SG13 which had been input to the source drive circuit 14 in synchronization with the latch timing signal SG9 at previous times t8, that is, the voltage corresponding to image signals D6 is input from the source drive circuit 14 to the source signal lines. And at time t9, the voltage corresponding to the image signal D6 is input from the source drive circuit 14 to pixel electrodes Similarly to times 4 and 5, at succeeding times t10 and t11, the latch timing signal SG9 is not output from the source controller 28a. Therefore, at times t10 and t11, image signal is not input to source drive circuit 14 and a voltage is not output from source drive circuit 14. Further, similarly to times 4 and t5, at times t10 and t11, gate signal is not output to gate signal lines G7 and G8 from the gate drive circuit 13.

Similarly to time t2, at the succeeding time t12, the image signal D12 (image signal SG21) corresponding to the gate signal line G12 as the image signal SG13 in synchronization with the latch timing signal SG12. As described with FIGS. 5 and 6, the standby mode signal SG2 is turned on and the regional signal SGa is turned off. Therefore, this image signal D12 is an image signal SG12b which had been output from the data hold portion 36.

Further in the latch timing signal SG9 at times t12, a voltages based on image signal SG9 which had been input to the source drive circuit 14 in synchronization with the latch timing signal SG9 at previous time t9, that is, the voltage corresponding to image signals D9 is output from the source drive circuit 14 to the source signal lines. And at time t11, the voltage corresponding to the image signals D9 is input from the source drive circuit 14 to pixel electrodes Similarly to times 4 and 5, at succeeding times t13 and t14, the latch timing signal SG9 is not output from the source controller 28a. Therefore, during this period, image signal is not input to source drive circuit 14 and a voltage is not output from source drive circuit 14. Further, similarly to times 4 and t5, at times t13 and t14, gate signal is not output to gate signal lines G10 and G11 from the gate drive circuit 13.

Further in the latch timing signal SG9 at time t15, a voltage based on image signal SG9 which had been input to the source drive circuit 14 in synchronization with the latch timing signal SG9 at previous time t12, that is, the voltage corresponding to image signal D12 is input from the source drive circuit 14 to the source signal lines. And in this time t15, a voltage corresponding to the image signal D12 is input from the source drive circuit 14 to pixel electrodes. In FIG. 13, gate signals are not output to the gate signal lines G1, G2, G7, G8, G10, and G11. Therefore these gate signal lines G1, G2, G7, G8, G10, and G11 are indicated by broken lines.

Here, in the low frequency control mode MD2 shown in FIG. 11, a description will be given of a relation between an interval between scan target signal lines, and the number of lines to be delayed for the image signal SG21 by the data delay portion 62. Gate signal lines to which a gate signal is output from the gate drive circuit 13 are defined as the scan target signal lines.

In the low frequency control mode MD2 in FIG. 11, the gate signal line G4, for example, is a scan target signal line that is being selected. Here, the gate signal lines G2 and G4 are not selected as a scan target signal line as described above. Accordingly, the gate signal line G4 that is the selected scan target signal line is an L-th line from the gate signal line G1 that is a previous scan target signal line (L=3 in FIG. 11). Therefore, the image signal SG21 obtained by delaying the image signal SG21 by (K−L)=0 lines is input as the image signal SG13 corresponding to the gate signal line G3 from the selector 45 to the source drive circuit 14.

In the low frequency control mode in FIG. 11, the gate signal line G5, for example, is a scan target signal line that is being selected. Accordingly, the gate signal line G5 that is the selected scan target signal line is an L-th line from the gate signal line G4 that is a previous scan target signal line (L=1 in FIG. 11). Therefore, the image signal SG21D2 obtained by delaying the image signal SG21 by (K−L)=2 lines is input as the image signal SG13 corresponding to the gate signal line G5 from the selector 45 to the source drive circuit 14.

In the low frequency control mode in FIG. 11, the gate signal line G6, for example, is a scan target signal line that is being selected. Accordingly, the gate signal line G6 that is the selected scan target signal line is an L-th line from the gate signal line G4 that is a previous scan target signal line (L=1 in FIG. 11). Therefore, the image signal SG21D2 obtained by delaying the image signal SG13 by (K−L)=2 lines is input as the image signal SG21 corresponding to the gate signal line G5 from the selector 45 to the source drive circuit 14.

Similarly to the gate signal lines G5 and G6, in a case of the gate signal line G7, an image signal SG21D2 which is image signal SG21 delayed by (K−L)=2 lines is input to the source drive circuit 14 to the source drive circuit 14 as the image signal SG13 corresponding to the gate signal line G7.

In the low frequency control mode in FIG. 11, the gate signal line G10, for example, is a scan target signal line that is being selected. Here, the gate signal lines G8 and G9 are not selected as a scan target signal line as described above. Accordingly, the gate signal line G10 that is the selected scan target signal line is an L-th line from the gate signal line G7 that is a previous scan target signal line (L=3 in FIG. 11). Therefore, the image signal SG21 obtained by delaying the image signal SG21 by (K−L)=0 line is input as the image signal SG13 corresponding to the gate signal line G10 from the selector 45 to the source drive circuit 14.

In this manner, in the low frequency control mode MD2, if the selected scan target signal line is the L-th line from the previous scan target signal line (L is an integer that is not less than 1 and not greater than K), the data controller 30a delays an image signal corresponding to the selected scan target signal line by (K−L) lines, and outputs the delayed image signal to the source drive circuit 14.

Next, in the low frequency control mode MD2 shown in FIG. 14, a description will be given of a relation between an interval of the latch timing signal SG9, a gate signal line corresponding to the image signal input to the source drive circuit 14 in synchronization with the latch timing signal, and a gate signal line corresponding to a voltage output from the source drive circuit 14 in synchronization with the latch timing signal.

In the low frequency control mode shown in FIG. 11, the source controller 28a changes the interval of the latch timing signal SG9 to be input to the source drive circuit 14 according to the interval between lines of the scanning for outputting a gate signal to the gate signal lines within a range of a period (1 to K)*H, that is, a period (1 to 3)*H.

Here, I(J) is a number of the gate signal line, counted in a sub-scanning direction, corresponding to an image signal input to the source drive circuit 14 in synchronization with the latch timing signal SG9 that comes J-th. Further, O(J) is a number of the gate signal line, counted in a sub-scanning direction, corresponding to a voltage output from the source drive circuit 14 in synchronization with the latch timing signal SG9 that comes J-th.

Figure 14:
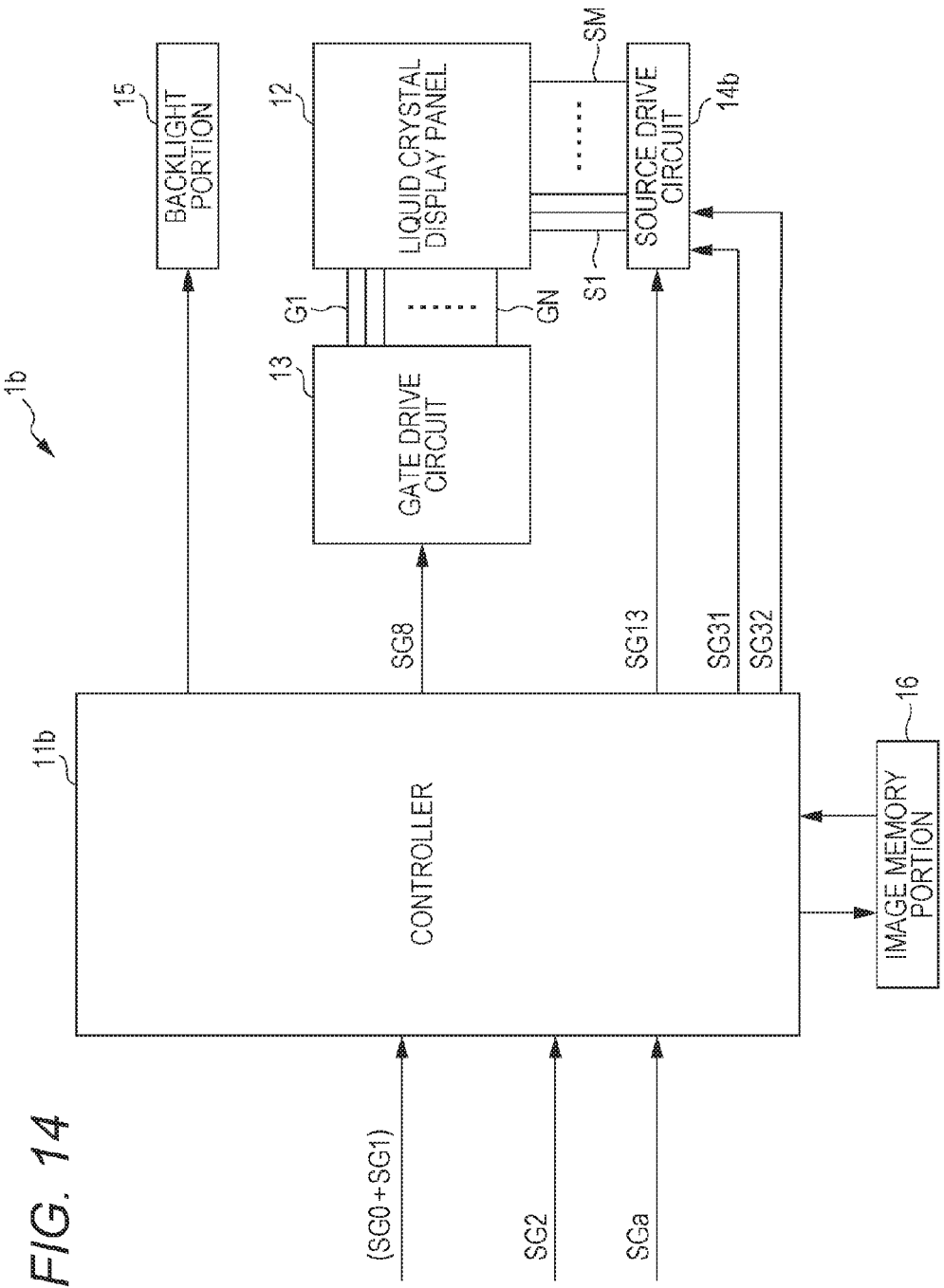
FIG. 14 is a block diagram showing a configuration of a display device according to a third embodiment.

An interval between the latch timing signal SG9 that comes second from the vertical synchronizing signal Vsync (time t4) and the latch timing signal SG9 that comes third from the vertical synchronizing signal Vsync (time t7) is a period P*H (P=3 in FIG. 14). On the other hand, a gate signal line I(2) corresponding to the image signal SG13 input to the source drive circuit 14 in synchronization with the second latch timing signal SG9 is the gate signal line G4. Further, a gate signal line O(2) corresponding to the voltage output from the source drive circuit 14 in synchronization with the second latch timing signal SG9 is the gate signal line G1. Therefore, a relation of I(2)=O(2)+3 is established.

An interval between the latch timing signal SG9 that comes third from the vertical synchronizing signal Vsync (time t7) and the latch timing signal SG9 that comes fourth from the vertical synchronizing signal Vsync (time t8) is a period P*H (P=1 in FIG. 11). On the other hand, a gate signal line I(3) corresponding to the image signal SG13 input to the source drive circuit 14 in synchronization with the third latch timing signal SG9 (the image signal D4) is the gate signal line G5. Further, a gate signal line O(3) corresponding to the voltage output from the source drive circuit 14 in synchronization with the third latch timing signal SG9 is the gate signal line G4. Therefore, a relation of I(3)=O(3)+1 is established.

An interval between the latch timing signal SG9 that comes fourth from the vertical synchronizing signal Vsync (time t8) and the latch timing signal SG9 that comes fifth from the vertical synchronizing signal Vsync (time t9) is a period P*H (P=1 in FIG. 11). On the other hand, a gate signal line I(4) corresponding to the image signal SG13 input to the source drive circuit 14 in synchronization with the fourth latch timing signal SG9 is the gate signal line G6. Further, a gate signal line O(4) corresponding to the voltage output from the source drive circuit 14 in synchronization with the fourth latch timing signal SG9 (the image signal D4) is the gate signal line G5. Therefore, a relation of I(4)=O(4)+1 is established.

In this manner, in the first shift control mode MD2, the data controller 30a changes the interval of the latch timing signal SG9 to be input to the source drive circuit 14 within the range of the period (1 to K)*H according to the interval between lines of the scanning for outputting a gate signal to the gate signal lines. Then, a relation of I(J)=O(J)+P is established when an interval between the J-th latch timing signal SG9 and the (J+1)-th latch timing signal SG9 from the vertical synchronizing signal Vsync (J is an integer that is not less than 2) is the period P*H (P is an integer that is not less than 1 and not greater than K).

Next, in the low frequency control mode MD2 shown in FIG. 11, a description will be given of a relation between an interval of scanning of the gate signal lines and a voltage (image signal) output from the source drive circuit 14.

In the first shift control mode shown in FIG. 11, the gate drive circuit 13 first scans the first gate signal line G1, and then the fourth gate signal line G4, for example. In this case, the data controller 30a causes the source drive circuit 14 to output a voltage (the image signal D1) output from the source drive circuit 14 in response to the scanning of the first gate signal line G1 continuously for three horizontal scanning period 3H. Specifically, for one horizontal scanning period 1H corresponding to the gate signal line G2 that is not scanned, a voltage output corresponding to the gate signal line G1 is continuously output.

Further, the gate drive circuit 13 scans, for example, the fourth gate signal line G4, and then the fifth gate signal line G5. In this case, the data controller 30a causes the source drive circuit 14 to output a voltage output from the source drive circuit 14 in response to the scanning of the fourth gate signal line G4 continuously for one horizontal scanning period 1H.

Further, the gate drive circuit 13 scans, for example, the fifth gate signal line G5, and then the sixth gate signal line G6. In this case, the data controller 30a causes the source drive circuit 14 to output a voltage output from the source drive circuit 14 in response to the scanning of the fifth gate signal line G5 continuously for one horizontal scanning period 1H.

Further, the gate drive circuit 13 scans, for example, the seventh gate signal line G7, and then the tenth gate signal line G10. In this case, the data controller 30a causes the source drive circuit 14 to output a voltage output from the source drive circuit 14 in response to the scanning of the seventh gate signal line G7 continuously for three horizontal scanning period 3H. Specifically, for two horizontal scanning period 2H corresponding to the gate signal lines G8 and G9 that are not scanned, a voltage output corresponding to the gate signal line G7 is continuously output.

In this manner, in the low frequency control mode MD2, in a case in which the gate drive circuit 13 first scans a U-th gate signal line out of the N gate signal lines (U is an integer that is not less than 1 and less than N), and then a (U+V)-th gate signal line (V is an integer that is not less than 1 and not greater than K), the data controller 30a causes the source drive circuit 14 to output a voltage output from the source drive circuit 14 in response to scanning of the U-th gate signal line continuously for V horizontal scanning period V*H (V times of the horizontal scanning period 1H).

Next, in the low frequency control mode MD2 shown in FIG. 12, a description will be given of a relation between an delay value DL1 by which the image signal SG13 input to the source drive circuit 14 in synchronization with the latch timing signal SG9 is delayed to output to the gate signal lines in synchronization with the succeeding latch timing signal SG9 (that is, a interval of the latch timing signals SG9 output from the source controller 28a to the source drive circuit 14) and an delay value DL2 by which the image signal SG23 output from the selector 45 is delay (that is, the delay value of the image signal SG13 which is output from the selector 45 to the source drive circuit 14).

In the second embodiment, the frame frequency F1 in the basic control mode MD1 is expressed by F1=60 Hz, and the frame frequency F2 in the low frequency control mode F2 is expressed by F2=15 Hz. Therefore, K is expressed by K=F1/F2=3. Thus, the gate signal lines are subjected to interlaced scanning every three gate signal lines.

The image signal D2 corresponding to the gate signal line G4 (image signal SG13) input in synchronization with the latch timing signal SG9 at time t2 is output in synchronization with the latch timing signal SG9 at time t5. Specifically, the image signal D2 corresponding to the gate signal line G2 (image signal SG13) input in synchronization with the latch timing signal SG9 at time t2 is delayed to output to the source signal lines by three horizontal scanning period 3H. Therefore, the delay value DL1 is expressed by DL1=3. And in the latch timing signal SG9 at time t2, the image signal SG21 (image signal D2) which is delayed by the delay value DL2 which is expressed by DL2=0 is output from the selector 45 to the source drive circuit 14 as the image signal SG13.

The image signal D4 corresponding to the gate signal line G4 (image signal SG13) input in synchronization with the latch timing signal SG9 at time t5 is output in synchronization with the latch timing signal SG9 at time t7. Specifically, the image signal D4 corresponding to the gate signal line G4 (image signal SG13) input in synchronization with the latch timing signal SG9 at time t5 is delayed to output to the source signal lines by two horizontal scanning period 2H. Therefore, the delay value DL1 is expressed by DL1=2. And in the latch timing signal SG9 at time t5, the image signal SG21D1 (image signal D4) which is delayed by the delay value DL2 which is expressed by DL2=1 is output from selector 45 to the source drive circuit 14 as the image signal SG13. Further, in the latch timing signal SG9 at time t5, a voltage based on image signal D2 corresponding to the gate single line G2 which had been input to the source drive circuit 14 in synchronization with the latch timing signal SG9 at the previous time t2. This output of the voltage matches the gate signal of the gate signal line G4.

The image signal D5 corresponding to the gate signal line G5 (image signal SG13) input in synchronization with the latch timing signal SG9 at time t7 is output in synchronization with the latch timing signal SG9 at time t8. Specifically, the image signal D4 corresponding to the gate signal line G9 (image signal SG13) input in synchronization with the latch timing signal SG9 at time t7 is delayed to output to the source signal lines by one horizontal scanning period 1H. Therefore, the delay value DL1 is expressed by DL1=1. And in the latch timing signal SG9 at time t7, the image signal SG21D2 (image signal D5) which is delayed by the delay value DL2 which is expressed by DL2=2 is output from selector 45 to the source drive circuit 14 as the image signal SG13. Further, in the latch timing signal SG9 at time t7, a voltage based on image signal D4 corresponding to the gate single line G4 which had been input to the source drive circuit 14 in synchronization with the latch timing signal SG9 at the previous time t5. This output of the voltage matches the gate signal of the gate signal line G4.

As described above, DL1+DL2=3 is always satisfied. As described above, in the second embodiment, as K is expressed by K=3, the gate signal lines are subjected to interlaced scanning every three gate signal lines. Thus, when the latch timing signal SG9 at time 2 is output as the image signal SG13 to the gate signal line G2 which is subjected to interlaced scanning, the next time when the latch timing signal SG9 is output is time t5 in the interval of three horizontal scanning period 3H. Specifically, the delay value DL1 of the data enable signal SG70 output from the selector 75 to the source controller is expressed by DL1=3. In these cases, the delay value DL2 of the image signal SG23 output from the selector 85 is expressed by DL2=0.

On the other hand, in the second embodiment, as described above, although the control mode is the low frequency control mode MD2, a part of gate signal lines are subjected to the progressive scanning. Thus gate signal is output to gate signal lines other than the gate signal lines which are subjected to interlaced scanning.

In this manner, when the latch timing signal SG9 at time 5 is output as the image signal SG13 to the gate signal line G4 other than the gate signal lines which are subjected to interlaced scanning, the next time when the latch timing signal SG9 is output is time t7 in the interval of two horizontal scanning period 2H. Specifically, the delay value DL1 of the data enable signal SG70 output from the selector 75 to the source controller is expressed by DL1=2. In these cases, the delay value DL2 of the image signal SG23 output from the selector 85 is expressed by DL2=1.

Similarly, when the latch timing signal SG9 at time 7 is output as the image signal SG13 to the gate signal line G5 other than the gate signal lines which are subjected to interlaced scanning, the next time when the latch timing signal SG9 is output is time t8 in the interval of one horizontal scanning period 1H. Specifically, the delay value DL1 of the data enable signal SG70 output from the selector 75 to the source controller is expressed by DL1=1. In these cases, the delay value DL2 of the image signal SG23 output from the selector 85 is expressed by DL2=2.

In this manner, when gate signals are output to gate signals which are subjected to interlaced scanning not every three lines, in order to output signals to proper gate signal lines, the delay value DL1 is expressed by DL1=1 or 2, in different from DL1=3. In this case, in order to adjust to a case different from DL=3, the delay value DL2 is set to satisfy DL1+DL2=K. With this, for gate signal lines which are subjected to interlaced scanning not every three lines, a voltage is output from the source drive circuit 14 matching a gate signal output from the gate drive circuit 13 to the gate signal lines.

Next, a description will be given of delay time of an image signal input to the source drive circuit 14 in the low frequency control mode MD2 shown in FIG. 12.

The image signal D2 corresponding to the gate signal line G2 is input as the image signal SG13 to the source drive circuit 14 in synchronization with the latch timing signal SG9 at time t2 without delay from the selector 45 of the data controller 30a. On the other hand, for the image signal D4 corresponding to the gate signal line G4, the image signal SG21D1 obtained by delaying the image signal SG21 by one horizontal scanning period 1H is input as the image signal SG13 to the source drive circuit 14 in synchronization with the latch timing signal SG9 at time t5. Further, for the image signal D5 corresponding to the gate signal line G5, the image signal SG21D2 obtained by delaying the image signal SG21 by two horizontal scanning period 2H is input as the image signal SG13 to the source drive circuit 14 in synchronization with the latch timing signal SG9 at time t7.

In this manner, as K=3 in the low frequency control mode MD2 in the second embodiment, the data controller 30*a* delays the image signal SG21 by a period C*H (C is an integer expressed by 0≤C≤(K−1)), inputs the delayed image signal to the source drive circuit 14.

Next, in the low frequency control mode MD2 shown in FIG. 12, a description will be given of a relation between delay time of a gate start signal in the gate drive signal SG8 output from the gate controller 27 and timing for outputting an image signal to be first input to the source drive circuit 14 after the vertical synchronizing signal Vsync.

As described above, in the second embodiment, the gate controller 27 delays timing for outputting a gate start signal by the time period (K−1)*H in the low frequency shift control mode MD2 than in the basic control mode MD1.

On the other hand, as shown in FIG. 12, the image signal D2 first input to the source drive circuit 14 after the vertical synchronizing signal Vsync is input as the image signal SG13 from the selector 45 of the data controller 30*a* to the source drive circuit 14 in synchronization with the latch timing signal SG9 at time t2. Then, the image signal D2 is output from the source drive circuit 14 in synchronization with the latch timing signal SG9 at time t5 after a period 3H lapses.

In this manner, as K=3 in the low frequency control mode MD2 in the second embodiment, the source controller 28*a* outputs the latch timing signal SG9 to the source drive circuit 14 such that the image signal D1 first input to the source drive circuit 14 after the vertical synchronizing signal Vsync is output from the source drive circuit 14 after a period K*H lapses from a time point at which the image signal D1 is input. With this, the first image signal D2 is output from the source drive circuit 14 matching a gate signal output from the gate drive circuit 13 to the gate signal line G2.

As described above, in the second embodiment, it is controlled whether the latch timing signal SG9 is output or not according to the turning on and off of the data enable signal SG70. Thus, it is possible to reduce power consumption as compared to the first embodiment in which the latch timing signal SG9 is output every time the horizontal synchronizing signal Hsync is output.

With a common source drive circuit, the latch timing signal for controlling timing of the source drive circuit has an address reset function of determining a leading pixel of the image signal, and a latch output function of outputting an image signal taken in the source drive circuit to a source signal line. In the second embodiment, even when the interval between the scan target signal lines among the gate signal lines is not constant, it is possible to match a gate signal line to which a gate signal is output from the gate drive circuit 13 with a voltage corresponding to an image signal output to the source signal line from the source drive circuit 14 using such a common source drive circuit. As a result, according to the second embodiment, it is possible to display a desired image based on an input image signal, and to reduce power consumption without using any special source drive circuit.

Third Embodiment

Figure 15:
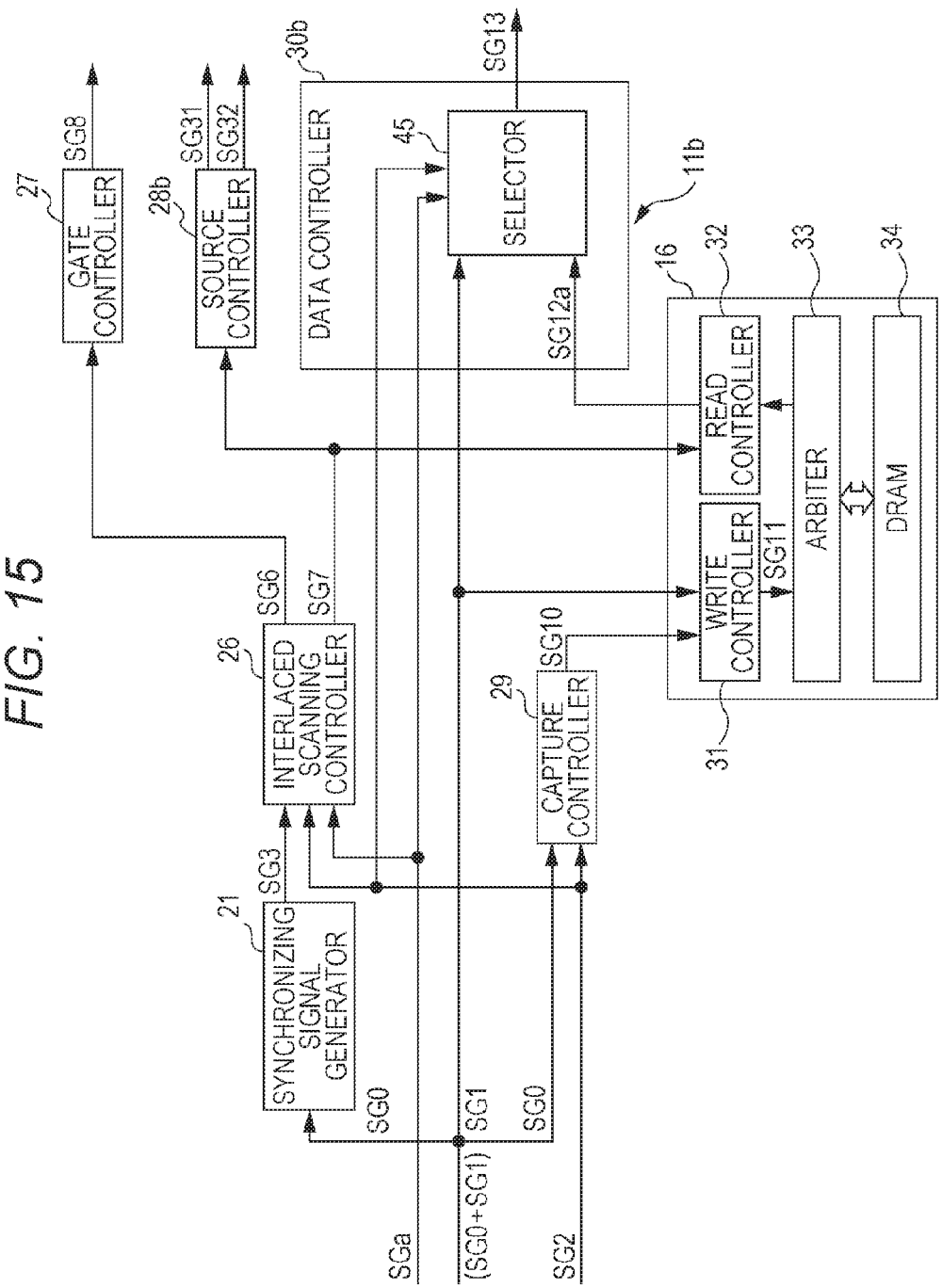
FIG. 15 is a block diagram showing a configuration of a controller and an image memory portion of the display device shown in FIG. 15 according to the third embodiment.

FIG. 14 is a block diagram showing a configuration of a display device according to a third embodiment. FIG. 15 is a block diagram showing a configuration of a controller and an image memory portion of the display device shown in FIG. 15 according to the third embodiment. In the third embodiment, similar components as in the first embodiment are denoted by similar reference numerals.

Referring to FIG. 14, a display device 1*b* according to the third embodiment includes a controller 11*b* and a source drive circuit 14*b* respectively in place of the controller 11 and the source drive circuit 14, and the image memory portion 16 of the display device 1 according to the first embodiment shown in FIG. 1. In the third embodiment, similarly to the first embodiment, the frame frequency F1 in the basic control mode is expressed by F1=60 Hz, and the frame frequency F2 in the low frequency control mode is expressed by F2=15 Hz. Hereinafter, the third embodiment will be described focusing on differences from the first embodiment.

Referring to FIG. 15, the controller 11*b* includes the synchronizing signal generator 21, the interlaced scanning controller 26, the gate controller 27, a source controller 28*b*, the capture controller 29, and the data controller 30*b*. the data controller 30*b* includes a selector 45.

The source controller 28*b* generates a data reset signal SG31 based on a data enable signal SG7 from the interlaced scanning controller 26. The source controller 28*b* outputs the generated data reset signal SG31 to the source drive circuit 14*b* in synchronization with the horizontal synchronizing signal Hsync. Further, the source controller 28*b* generates a data latch signal SG32. The source controller 28*b* outputs the generated data latch signal SG32 to the source drive circuit 14*b* in synchronization with the horizontal synchronizing signal Hsync.

The data reset signal SG31 and the data latch signal SG32 are for controlling operational timing of the source drive circuit 14*b*. The data reset signal SG31 is a signal indicating the beginning of data for the source drive circuit 14*b* to start loading the data. The image signal SG13 that is input from the selector 45 to the source drive circuit 14*b* is input in synchronization with the data reset signal SG31.

The data latch signal SG32 is a signal indicating timing for the source drive circuit 14*b* to output a voltage based on the loaded data. The source drive circuit 14*b* outputs a voltage based on the input image signal SG13 to the source signal lines in synchronization with the data latch signal SG32.

In this manner, in the third embodiment, the functions of the latch timing signal SG9 according to the first embodiment and the second embodiment are divided into two kinds of signal; the data reset signal SG31 and the data latch signal SG32. And the controller 11*b* in the third embodiment does not include the data hold portion in different from the second embodiment. Thus, an image signal SG12*a* output from the read controller 32 is input to the selector 45 directly.

When the standby mode signal SG2 is turned off, the selector 45 outputs the image signal SG1 to the source drive circuit 14 as the image signal SG13. And when the standby mode signal SG2 is turned on and the regional signal SGa is turned on, the selector 45 outputs the image signal SG1 included in input signals to the source drive circuit 14 as the image signal SG13. And when the standby mode signal SG2 is turned on and the regional signal SGa is turned off, the selector 45 outputs the image signal SG12*a* which had been output from the read controller 32 to the source drive circuit 14 as the image signal SG13. In this embodiment, the liquid crystal display panel 12 corresponds to one example of the display portion, the gate drive circuit 13 corresponds to one example of the gate driver, the source drive circuit 14 corresponds to one example of the source driver, and the DRAM 34 corresponds to one example of the image storage.

Figure 16:
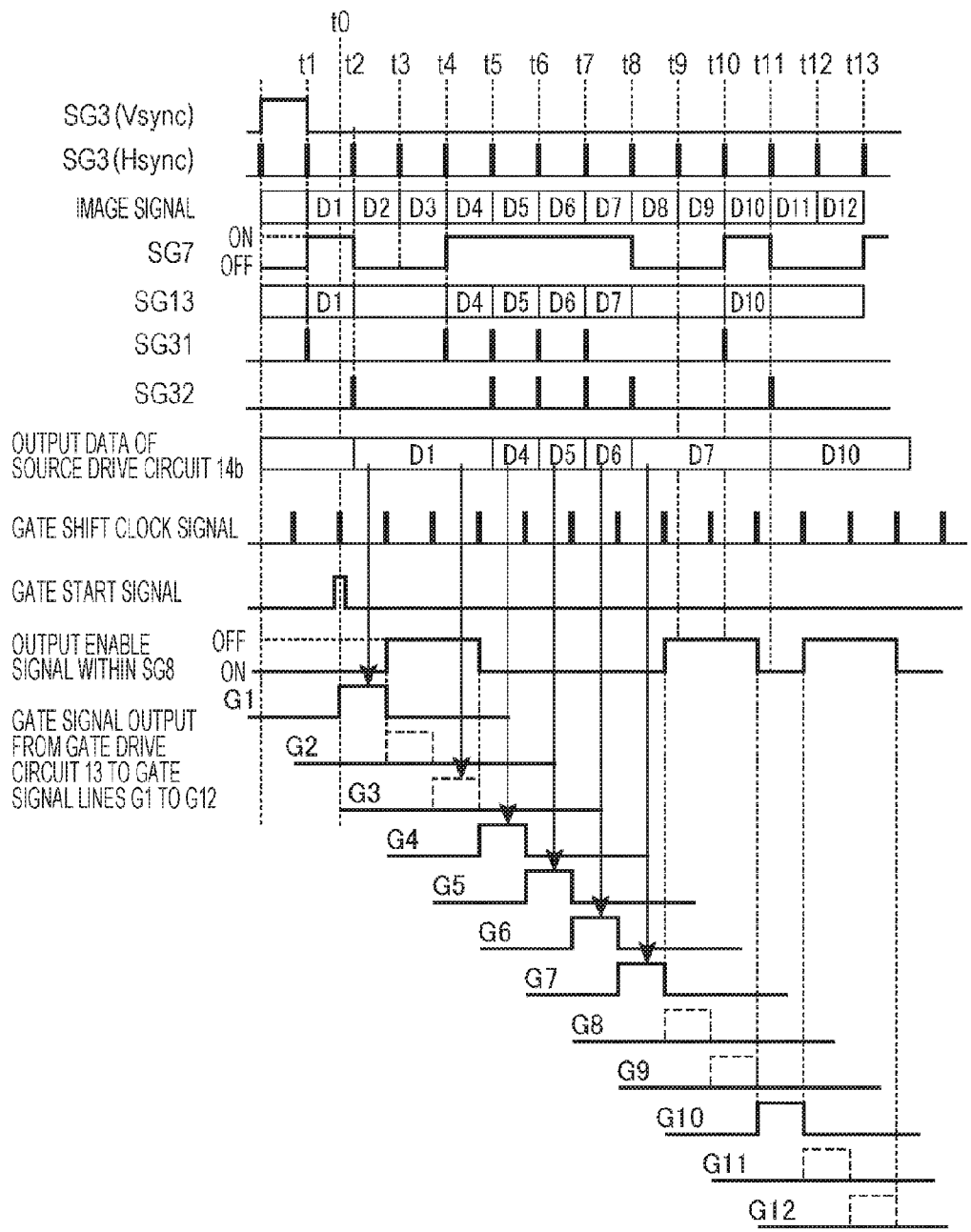
FIG. 16 is a timing chart schematically showing operations of a gate drive circuit and a source drive circuit according to the third embodiment.

FIG. 16 is a timing chart schematically showing operations of the gate drive circuit 13 and the source drive circuit 14*b* according to the third embodiment. Similarly to FIGS. 6, 7, 11 to 13 and 16, a number of the gate signal lines G1 to G12 is expressed by N=12.

In the third embodiment, similarly to FIG. 5 in the first embodiment, image signal SG1 is input. Similarly to FIG. 6, gate signals are output to gate signal lines G1 to G12. However, operations of the gate drive circuit 13 and the source drive circuit 14*b* are different from those in the first embodiment. With reference to FIGS. 14 to 16, a description will be given of operations of the gate drive circuit 13 and the source drive circuit 14*b* according to the third embodiment.

In FIG. 16, first, the vertical synchronizing signal Vsync is output and the horizontal synchronizing signal Hsync is output in synchronization with rising of the vertical synchronizing signal Vsync. At time t1 after the vertical synchronizing signal Vsync is output, the data enable signal SG7 is turned on. Therefore, the data reset signal SG31 is output in synchronization with the horizontal synchronizing signal Hsync at time t1. The image signal D1 corresponding to the gate signal line G1 (the image signal SG13) is input from the selector 45 to the source drive circuit 14*b* in synchronization with the data reset signal SG31 at time t1. The data latch signal SG32 is output in synchronization with the horizontal synchronizing signal Hsync at time t2 after time t1. A voltage based on the image signal SG13, that is, a voltage corresponding to the image signal D1 is output from the source drive circuit 14*b* to the source signal lines in synchronization with the data latch signal SG32 at time t2.

As described with FIGS. 5 and 6, the standby mode signal SG2 is turned on and the regional signal SGa is turned off. Therefore, this image signal D1 is an image signal SG12*a* which had been output from the read controller 32.

On the other hand, a gate start signal is output at time t0 between time t1 and time t2. Specifically, the gate controller 27 outputs the gate start signal after delay time of a time period (1+Tg)*H (0≤Tg<1) from the rising of the vertical synchronizing signal Vsync. In addition, at time t0, the output enable signal in the gate drive signal SG8 is turned on. Therefore, a gate signal is output to the gate signal line G1 in synchronization with the gate start signal. Therefore, when the gate signal corresponding to the gate signal line G1 is output, a voltage corresponding to the image signal D1 is output from the source drive circuit 14*b*, and then is applied to pixel electrodes.

On the other hand, at time t2, the data enable signal SG7 is turned off. Accordingly, the data reset signal SG31 is not output at time t2. Therefore, an image signal corresponding to the gate signal line G2 is not input to the source drive circuit 14*b*.

At time t3 that comes next, the data enable signal SG7 is turned off. Accordingly, the data reset signal SG31 is not output at time t3. Therefore, image signal D3 corresponding to the gate signal line G3 is not input to the source drive circuit 14*b*. At time t3, as the output enable signal in the gate drive signal SG8 is turned off, a gate signal is not output to the gate signal line G2 from the gate drive circuit 13.

At time t4 that comes next, the data enable signal SG7 is turned on. Accordingly, the data reset signal SG31 is output in synchronization with the horizontal synchronizing signal Hsync at time t4. The image signal D4 corresponding to the gate signal line G4 (the image signal SG13) is input from the selector 45 to the source drive circuit 14*b* in synchronization with the data reset signal SG31 at time t4.

On the other hand, the data latch signal SG32 is not output at time t4. Therefore, a voltage is not output from the source drive circuit 14*b* at time t4. Further, the output enable signal in the gate drive signal SG8 is turned off at time t4. Accordingly, a gate signal is not output from the gate drive circuit 13 to the gate signal line G2.

At time t5 that comes next, the data enable signal SG7 is turned on. Accordingly, the data reset signal SG31 is output in synchronization with the horizontal synchronizing signal Hsync at time t5. The image signal D5 (the image signal SG13) corresponding to the gate signal line G5 is input from the selector 45 to the source drive circuit 14*b* in synchronization with the data reset signal SG31 at time t5.

And in the latch timing signal SG32 at time t5, a voltage based on image signal D4 corresponding to gate signal line G4 (image signal SG13) which had been input to the source drive circuit 14*b* in synchronization with the date reset signal SG31 at the previous time t4, is output from the source drive circuit 14*b* to the source signal lines. And in the time t5, a voltage is output from the gate drive circuit 13 to the gate signal line G4. Therefore, a voltage based on the image signal D4 which had been output from the source drive circuit 14*b* to source signal line is applied to pixel electrodes.

At times t6 and t7 that come next, similarly to time t5, the data enable signal SG7 is turned on. Accordingly, similarly to t5, the data reset signal SG31 is output in synchronization with the horizontal synchronizing signal Hsync at times t6 and t7. The image signals D6 and D7 corresponding to the gate signal lines G6 and G7 (the image signal SG13) is input from the selector 45 to the source drive circuit 14*b* in synchronization with the data reset signal SG31 at times t6 and t7, respectively.

Further, the data latch signal SG32 is output in synchronization with the horizontal synchronizing signal Hsync at times t6 and t7. Voltages based on the image signal D5 and D6 corresponding to the gate signal lines G5 and G6 which had been input to the source drive circuit 14*b* in synchronization with the data reset signal SG31 at previous times t5 and t6 (the image signal SG13) are output from the source drive circuit 14*b* to the source signal lines in synchronization with the data latch signal SG32 at time t6 and t7, respectively. At times t6 and t7, the output enable signal in the gate drive signal SG8 is turned on. Accordingly, a gate signal is output from the gate drive circuit 13 to the gate signal lines G5 and G6. Therefore, voltages based on the image signals D5 and D6 from the source drive circuit 14*b* to the source signal lines are applied to pixel electrodes.

As described with FIGS. 5 and 6, the standby mode signal SG2 is turned on and the regional signal SGa is turned on. Therefore, this image signals D4 to D6 are image signals SG1 which had been input from outside. Further, as described with FIGS. 5 and 6, the standby mode signal SG2 is turned on and the regional signal SGa is turned off. Therefore, image signals D7 is image signal SG1 which had been output from the read controller 32.

At time t8 which comes next, the data enable signal SG7 is turned off. Accordingly, the data reset signal SG31 is not output at time t8. Therefore, image signal D8 corresponding to the gate signal line G8 is not input to the source drive circuit 14*b*.

Further, the data latch signal SG32 is output in synchronization with the horizontal synchronizing signal Hsync at time t8. A voltage based on the image signal D7 corresponding to the gate signal line G7 input to the source drive circuit 14*b* in synchronization with the data reset signal SG31 at previous time t7 (the image signal SG13) is output from the source drive circuit 14*b* to the source signal lines in synchronization with the data latch signal SG32 at time t8.

At time t8, the output enable signal in the gate drive signal SG8 is turned on. Accordingly, a gate signal is output from the gate drive circuit 13 to the gate signal line G7. Therefore, a voltage based on the image signal D7 outputs from the source drive circuit 14*b* to the source signal lines is applied to pixel electrodes. In FIG. 16, gate signals are not output to the gate signal lines G2, G3, G8, G9, G11 and G12. Therefore these gate signal lines G2, G3, G8, G9, G11 and G12 are indicated by broken lines.

As described above, in the third embodiment, the functions of the latch timing signal SG9 according to the first embodiment and the second embodiment are divided into two kinds of signal; the data reset signal SG31 and the data latch signal SG32. Therefore, according to the third embodiment, it is possible to perform scanning to the gate signal lines in a favorable manner without outputting dummy data in the first embodiment, or delaying data in the second embodiment.

In the third embodiment, it is possible to easily match a gate signal line to which a gate signal is output from the gate drive circuit 13 with a voltage corresponding to an image signal output from the source drive circuit 14 to the source signal lines. As a result, according to the third embodiment, it is possible to display a desirable image based on the input image signal, and to reduce power consumption.

Fourth Embodiment

Figure 17:
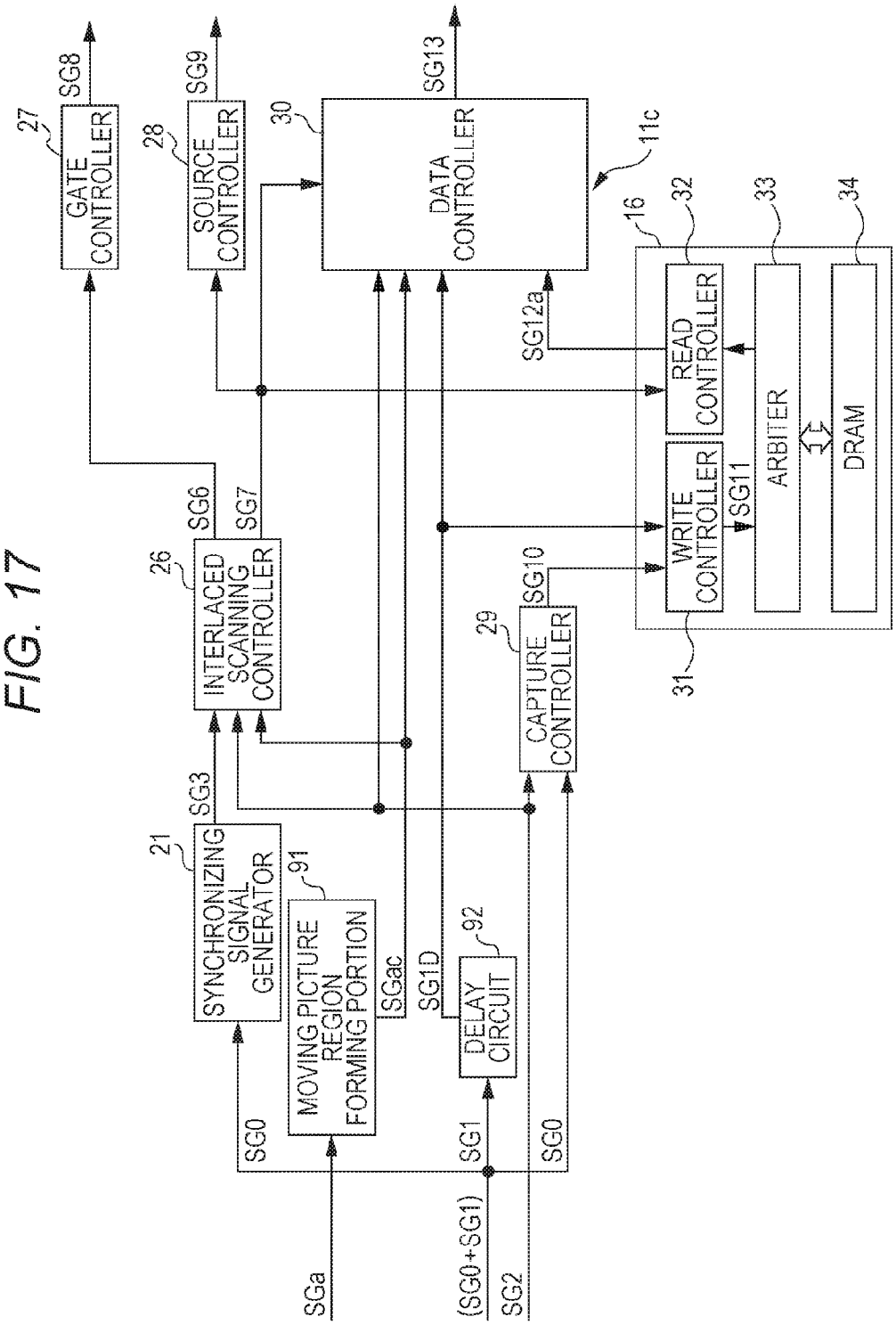
FIG. 17 is a block diagram showing a configuration of a controller and an image memory portion of a display device according to a fourth embodiment.

FIG. 17 is a block diagram showing a configuration of a controller and an image memory portion of a display device according to a fourth embodiment. In the fourth embodiment, similar components as in the first embodiment are denoted by similar reference numerals.

The display device according to the fourth embodiment includes a controller 11*c* in place of the controller 11 in the display device 1 according to the first embodiment. Similarly to the first embodiment, the frame frequency F1 in the basic control mode in the fourth embodiment is expressed by F1=60 Hz and the frame frequency F2 in the low frequency control mode in the fourth embodiment is expressed by F2=20 Hz. Hereinafter, the fourth embodiment will be described focusing on differences from the first embodiment.

As shown in FIG. 17, the controller 11C includes the synchronizing signal generator 21, the interlaced scanning controller 26, the gate controller 27, the source controller 28, the capture controller 29, the data controller 30, the moving picture region forming portion 91 and the delay circuits 92.

As shown in FIG. 17, the controller 11*c* includes the synchronizing signal generator 21, an interlaced scanning controller 26, the gate controller 27, the source controller 28, the capture controller 29, and the data controller 30, moving picture region forming portion 91 and delay circuits 92.

The moving picture region forming portion 91 generates a regional control signal SGac based on the regional signal SGa. The moving picture region forming portion 91 outputs the generated regional control signal SGac to the interlaced scanning controller 26 and the data controller 30. The regional control signal SGac is produced by delaying the regional signal SGa by one horizontal scanning period (1H) and repeating to cause a region where the regional signal SGa is turned on to expand to an upper side of the gate signal lines (in a direction to the gate signal lines G1), to expand to a down side of the gate signal lines (in a direction to the gate signal lines GN) and not to expand, every sub-frame in order The delay circuit 92 delays input image signal SG1 by one horizontal scanning period (1H), and outputs delayed image signal SG1D. The image signal SG1D can fit a timing of outputting the regional control signal SGac from the moving picture region forming portion 91 by the delay circuit 92. The interlaced scanning controller 26 and the data controller 30 are the same configuration of the first embodiment, except that it includes the regional control signal SGac in place of the regional signal SGa. In this embodiment, the liquid crystal display panel 12 corresponds to one example of the display portion, the gate drive circuit 13 corresponds to one example of the gate driver and the source drive circuit 14 corresponds to one example of the source driver and the DRAM 34 corresponds to one example of an image storage.

Figure 18:
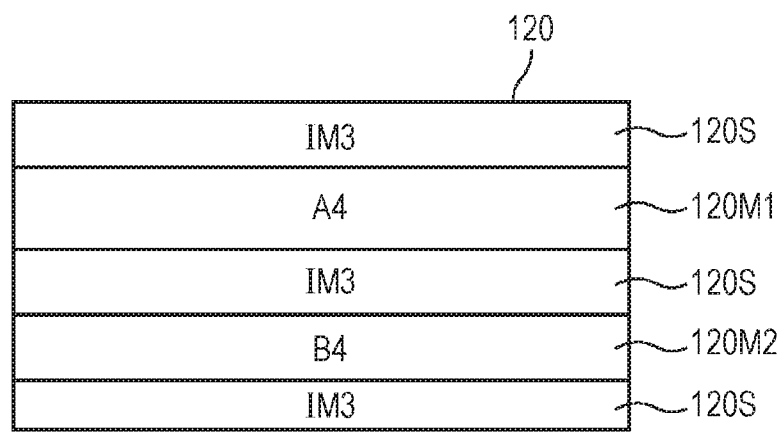
FIG. 18 is a configuration schematically showing a mixing image of a still picture region and two moving picture regions displayed in the display portion of the liquid crystal display panel shown in FIG. 1.
Figure 19:
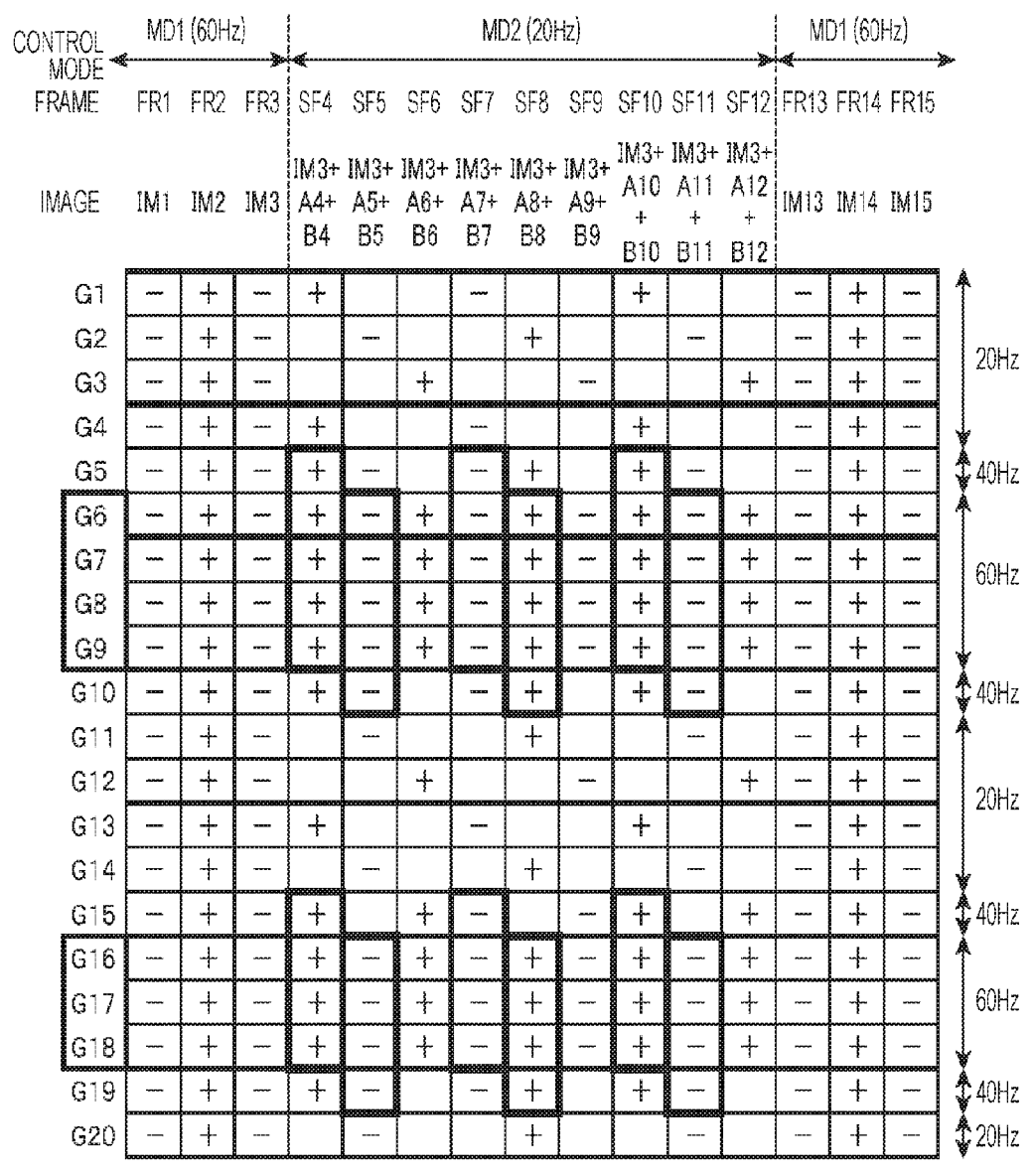
Figure 20:
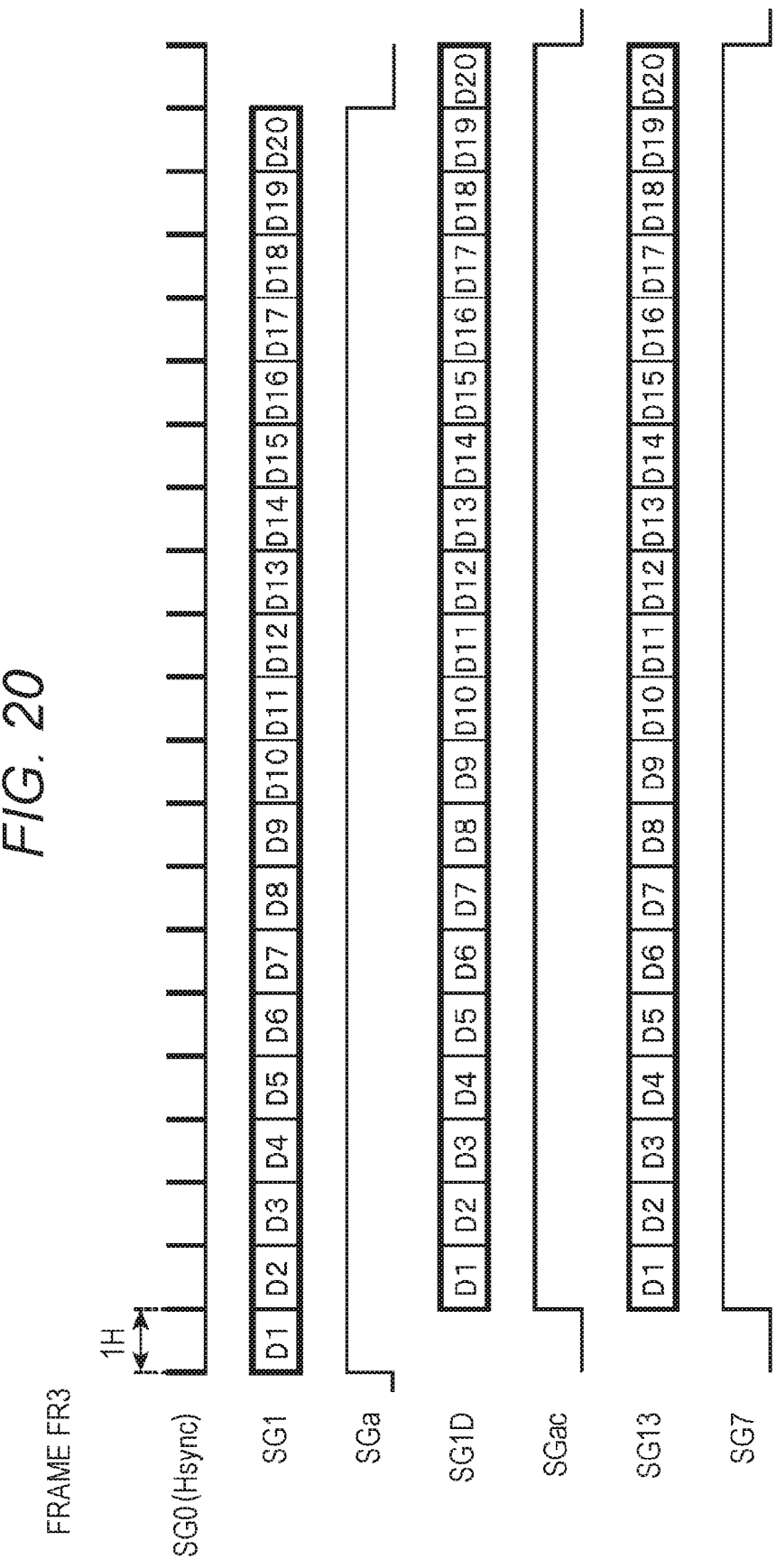
FIG. 20 is a timing chart schematically showing main signals shown in FIG. 17.
Figure 21:
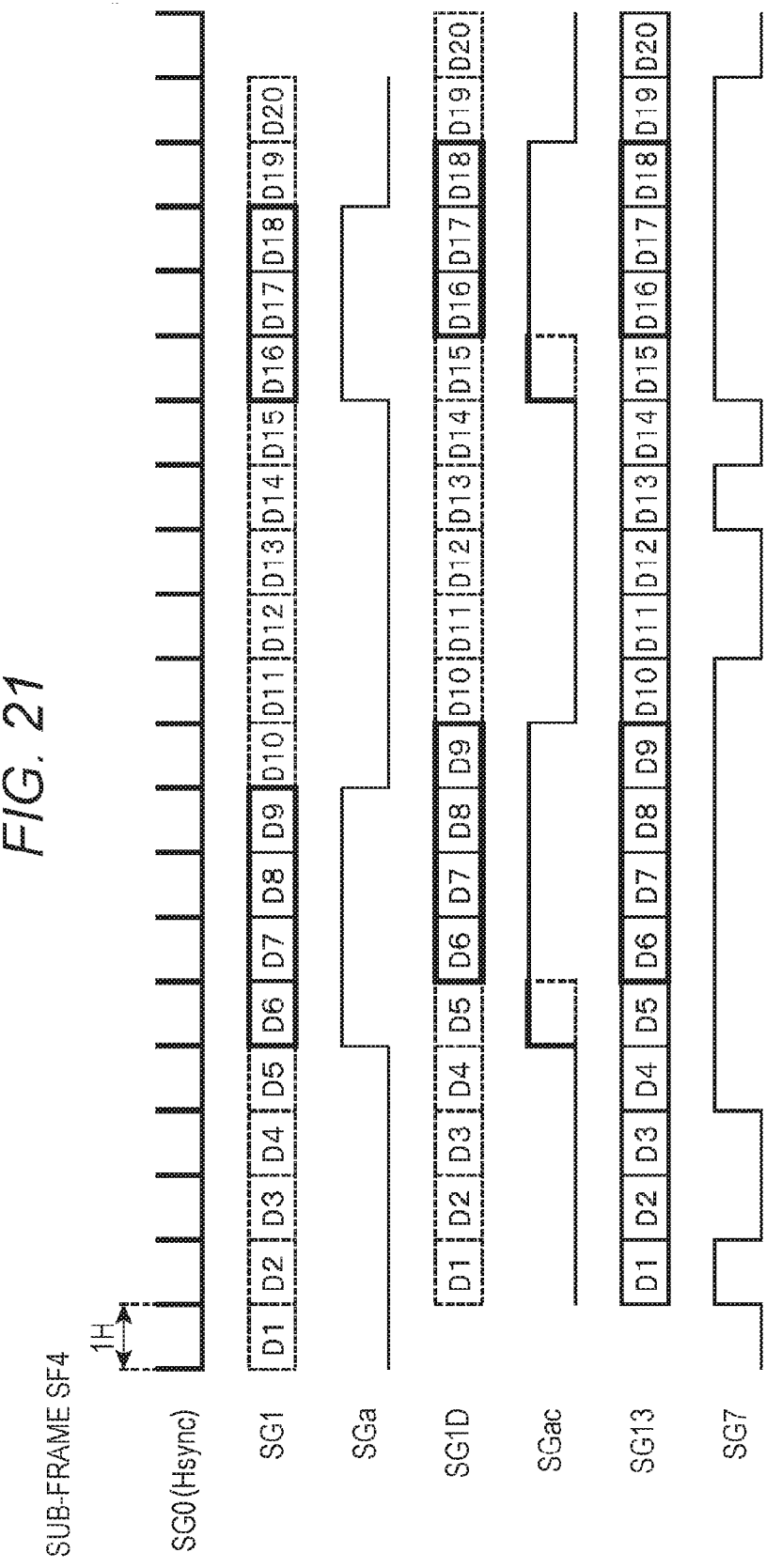
FIG. 21 is a timing chart schematically showing main signals shown in FIG. 17.
Figure 22:
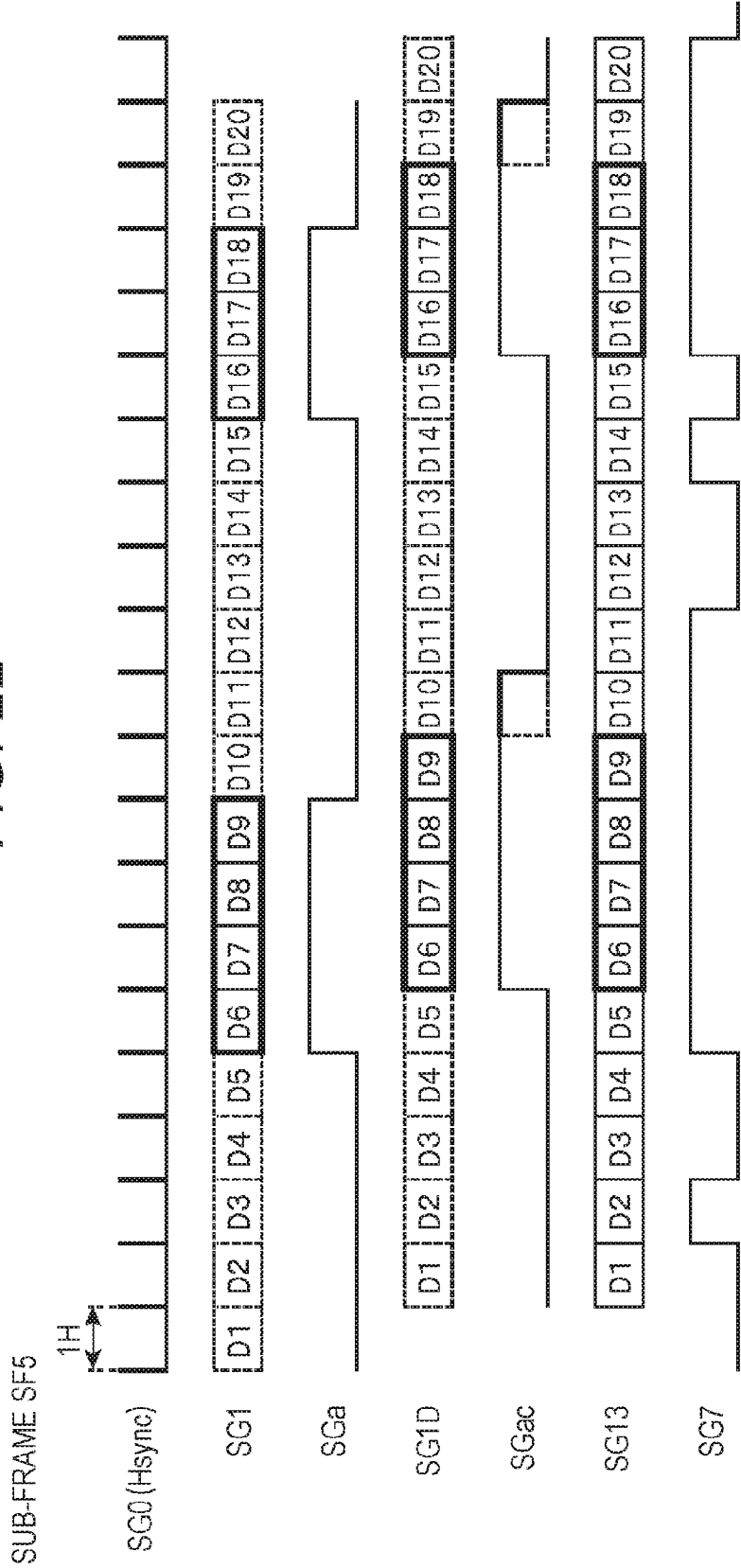
FIG. 22 is a timing chart schematically showing main signals shown in FIG. 17.
Figure 23:
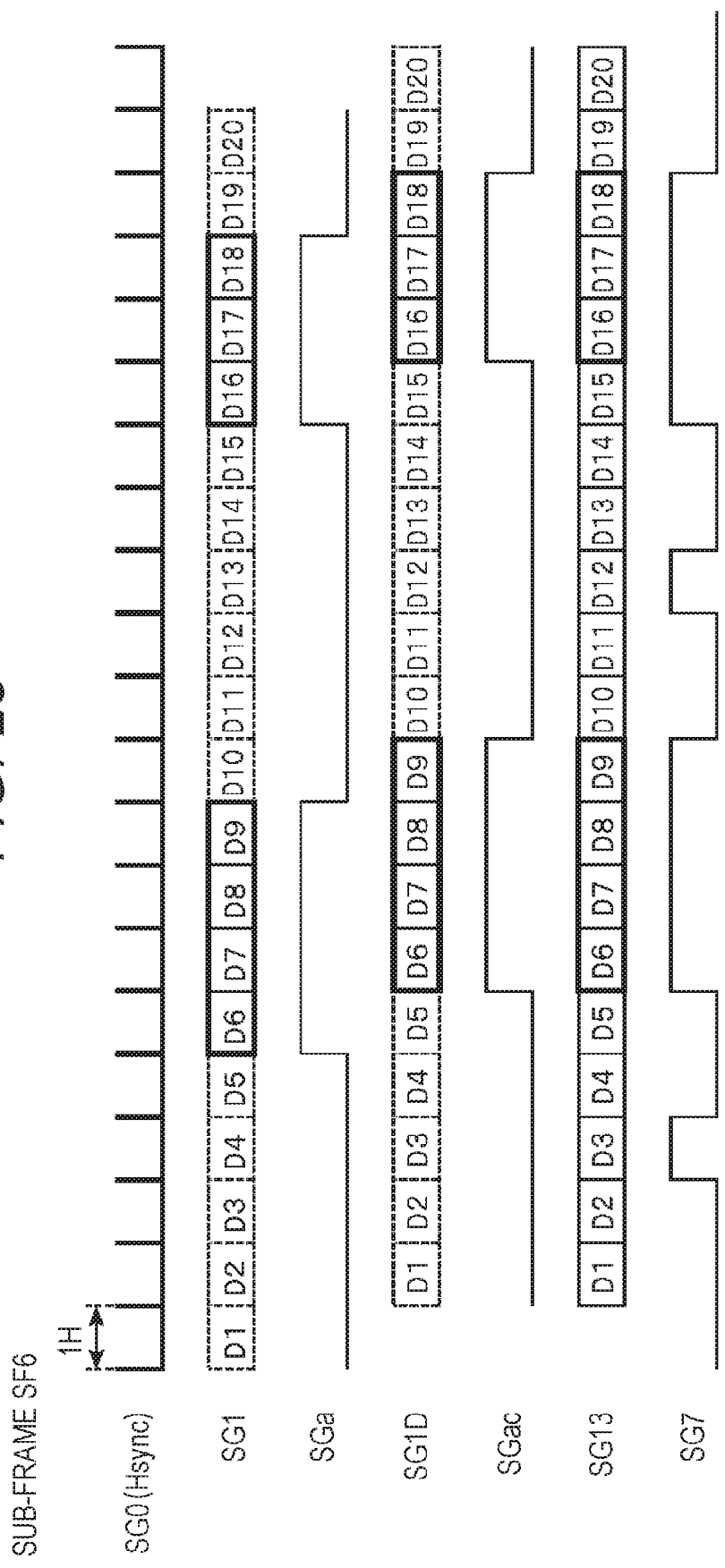
FIG. 23 is a timing chart schematically showing main signals shown in FIG. 17.

FIG. 18 is a configuration schematically showing a mixing image of a still picture region and two moving picture regions displayed in a display portion of the liquid crystal display panel. FIG. 19 is a configuration schematically showing on and off of an input voltage input to one source signal line (in this embodiment, for example, source signal line S1) when an image shown in FIG. 18 is displayed. FIGS. 20 to 23 are timing charts schematically showing main signals shown in FIG. 17. In other words, FIG. 20 is described as a frame FR3 shown in FIG. 19, FIG. 21 is described as a sub-frame SF4 shown in FIG. 19, FIG. 22 is described as a sub-frame SF5 shown in FIG. 19 and FIG. 23 is described as a frame FR6 shown in FIG. 19.

In FIG. 19, frames FR1 to FR3, sub-frames SF4 to SF12 and frame FR13 to FR15 are described. And in FIGS. 19 to 23, a number N of gate signal lines is expressed by N=20. An operation of the display device according to the fourth embodiment will be described with reference to FIGS. 17 to 23.

FIG. 18 shows a frame image in a sub-frame SF4 in FIG. 19. As shown in FIG. 18, a display portion 120 of the liquid crystal display panel 12 includes a still picture region 120S in which an image IM3 of a still picture (hereinafter, simply referred to as "a still picture IM3") is displayed, a moving picture region 120M1 in which an image A4 of a moving picture (hereinafter, referred to "a moving picture A4") is display and a moving picture region 120M2 in which an image B4 of a moving picture (hereinafter, simply referred to as "a still picture B4") is displayed. Among the gate signal lines G1 to G20 in FIG. 19, the gate signal lines G6 to G9 correspond to the moving picture region 120M1 in FIG. 18, the gate signal lines G16 to G18 correspond to the moving picture region 120M2 in FIG. 18 and the gate signal lines G1 to G5, G10 to G15, G19 and G20 correspond to the still picture region 120S in FIG. 18. In this embodiment, the moving picture regions 120M1 and 120M2 correspond to one example of the specific region and the still picture region 120S corresponds to one example of the interlaced region.

In the frames FR1 to FR3 in FIG. 19, the control mode is the basic control mode MD1, and the frame frequency F1 is expressed by F1=60 Hz. As shown in FIG. 19, pixel electrodes are driven in the column inversion drive mode which takes the polarity of a voltage applied to the source signal line S1 in the frame FR1 as "−", the polarity of a voltage applied to the source signal line S1 in the frame FR2 as "+", and the polarity of a voltage applied to the source signal line S1 in the frame FR3 as "−".

Further, in the sub-frame SF4, the control mode shifts from the basic control mode MD1 to the low frequency control mode MD2, in the sub-frames SF4 to SF12, the control mode is the low frequency control mode MD2, the frame frequency F2 is expressed by F2=15 Hz. In the low frequency control mode MD2, the gate signal lines to be scanned are thinned every sub-frame. A sub-frame image is displayed in the liquid crystal display panel 12. This can reduce power consumption.

In the frame FR3 in FIG. 20, image signal SG1 representing the frame image IM3 of a moving picture is input. Therefore, during the gate signal lines G1 to G20, the regional signal SGa is turned on. As described above, this frame image IM3 of a moving picture is changed to a still picture in and after the sub-frame SF4.

As described in FIG. 20, in the frame FR3, the moving picture region forming portion 91 forms the regional control signal SGac by delaying the regional signal SGa by one horizontal scanning period (1H). The interlaced scanning controller 26 generates the data enable signal SG7 such that the data enable signal SG7 is turned on while the regional control signal SGac is turned on. In addition, the delay circuit 92 outputs an image signal SG1D which is an image signal SG1 delayed by one horizontal scanning period (1H). This causes the data enable signal SG7 to be turned on, while the image signal SG1D is output. As a result, as shown in FIG. 19, in frame FR3 voltages corresponding to image signals D1 to D20 are applied to pixel electrodes of the gate signal lines G1 to G20.

In the sub-frame SF4 in FIG. 19, image signal SG1 representing the moving pictures A4 and B4 is input. Therefore, as described in FIG. 21, the regional signal SGa is turned on in image signals D6 to D9 and D16 to D18 corresponding to gate signal lines G6 to G9 and G16 to G18. In addition, in the sub-frame SF4, image signals D1 to D5, D10 to D15, D19 and D20 corresponding to gate signal lines G1 to G5, G10 to G15, G19 and G20 are not input. However, in FIG. 21, for the sake of convenience of description, image signals D1 to D5, D10 to D15, D19 and D20 are indicated by dashed lines. This description is also applied to FIGS. 22 and 23.

As shown in FIG. 21, in the sub-frame SF4, the moving picture region forming portion 91 forms the regional control signal SGac by delaying the regional signal SGa by a horizontal scanning period (1H), and then expanding an on-area in an upper direction (in a direction to the gate signal lines G1). In other words, in a region corresponding to the gate signal line G5 (image signal D5) in addition to the gate signal lines G6 to G9 (image signals D6 to D9), the regional signal SGa is turned on. And, in a region corresponding to the gate signal line G15 (image signal D15) in addition to the gate signal lines G16 to G18 (image signals D16 to D18), the regional signal SGa is turned on. And, the delay circuit 92 outputs image signal SG1D which is the image signal SG1 delayed by one horizontal scanning period (1H).

The data enable signal SG7 is turned on, during the period when gate signal lines G1, G4, G7, G10, G13, G16 and G19 (image signals D1, D4, D7, D10, D13, D16 and D19) are subjected to interlaced scanning in addition to period when the regional control signal SGac is turned on. On the other hand, as shown in FIG. 21, image signal SG13 which is output to source drive circuit 14 is generated by mixing image signal SG1D which is delayed by the delay circuits 92 and the image signal SG12a read from the DRAM 34.

Therefore, as described in FIG. 19, in the sub-frame SF4, voltages corresponding to image signals D1, D4 to D10, D13, and D15 to D19 are applied to the pixel electrodes of the gate signal lines G1, G4 to G10, G13, and G15 to G19.

As a result, the frame image shown in FIG. 18 is displayed in the display portion 120 of the liquid crystal display panel 12.

In the sub-frame SF5 of FIG. 19, an image signal SG1 representing moving pictures A5 and B5 is input. Therefore, as shown in FIG. 22, the regional signal SGa is turned on in the image signals D6 to D9 and D16 to D18 corresponding to the gate signal lines G6 to G9 and G16 to G18.

As shown in FIG. 21, in the sub-frame SF5, the moving picture region forming portion 91 forms the regional control signal SGac by delaying the region signal SGa by a horizontal scanning period (1H), and then, expanding the on-area in an down direction (in a direction to the gate signal lines G20). In other words, in a region corresponding to the gate signal line G10 (image signal D10) in addition to the gate signal lines G6 to G9 (image signals D6 to D9), the regional signal SGa is turned on. And, in a region corresponding to the gate signal line G19 (image signal D19) in addition to the gate signal lines G16 to G18 (image signals D16 to D18), the regional signal SGa is turned on. And, the delay circuit 92 outputs image signal SG1D which is the image signal SG1 delayed by one horizontal scanning period (1H).

The data enable signal SG7 is turned on, during a period corresponding to the gate signal lines G2, G5, G8, G11, G14, G17 and G20 (image signal D2, D5, D8, D11, D14, D17 and D20) which are subjected to interlaced scanning in addition to a period when the regional control signal SGac is turned on. On the other hand, as shown in FIG. 21, image signal SG13 which is output to source drive circuit 14 is generated by mixing image signal SG1D which is delayed by the delay circuits 92 and the image signal SG12a read from the DRAM 34. As a result, as described in FIG. 19, in the sub-frame SF5, voltages corresponding to image signals D2, D5 to D11, D14, and D16 to D20 are applied to the pixel electrodes of the gate signal lines G2, G5 to G11, G14, and G16 to G20.

In the sub-frame SF5 in FIG. 19, an image signal SG1 representing moving pictures A6 and B6 is input. Therefore, as shown in FIG. 23, the regional signal SGa is turned on in the image signals D6 to D9 and D16 to D18 corresponding to the gate signal lines G6 to G9 and G16 to G18.

As shown in FIG. 23, in the sub-frame SF6, the moving picture region forming portion 91 forms the delayed regional control signal SGac by delaying the regional signal SGa by one horizontal scanning period (1H). In other words, the regional signal SGa is turned on, in a region corresponding to the gate signal lines G6 to G9 and G16 to G18 (image signals D6 to D9 and D16 to D18). And the delay circuit 92 outputs image signal SG1D which is the image signal SG1 delayed by one horizontal scanning period (1H).

The data enable signal SG7 is turned on in a region corresponding to the gate signal lines G3, G6, G9, G12, G15 and G18 (image signal D3, D6, D9, D12, D15 and D18) which are subjected to interlaced scanning in addition to a region where the regional control signal SGac is turned on. On the other hand, as shown in FIG. 23, image signal SG13 which is output to source drive circuit 14 is generated by mixing image signal SG1D which is delayed by the delay circuits 92 and the image signal SG12a read from the DRAM 34. As a result, as described in FIG. 19, in the sub-frame SF6, voltages corresponding to image signals D3, D6 to D9, D12, and D15 to D18 are applied to the pixel electrodes of the gate signal lines G3, G6 to G9, G12, and G15 to G19.

In the sub-frames SF7 and SF10, the same operation is performed as the sub-frame SF4. And in the sub-frames SF8 and SF11, the same operation is performed as the sub-frame SF5. And in the sub-frames SF9 and SF12, the same operation is performed as the sub-frame SF6. And in the frame FR13 the control mode returns to the basic control mode MD1 to the low frequency control mode MD2. Therefore, in the frames FR13 to FR15, at the frame frequency F1 of 60 Hz, each of frame images IM13 to IM15 is displayed in the liquid crystal display panel 12.

As described above, in the fourth embodiment, as shown in FIG. 19, the gate signal lines G6 to G9 and G16 to G18 are scanned at the frame frequency of 60 Hz. This is the same frame frequency of the basic control mode. Therefore, in the fourth embodiment, the moving pictures A4, B4 and so on are favorably displayed without deteriorating image qualities.

The gate signal lines G1 to G4, G11 to G14 and G20 are scanned at the frame frequency of 20 Hz. This is the same frame frequency as the low frequency control mode. Therefore, according to the fourth embodiment, this can reduce power consumption. And because the displayed image is a still picture, image qualities are not deteriorated excessively even at the frame frequency of 20 Hz.

And the gate signal lines G5, G10, G15 and G19 are scanned at frequency of 40 Hz. Therefore, according to the fourth embodiment, A difference in frequency around a boundary between the still picture region 120S and the moving picture regions 120M1 and 120M2 in FIG. 18 can be reduced as compared to the first to third embodiments.

For example, in FIG. 4 in the first embodiment, the gate signal lines included in the still picture region 120S are scanned at the frequency of 20 Hz, and the gate signal lines included in the moving picture region 120M are scanned at the frequency of 60 Hz. In contrast, in the fourth embodiment, a region in which gate signal lines are scanned at 40 Hz is formed in a boundary between the still picture region 120S and the moving picture regions 120M1 and 120M2. Therefore, according to fourth embodiment, it can prevent a difference in the boundary between the still picture region 120S and the moving picture regions 120M1 and 120M2 of the image displayed in the liquid crystal display panel 12 from being prominent.

Fifth Embodiment

Figure 24:
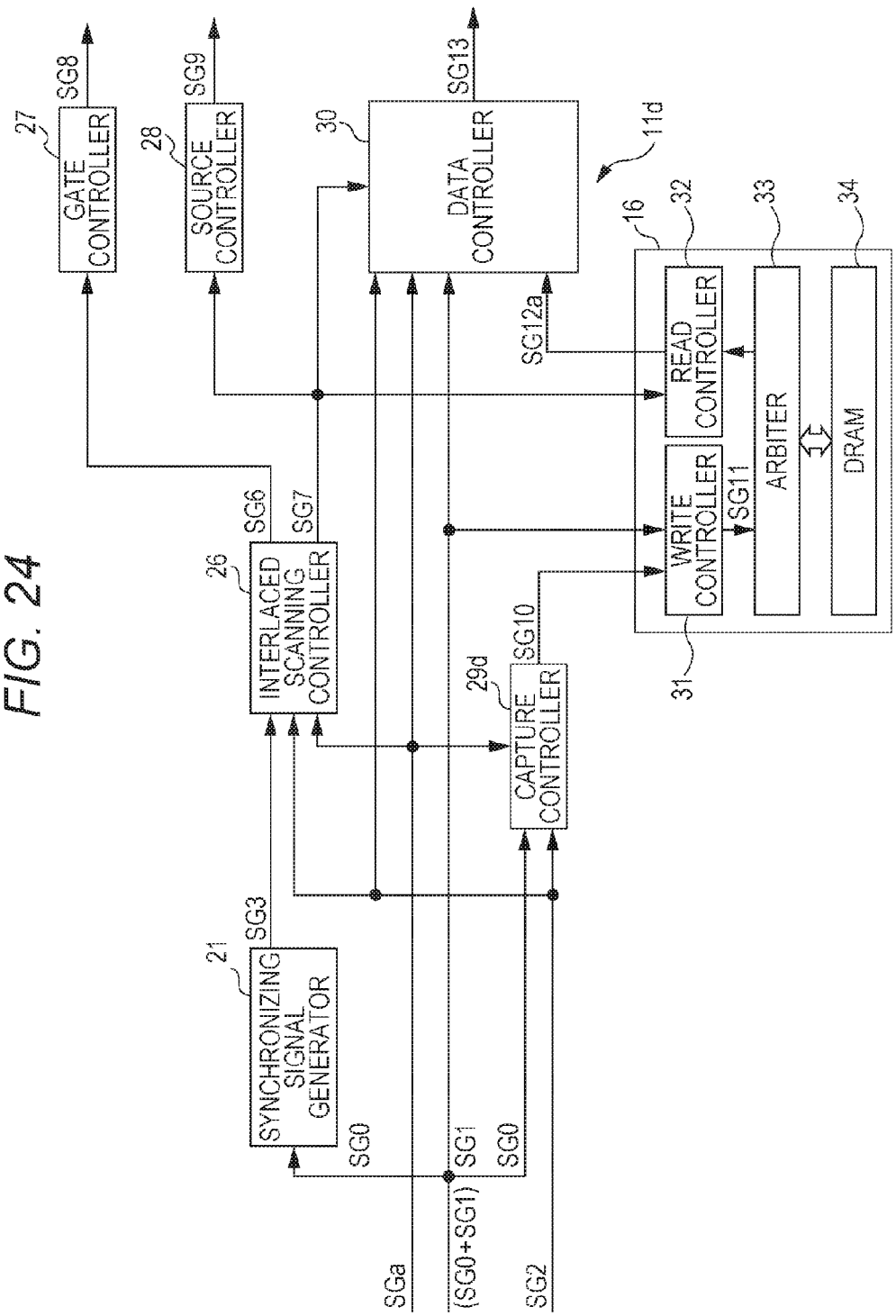
FIG. 24 is a block diagram showing a configuration of a controller and an image memory portion of a display device according to a fifth embodiment.

FIG. 24 is a block diagram showing a configuration of a controller and an image memory portion of a display device according to a fifth embodiment. In the fifth embodiment, like components as in the first embodiment are denoted by like reference numerals.

The display device according to the fifth embodiment includes a controller 11d in place of the controller 11 of the display device 1 according to the first embodiment. Similarly to the first embodiment, the frame frequency F1 in the basic control mode in the fifth embodiment is expressed by F1=60 Hz and the frame frequency F2 in the low frequency control mode is expressed by F2=20 Hz. Hereinafter, the fifth embodiment will be described focusing on differences from the first embodiment.

As shown in FIG. 24, the controller 11d includes the synchronizing signal generator 21, an interlaced scanning controller 26, the gate controller 27, the source controller 28, the capture controller 29, and the data controller 30.

When the standby mode signal SG2 is turned on, the capture controller 29d generates an area signal SG10 indicating an image signal SG1 representing a frame image which had been input when a standby mode signal SG2 was turned on. In addition, a capture controller 29d generates a logical product with the standby mode signal SG2 and regional signal SGa as an area signal SG10. The capture controller 29d outputs the generated area signal SG10 to a write controller 31. In this embodiment, the liquid crystal display panel 12 corresponds to one example of the display portion, the gate drive circuit 13 corresponds to one example of the gate driver, the source drive circuit 14 corresponds to one example of the source driver and the DRAM 34 corresponds to one example of an image storage.

Figure 25:
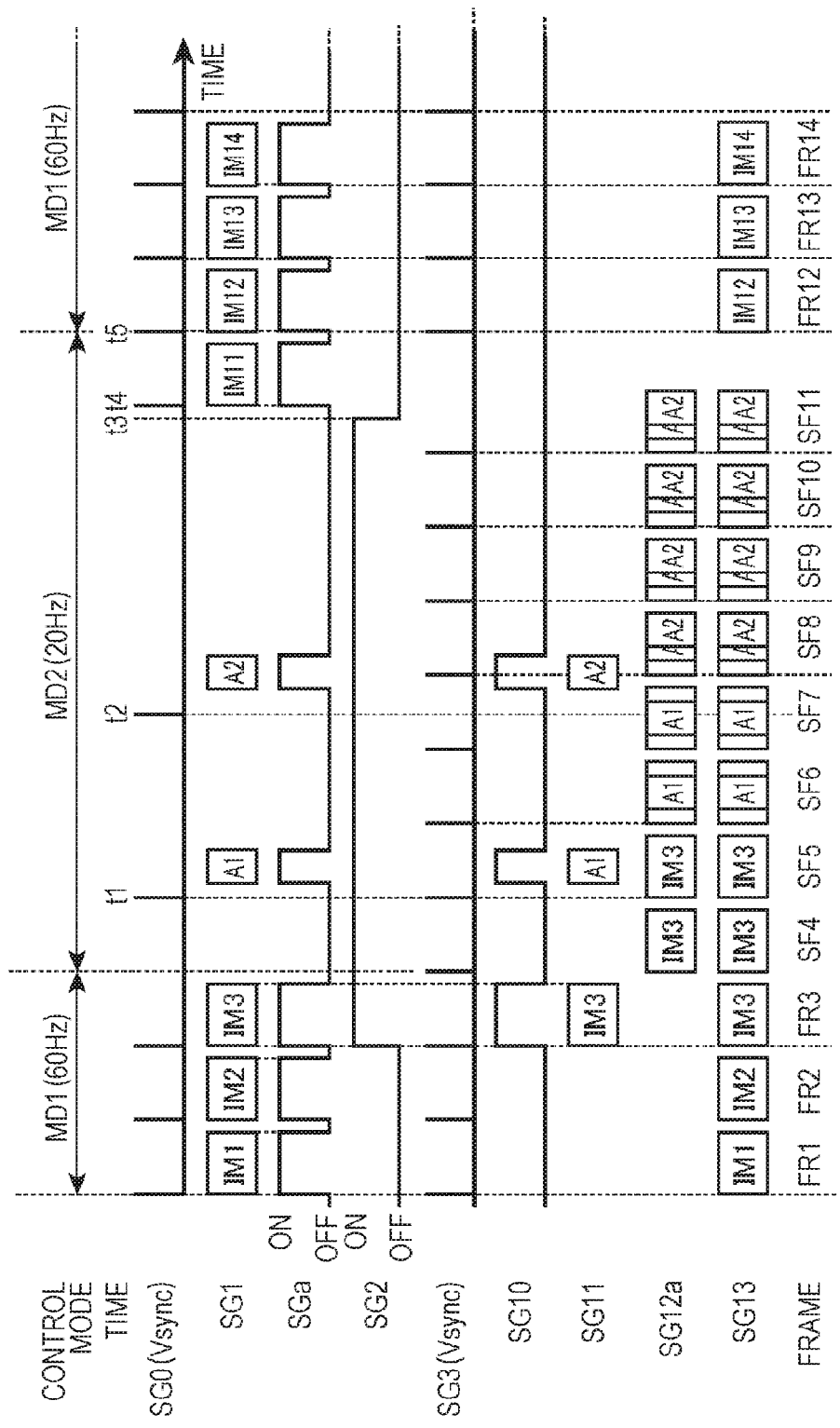
FIG. 25 is a timing chart schematically showing main signals shown in FIG. 24 in a case in which after the control mode shifts from a basic control mode to a low frequency control mode, a part of a region of a still picture is updated to a different still picture, and then another part of the region of the still picture is updated to a different still picture in the low frequency control mode.

FIG. 25 is a timing chart schematically showing main signals shown in FIG. 24 in a case in which after the control mode shifts from the basic control mode to the low frequency control mode, a part of a region of a still picture is updated to a different still picture, and then another part of the region is updated to a different still picture in the low frequency control mode. FIGS. 26 A~D are configurations schematically showing states of image in a display portion of the liquid crystal display panel in a case of operations shown in FIG. 25. FIG. 27 is a diagram schematically showing polarities of voltages applied to one of the source signal lines (In this embodiment, for example, source signal line S1) in performing the operation shown in FIG. 25. In FIG. 27, a number N of gate signal lines is expressed by N=20. An operation of the display device according to the fifth embodiment will be described with reference to FIGS. 24 to 27.

Referring to FIG. 25, in frames FR1 and FR2, the image signal SG1 representing images IM1 and IM2 is input from outside every frame in synchronization with the synchronizing signal SG0 (the vertical synchronizing signal Vsync). During this time, the synchronizing signal SG0 input from outside is output as the synchronizing signal SG3 from the synchronizing signal generator 21. In this fifth embodiment, as images IM1 and IM2 are moving pictures, the standby mode signal SG2 is turned off. Therefore, the selector 45 outputs the image signal SG1 representing images IM1 and IM2 as the image signals 13 to the source drive circuit 14.

When the standby mode signal SG2 is turned on, the capture controller 29d generates the range signal SG10 in synchronization with the vertical synchronizing signal Vsync. As a result, the image signal SG11 representing the image IM3 is output from the write controller 31 by way of the arbiter 33 and stored in the DRAM 34. After the standby mode signal SG2 is turned on, an input of synchronizing signal SG0 and the image signal SG1 is stopped.

In frames FR1 to FR3, because input images IM1 to IM3 are moving pictures, the regional signal SGa is turned on during an input of the image signal SG1. In addition, in frame FR3, the standby mode signal SG2 is turned on. Therefore, the input image IM3 is a still picture in and after the frame F4. However, in a step of the frame FR3, the image IM3 is a moving picture.

In the frames FR1 to FR3 in FIG. 27, the control mode is the basic control mode MD1, and the frame frequency F1 is expressed by F1=60 Hz. Pixel electrodes are driven in the column inversion drive mode which takes the polarity of a voltage applied to the source signal line S1 in the frame FR1 as "−", the polarity of a voltage applied to the source signal line S1 in the frame FR2 as "+", and the polarity of a voltage applied to the source signal line S1 in the frame FR3 as "−".

In and after the sub-frame SF4 after the standby mode signal SG2 is turned on, the synchronizing signal generator 21 generates the synchronizing signal SG3 including the vertical synchronizing signal Vsync. And, in synchronization with the vertical synchronizing signal Vsync of the sub-frame SF4, the still picture IM3 stored in DRAM34 is read as the image signal SG12a, and then is output as the image signal SG13 from the data controller 30 to the source drive circuit 14, and the still picture IM3 is displayed in the liquid crystal display panel 12.

At time t1, the synchronizing signal SG0 is input, and then image signal SG1 representing an image A1 displayed on a part of display portion 120 in the liquid crystal display panel 12 is input. The regional signal SGa is turned on in a range corresponding to the image A1 of image signal SG1.

The capture controller 29d generates a logical product of the regional signal SGa and the standby mode signal SG2 as an area signal SG10. In addition, the capture controller 29d determines a displaying position of image A1 on the display portion 120 in the liquid crystal display panel 12 based on a period between time t1 when the synchronizing signal SG0 is input and a time when the regional signal SGa is turned on. In addition, the capture controller 29d generates an area signal SG10 in consideration of the displaying position. As a result, the image signal SG11 representing the image A1 is stored in DRAM 34 in consideration of the displaying position of image A1 in the liquid crystal display panel 12.

On the other hand, in the sub-frame SF5, the image signal SG13 representing a still picture IM3 is output to the source drive circuit 14 similarly to the sub-frame SF4, and then the still picture IM3 is displayed in the liquid crystal display panel 12.

Figure 28:
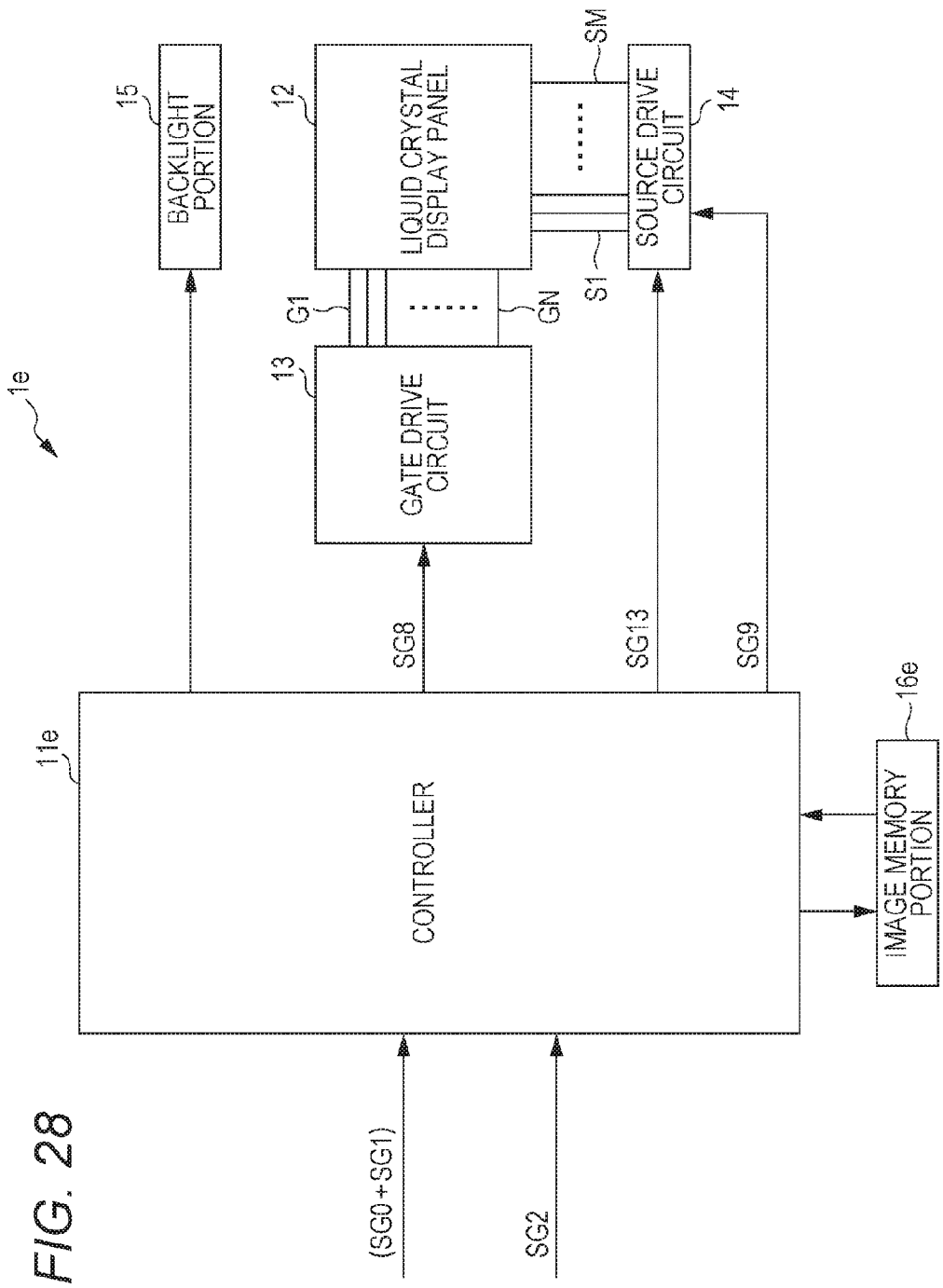
FIG. 28 is a block diagram showing a configuration of a display device according to a sixth embodiment.

In this manner, in sub-frames SF4 and SF5, the still picture IM3 is displayed in the liquid crystal display panel 12. Thus, as shown in FIG. 28, in the sub-frames SF4 and SF5, the gate signal lines G1 to G20 are subjected to interlaced scanning every three gate signal lines. In other words, the frame frequency F2 is expressed by F2=20 Hz. It may reduce power consumption. In addition, an image which is displayed in the liquid crystal display panel 12 is a still picture IM3. Therefore, image qualities of the still picture IM3 are not deteriorated excessively even if the frame frequency is switched from F1=60 Hz. to F2=20 Hz In next sub-frame SF6, the images IM3 and A1 stored in the DRAM34 are read by the read controller 32, and then, image signal representing an image including a part of still picture IM3 replaced by the image A1 is output as image signal SG12a from the read controller 32. And from the data controller 30, it is output as image signal SG13 to the source drive circuit 14.

In this manner, as shown in FIG. 26 A, in the sub-frame SF6, an image that a part of the still picture IM3 is replaced by the image A1 is displayed on the display portion 120 in the liquid crystal display panel 12. Referring to display portion 120, the still picture IM3 of the display region is the still picture region 120S, and the image A1 of the display region is the updated region 120U.

Here, the updated region 120U in FIG. 26 A corresponds to the gate signal lines G6 to G13 in FIG. 27. In this manner, as described in FIG. 27, in sub-frame SF26, the gate signal lines G6 to G13 are subjected to interlaced scanning, not to progressive scanning. On the other hand, gate signal lines G1 to G5 and G14 to G20 corresponding to the still picture region 120S are subjected to interlaced scanning every three gate signal lines. Therefore, in this case, the frame frequency F2 of the liquid crystal display panel 12 is expressed by F2=20 Hz.

In next sub-frame SF7, similarly to sub-frame SF6, an image including a part of the still picture IM3 replaced by the image A1 is displayed on the display portion 120 in the liquid crystal display panel 12. As shown in FIG. 26 B, in sub-frame SF7, a whole display region including the still picture IM3 and the image A1 displays a still picture region 120S on the display portion 120. And as shown in FIG. 26 B, in sub-frame SF7, similarly to the sub-frames SF4 and SF5, the gate signal lines G1 to G20 are subjected to interlaced scanning every three gate signal lines. Therefore, the frame frequency F2 is expressed by F2=20 Hz.

Next, at time t2 in the course of the sub-frame SF7, the synchronizing signal SG0 is input, and then, image signal SG1 representing the image A2 displayed in a part of the display portion 120 in the liquid crystal display panel 12 is input. The regional signal SGa is turned on in a range corresponding to the image A2 in image signal SG1.

The capture controller 29d generates a logical product of the regional signal SGa and the standby mode signal SG2 as an area signal SG10. In addition, the capture controller 29d determines a displaying position of image A2 on the display portion 120 in the liquid crystal display panel 12 based on a period between time t2 when the synchronizing signal SG0 is input and a time when the regional signal SGa is turned on. In addition, the capture controller 29d generates an area signal SG10 in consideration of the displaying position. As a result, the image signal SG11 representing the image A2 is stored in the DRAM 34 in consideration of the displaying position of the image A2 in the liquid crystal display panel 12.

In next sub-frame SF8, the images IM3, A1 and A2 stored in the DRAM34 are read by the read controller 32, and then, image signal representing an image including a part of still picture IM3 replaced by the images A1 and A2 is output as image signal SG12a from the read controller 32. And from the data controller 30, it is output as image signal SG13 to the source drive circuit 14.

In this manner, as shown in FIG. 26 C, in the sub-frame SF8, an image including a part of the still pictures IM3 and A1 replaced by the image A2 is displayed on the display portion 120 in the liquid crystal display panel 12. Referring to the display portion 120, the still pictures IM3 and A1 of the display region are the still picture region 120S, and the image A2 of the display region is the updated region 120U.

Here, the updated region 120U in FIG. 26 C corresponds to the gate signal lines G12 to G20 in FIG. 27. In this manner, as described in FIG. 27, in sub-frame SF8, the gate signal lines G12 to G20 are subjected to interlaced scanning, not to progressive scanning. On the other hand, gate signal lines G1 to G11 corresponding to the still picture region 120S are subjected to interlaced scanning every three gate signal lines. Therefore, in this case, the frame frequency F2 of the liquid crystal display panel 12 is expressed by F2=20 Hz.

In next sub-frame SF9, similarly to sub-frame SF8, an image including a part of the still pictures IM3 and A1 replaced by the image A2 is displayed on the display portion 120 in the liquid crystal display panel 12. As shown in FIG. 26 D, in sub-frame SF9, a whole display region including the still picture IM3, the image A1 and the image A2 displays a still picture region 120S on the display portion 120.

And as shown in FIG. 27, in the sub-frame SF7, similarly to sub-frames SF4, SF5 and SF7, the gate signal lines G1 to G20 are subjected to interlaced scanning every three gate signal lines. In the next sub-frames SF10 and SF11, the same operation is performed as sub-frame SF9. Therefore, because a whole image is displayed by the sub-frames SF9 to SF11, the frame frequency F2 is expressed by F2=20 Hz.

And as shown in FIG. 25, at time t3 in a course of the sub-frame SF11, the standby mode signal SG2 is turned off. Afterward, at time t4, the synchronizing signal SG0 and the image signal SG1 are input again. At next time t5, in synchronization with the signal SG0, the synchronizing signal generator 21 generates the synchronizing signal SG3 and the generated synchronizing signal SG3 is output.

A control mode returns to the basic control mode MD1, and a frame FR12 starts from the synchronizing signal SG0 (SG3) at time t5. In the frame FR12, image signal SG1 representing the input image IM12 is output from the data controller 30 as image signal SG13 to the source drive circuit 14. As a result, an image IM12 is displayed on the liquid crystal display panel 12.

In the succeeding frames FR13 and FR14, in the same operation as the frame FR12, images IM13 and IM14 are displayed on the liquid crystal display panel 12. When frames FR12 to FR14 are displayed, the frame frequency F1 is expressed by F1=60 Hz, and the gate signal lines G1 to G20 are progressively scanned as shown in FIG. 27. In addition, each pixel electrode is driven in the column inversion drive mode. In this embodiment, the updated picture region 120U corresponds to one example of the specific region and the still picture region 120S corresponds to one example of the interlaced region.

As described above, in this fifth embodiment, when a part of the still picture IM3 which was displayed on the liquid crystal display panel 12 is updated by a different image, in the updated sub-frame SF6, the gate signal lines G6 to G13 corresponding to the updated region 120U are progressively scanned, and then in the updated sub-frame SF8, the gate signal lines G12 to G20 corresponding to the updated region 120U are progressively scanned. Therefore, updated images A1 and A2 are favorably displayed without deteriorating image qualities.

In the fifth embodiment, gate signal lines in the still picture region 120S other than the updated region 120U are subjected to interlaced scanning every three gate signal lines, and the frame frequency F2 is expressed by F2=20 Hz. Therefore, according to the fifth embodiment, this can reduce power consumption. And because the displayed image is a still picture, images qualities are not deteriorated excessively even displayed at the frame frequency of 20 Hz.

Sixth Embodiment

Figure 29:
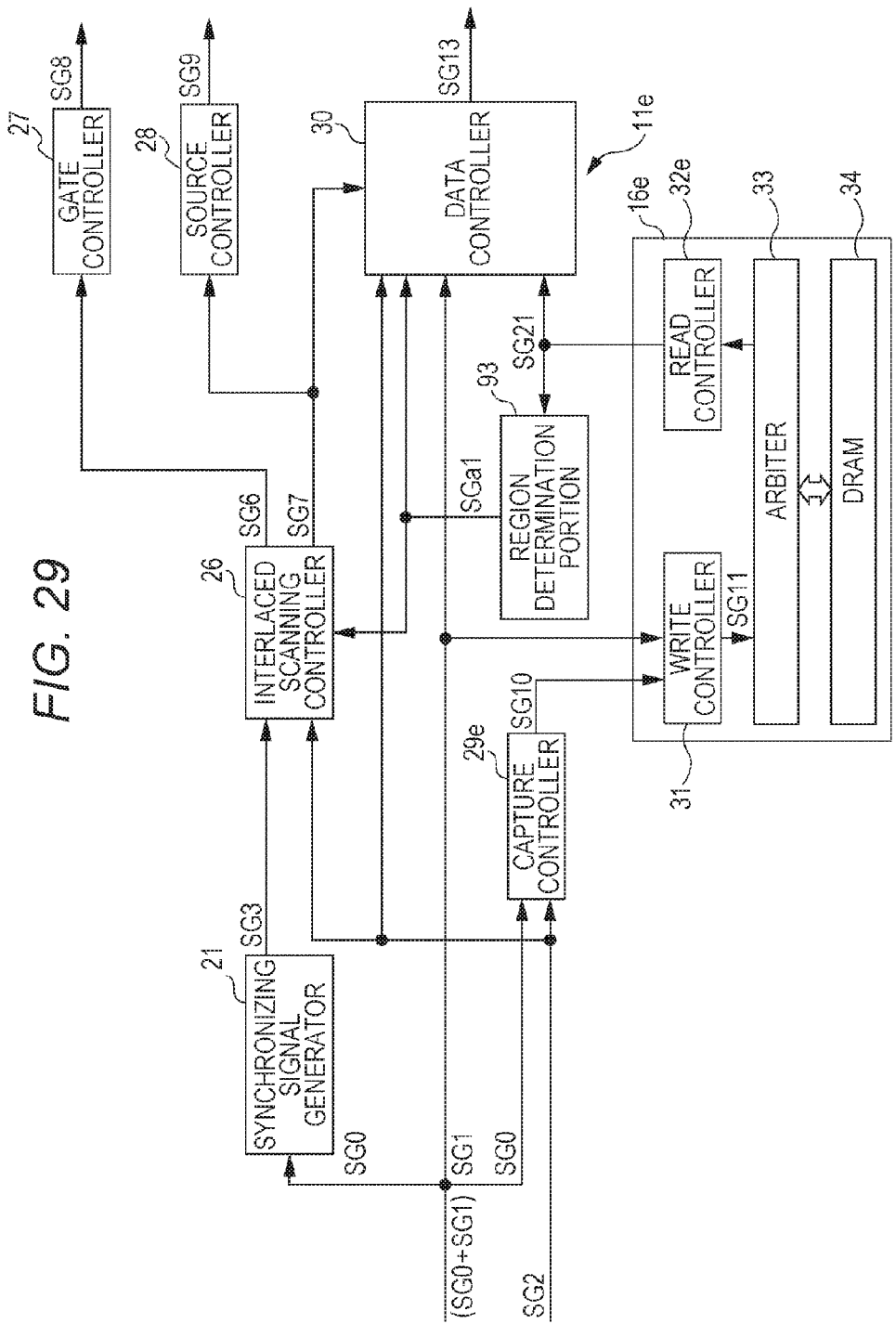
FIG. 29 is a block diagram showing a configuration of a display device according to the sixth embodiment shown in FIG. 28.
Figure 30:
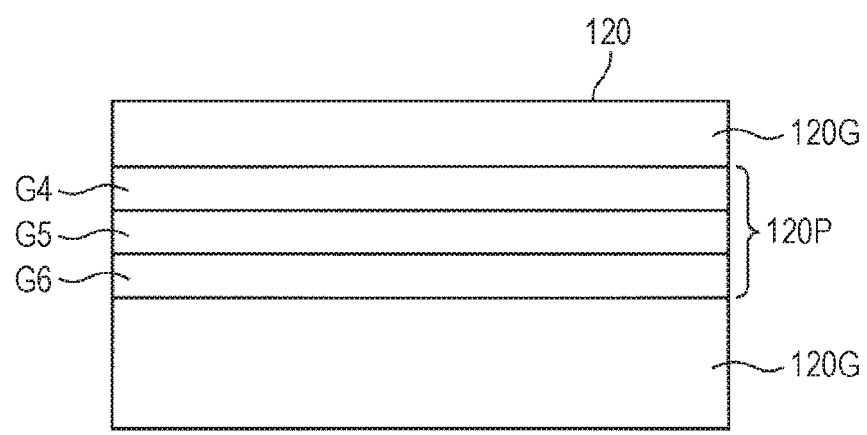
FIG. 30 is a configuration schematically showing a mixing image of an image region in which a gap in gray scales is small and another image region in which a gap in gray scale is large displayed in a display portion of the liquid crystal display panel shown in FIG. 28.

FIG. 28 is a block diagram showing a configuration of a display device according to the sixth embodiment. FIG. 29 is a block diagram showing a configuration of a controller and an image memory portion of a display device according to a sixth embodiment shown in FIG. 28. FIG. 30 is a configuration schematically showing a mixing image of an image region in which a gap in gray scales is small and another image region in which a gap in gray scale is large displayed in a display portion of the liquid crystal display panel shown in FIG. 28.

In the sixth embodiment, similar components as in the first embodiment are denoted by similar reference numerals. Similarly to the first embodiment, the frame frequency F1 in the basic control mode in the sixth embodiment is expressed by F1=60 Hz and the frame frequency F2 in the low frequency control mode is expressed by F2=20 Hz. Hereinafter, the sixth embodiment will be described focusing on differences from the first embodiment.

Figure 26A:
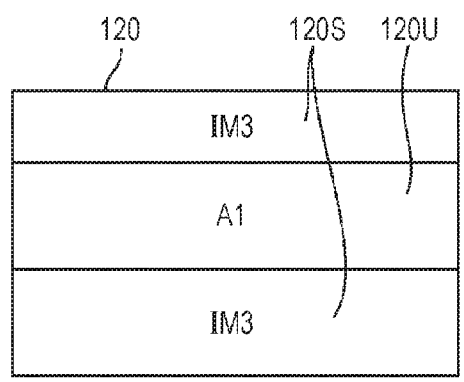
FIGS. 26 A~D are configurations schematically showing states of image in the display portion of the liquid crystal display panel in cases of operations shown in FIG. 25.
Figure 26B:
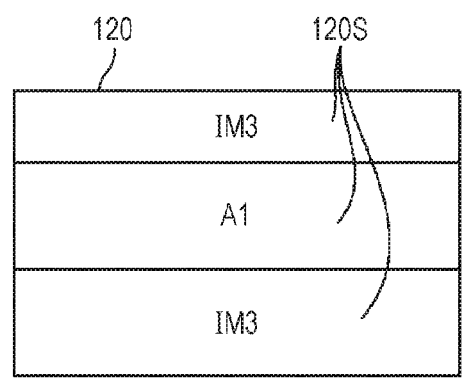
Figure 26C:
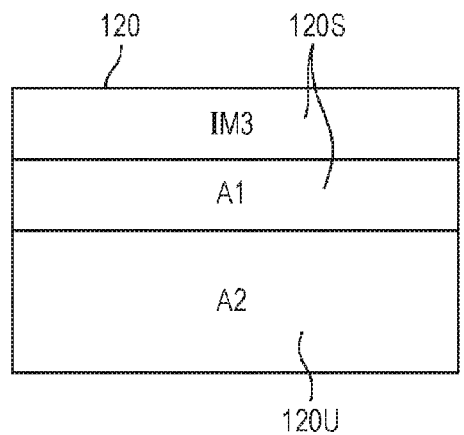
Figure 26D:
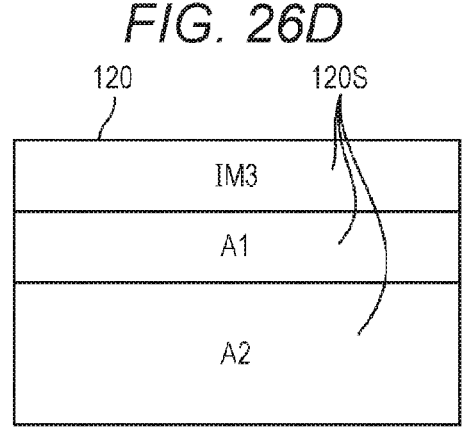

In the low frequency control mode MD2, as shown in FIGS. 4 and 5, the gate signal lines G4 to G6 corresponding to the moving picture region 120M are progressively scanned. In the low frequency control mode MD2, in the above fifth embodiment, for example, as shown in FIGS. 26A to 26 D and FIG. 27, the gate signal lines G6 to G13 corresponding to the updated region 120U are progressively scanned. On the other hand, in this sixth embodiment, gate signal lines in a part of region are progressively scanned, even if the region is a still picture region.

As shown in FIG. 28, the display device 1e according to the sixth embodiment includes a controller 11e and an image memory portion 16e respectively in place of the controller 11 and the image memory portion 16 of the display device 1 according to the first embodiment. In different from the above first embodiment, the regional signal SGa is not input to the controller 11e according to the sixth embodiment.

Referring to FIG. 29, the controller 11e includes the synchronizing signal generator 21, the interlaced scanning controller 26, the gate controller 27, a source controller 28, the capture controller 29e, a data controller 30 and region determination portion 93. The image memory portion 16e includes the write controller 31, the read controller 32a, the arbiter 33, and the DRAM 34.

When the standby mode signal SG2 is turned on, the capture controller 29e generates an area signal SG10 corresponding to input whole image signal SG1. The capture controller 29e outputs the generated area signal SG10 to the write controller 31. The interlaced scanning controller 26 does not output the data enable signal SG7 to the read controller 32e in the different from the first embodiment.

As a result, the read controller 32e outputs an image signal SG21 corresponding to the gate signal lines to the data controller 30 and the region determination portion 93. In other words, the read controller 32e outputs the image signal SG1 representing an input still picture, that is, image signal SG11 stored in DRAM34, to the data controller 30 and the region determination portion 93 directly as image signal SG21.

The region determination portion 93 determines an image region in which difference in gray scale is small or an image region in which difference in gray scale is large based on a signal level of each pixel signal included in image signal SG21 which is input from the read controller 32e. The region determination portion 93 outputs the generated regional signal SGa1 to the interlaced scanning controller 26 and the data controller 30. The interlaced scanning controller 26 and the data controller 30 are the same as the first embodiment, except that the regional signal SGa1 is operated in place of the regional signal SGa.

FIG. 30 shows a state of a still picture mixed by an image region 120G showing an image in which a gap in gray scale is small and an image region 120P showing an image in which a gap in gray scale is large. In the case of FIG. 30, the region determination portion 93 generates the regional signal SGa1 which is turned on corresponding to the image region 120P on the display portion 120 of the liquid crystal display panel 12.

In the sixth embodiment, as shown in FIG. 30, the image region 120P corresponds to the gate signal lines G4 to G6. The gate signal lines G4 and G6 represent an image representing white lines, for example. The gate signal line G5 represents an image representing a black line, for example. In this embodiment, the image region 120P corresponds to one example of the specific region.

When gate signal lines corresponding to an image region 120P in which a difference in gray scale is large are subjected to interlaced scanning, line flicker can be noticed and image qualities are deteriorated. Thus, as the same as FIG. 6 in the first embodiment, in the sixth embodiment, the controller 11e causes gate drive circuit 13 to progressively scan gate signal lines G4 to G6. Therefore, according to the sixth embodiment, it can prevent image qualities from deteriorating in the image region 120P whose difference in gray scale is large.

In the above sixth embodiment, the gate signal lines G4 and G6 represent an image of white lines, for example, and the gate signal line G5 represents an image of a black line, for example. Alternatively, the image region 120P may be a region corresponding to gate signal lines of which a difference in signal level of image signal is more than a threshold with compared to adjacent gate signal lines. The threshold may be determined to be 50% of maximums in signal level, for example. In other words, when a pixel signal is expressed in 8 bits, the threshold may be determined to be "128", for example.

Other Embodiments

Although in above fourth, fifth and sixth embodiments, the same data controller 30 is provided as the first embodiment, the same controller 30a as the first embodiment can be provided in place of the data controller 30. In this case, similarly to the second embodiment, the output enable signal SG6 which is input to the gate controller 27 may be output from data controller 30a in place of the interlaced scanning controller 26. In addition, a source controller 28a is provided in place of the source controller 28, and the interlaced scanning controller 26 may output the data enable signal SG7 to the data controller 30a, and the data controller 30a may output data enable signal SG70 to the source controller 28a.

Similarly, in the above fourth, fifth and sixth embodiments, the same data controller 30b as third embodiment may be provided in place of the data controller 30. In this case, similarly to the third embodiment, a source drive circuit 14b and source controller 28b may be provided in place of the source drive circuit 14, and source controller 28, respectively.

In the first to sixth embodiments, the frame frequency F2 in the low frequency control mode MD2 is expressed by F2=20 Hz. Alternatively, the frame frequency F2 may take a different value. For example, the frame frequency F2 may be expressed by F2=15 Hz. In this case, K=F1/F2=4. Therefore, it is possible to display an image for one frame at the frame frequency F2 of 15 Hz by performing interlaced scanning every four gate signal lines and repeating the generation of sub-frame images four times.

In addition, when a frame frequency F2 of the low frequency control mode is expressed by F2=15 Hz, K is expressed by K=F1/F2=4. Thus, in the second embodiment, the data delay control portion 61 may include four delay circuits, and the data delay portion 62 may include three line memory 62. In general, in the second embodiment, the data delay control portion 61 may provide K pieces of delay circuits, and the data delay portion 62 may provide (K−1) pieces of line memory.

And in case when the frame frequency F2 in the low frequency control mode MD2 is expressed by F2=15 Hz, as described in the second embodiment, the relation between an delay value DL1 by which the image signal SG13 input to the source drive circuit 14 in synchronization with the latch timing signal SG9 is delayed to output to the gate signal lines in synchronization with the succeeding latch timing signal SG9 (that is, a interval of the latch timing signals SG9 output from the source controller 28a to the source drive circuit 14) and an delay value DL2 by which the image signal SG23 output from the selector 45 is delay (that is, the delay value of the image signal SG13 which is output from the selector 45 to the source drive circuit 14) may be expressed by DL1+DL2=4. In general, in the second embodiment, it is satisfied by DL1+DL2=K.

In each of the above embodiments, the column inversion drive mode is employed as the drive mode of pixel electrodes. Alternatively, a line inversion drive mode or a dot inversion drive mode may be employed.

In the above second embodiment, as shown in FIGS. 5, 11 to 13, the controller 11a seems to make a line interval of scanning for the gate signal lines variable among every one line, every two line and every three lines of gate signal lines, between the vertical synchronizing signal Vsync and the succeeding vertical synchronizing signal Vsync (that is, vertical scanning period). In this way, when the regional signal SGa in the low frequency control mode MD2 is turned off, scanning for the gate signal lines every three gate signal lines continues. In addition, depending on the on-area of the regional signal SGa, scanning for the gate signal lines every three and one or two gate signal lines will be mixed, when the regional signal SGa is turned on. For example, in FIGS. 11 and 13, scanning for the gate signal lines every three gate signal lines and every one gate signal line are mixed. For example, in FIG. 12, scanning for the gate signal lines every three, one and two gate signal lines are mixed.

In this way, a progressive scanning and an interlaced scanning for the gate signal lines will be mixed by line interval of the scanning for the gate signal lines being made changeable from every one to every K lines of the gate signal lines. Therefore, depending on image signal, a progressive scanning and an interlaced scanning for the gate signal lines can be operated properly. As a result, it is possible to prevent qualities of displaying image from deteriorating excessively, and it can achieve reduction in power consumption.

The aforementioned embodiments mainly include the display devices having the following features.

In one general aspect, the instant application describes a display device including a display portion including source signal lines, gate signal lines, and pixel electrodes, each pixel electrode being connected to one of the source signal lines and one of the gate signal lines. The display portion is configured to display a frame image in a frame frequency for every vertical synchronizing signal. The frame image is represented by image signals corresponding to pixel electrodes. The display device includes source driver being configured to apply voltages to the pixel electrodes corresponding to the image signals via the source signal lines, a gate driver configured to scan the gate signal lines by outputting a gate signal to each of the gate signal lines, and a controller configured to control the source driver and the gate driver based on a control mode for displaying the frame image on the display portion. The control mode includes a basic control mode and a low frequency control mode. In the basic control mode, the frame frequency is determined to be a first frame frequency F1, and in the low frequency control mode, the frame frequency is determined to be a second frame frequency F2 (F2<F1). The controller is configured to control the gate driver such that a horizontal scanning period (H) is constant regardless of the control mode being the basic control mode or the low frequency control mode. In the basic control mode, the controller is configured to display the frame image on the display portion by causing the gate driver to progressively scan the gate signal lines. In the low frequency control mode, the controller is configured to determine whether a regional signal is on in a specific region corresponding to specific gate signal lines in a frame image. When it is determined that the regional signal is off, the controller is configured to display a sub-frame image on the display portion by causing the gate driver to perform interlaced scanning of the gate signal lines every K lines in the first frame frequency F1. The K is an integer expressed by F1/F2, and the controller is configured to display the frame image constituted by K sub-frame images on the display portion by repeating display of the sub-frame image for K times. When it is determined that the regional signal is on, the controller is configured to cause the gate driver to progressively scan the specific gate signal lines every time the sub-frame image is displayed.

According to such a configuration, in the basic control mode, the frame frequency is determined to be a first frame frequency F1, and in the low frequency control mode, the frame frequency is determined to be a second frame frequency F2. The controller is configured to control the gate driver such that a horizontal scanning period (H) is constant regardless of the control mode being the basic control mode or the low frequency control mode. Thus, reduction of power consumption can be achieved in the low frequency control mode as compared to the basic control mode. In the basic control mode, the controller is configured to display the frame image on the display portion by causing the gate driver to progressively scan the gate signal lines. In the low frequency control mode, the controller is configured to determine whether a regional signal is on in a specific region corresponding to specific gate signal lines in a frame image. When the regional signal is determined to be off, the controller is configured to display a sub-frame image on the display portion by causing the gate driver to perform interlaced scanning of gate signal lines every K lines in the first frame frequency F1 and to display the frame image constituted by K sub-frame images on the display portion by repeating display of the sub-frame image for K times. When the regional signal is determined to be on, the controller is configured to cause the gate driver to progressively scan the specific gate signal lines every time the sub-frame image is displayed.

Therefore, even in the low frequency control mode, the controller is configured to cause the gate driver to progressively scan in the specific region of the frame image every time the sub-frame image is displayed. Thereby, quality of image display in the specific region of the frame image is the same as that in the basic control mode. And, in the low frequency mode, in a region other than the specific region, where the regional signal is off, the gate signal lines are performed interlaced scanning of every K lines in the first frame frequency F1. Thereby, it can achieve much reduction of power consumption.

The above general aspect may include one or more of the following features. A gate signal line that is to be scanned by the gate driver is defined to be a scan target signal line. The controller may be configured to input the image signals to the source driver, and input the gate start signal to the gate driver after a predetermined delay time from rising of a vertical synchronizing signal such that corresponding image signal is input to the scan target signal line that is being selected, and input the image signals to the source driver by delaying the image signals by a time period C*H, where C is an integer expressed by 0≤C≤(K−1), the gate signal instructs the gate driver to start scanning the gate signal lines.

According to such a configuration, the controller may be configured to input the gate start signal to the gate driver. The gate start signal instructs the gate driver to start scanning the gate signal lines. The controller may be configured to input the image signals to the source driver. The controller may be configured to input the gate start signal to the gate driver after a predetermined delay time from rising of a vertical synchronizing signal such that the corresponding image signal is input to the scan target signal line that is being selected, and input the image signals to the source driver by delaying the image signals by a time period C*H, where C is an integer expressed by 0≤C≤(K−1). Thereby, the corresponding image signal is input to proper signal line.

In the low frequency control mode, the controller may be configured to delay timing for inputting the gate start signal to the gate driver at least by a time period (K−1)*H as compared to the basic control mode, and control the source driver such that one of the image signals first input to the source driver after the vertical synchronizing signal is output from the source driver when a time period K*H passes from the input.

According to such a configuration, in the low frequency control mode, the controller may be configured to delay timing for inputting the gate start signal to the gate driver at least by a time period (K−1)*H as compared to the basic control mode. And the controller may control the source driver such that one of the image signals first input to the source driver after the vertical synchronizing signal is output from the source driver when a time period K*H passes from the input. Thereby, the first image signals after the vertical synchronizing signal can be input to proper corresponding gate signal line.

The controller may be configured to repeatedly input a latch timing signal to the source driver, the latch timing signal being for controlling operational timing of the source driver, and input the image signals in synchronization with the input of the latch timing signal. The source driver may be configured to output voltages based on the input image signals via the source signal line in synchronization with a next input of the latch timing signal. In the low frequency control mode, when the scan target signal line that is being selected is an L-th line from a previous scan target signal line, the controller may be configured to input, to the source driver, one of the image signals corresponding to the scan target signal line that is being selected by delaying the image signal by a time period (K−L)*H, where L is an integer that is not less than 1 and not greater than K.

According to such a configuration, the controller may be configured to repeatedly input a latch timing signal to the source driver, the latch timing signal being for controlling operational timing of the source driver, and input the image signals in synchronization with the input of the latch timing signal. The source driver may be configured to output voltages based on the input image signals via the source signal line in synchronization with a next input of the latch timing signal. In the low frequency control mode, when a scan target signal line that is being selected is an L-th line from a previous scan target signal line, the controller may be configured to input, to the source driver, one of the image signals corresponding to the scan target signal line that is being selected by delaying the image signal by a time period (K−L)*H.

Thus, L=1 is established in the specific region of frame image, because gate signal lines are progressively scanned. Thereby, in a case of K=3, for example, an image signal corresponding to the scan target signal line that is being selected is input to the source driver by delaying by a time period 2H. L=K is established in a region other than the specific region of frame image, because gate signal lines are subjected to interlaced scanning every K gate signal lines. Thereby, an image signal corresponding to the scan target signal line that is being selected is input to the source driver without delaying. It can result in that an image signal corresponding to the scan target signal The controller may be configured to repeatedly input a latch timing signal to the source driver, the latch timing signal being for controlling operational timing of the source driver, and input the image signals in synchronization with the input of the latch timing signal. The source driver may be configured to output voltages based on the image signals that have been input in synchronization with the input of the latch timing signal, via the source signal line in synchronization with a next input of the latch timing signal.

In the low frequency control mode, the controller may be configured to change an interval between latch timing signals to be input to the source driver within a range of (1 to K)*H according to an interval between lines of the scanning for outputting the gate signal to the gate signal lines. A relation of I(J)=O(J)+P is established when an interval between a J-th latch timing signal and a (J+1)-th latch timing signal from the vertical synchronizing signal is P*H, where J is an integer that is not less than 2 and P is an integer that is not less than 1 and not greater than K. I(J) is a number of a gate signal line, counted in a sub scanning direction, corresponding to the image signal input to the source driver in synchronization with the J-th latch timing signal, and O(J) is a number of a gate signal line, counted in the sub scanning direction, corresponding to the voltage output from the source driver in synchronization with the J-th latch timing signal.

According to such a configuration, the controller may be configured to repeatedly input a latch timing signal to the source driver, the latch timing signal being for controlling operational timing of the source driver, and input the image signals in synchronization with the input of the latch timing signal. The source driver may be configured to output voltages based on the image signals that have been input in synchronization with the input of the latch timing signal, via the source signal line in synchronization with a next input of the latch timing signal. In the low frequency control mode, the controller may be configured to change an interval between latch timing signals to be input to the source driver within a range of (1 to K)*H according to an interval between scanned gate signal lines.

A relation of I(J)=+P is established when an interval between a J-th latch timing signal and a (J+1)-th latch timing signal from the vertical synchronizing signal is P*H, where J is an integer that is not less than 2 and P is an integer that is not less than 1 and not greater than K.

Thereby, because in the low frequency mode, the gate signal lines in the specific region of frame image are scanned progressively, a relation of I(J)=O(J)+1 is established. And when the gate signal lines are scanned progressively, P=1 is established, because it is necessary for the latch timing signal to be output every the horizontal synchronizing signal Hsync. Thus, the relation of I(J)=O(J)+P is established.

And, because in the low frequency mode, in a region other than the specific region of the frame region, the gate signal lines are subjected to interlaced scanning every K gate signal lines, the relation of I(J)=O(J)+K is established. And when the gate signal lines are subjected to interlaced scanning every K gate signal lines, P=K is established, because it is necessary for the latch timing signal to be output every K times horizontal synchronizing signal period, K*H. Thus, the relation of I(J)=O(J)+P is established.

The display portion may include N adjacent gate signal lines as the gate signal lines, where N is an integer not less than 2K, the controller may be configured to repeatedly input a latch timing signal to the source driver, the latch timing signal being for controlling operational timing of the source driver, and input the image signals in synchronization with the input of the latch timing signal. The source driver may be configured to output voltages based on the input image signals via the source signal line in synchronization with a next input of the latch timing signal. In the low frequency control mode, when the gate driver first scans a U-th gate signal line and then a (U+V)-th gate signal line out of the N gate signal lines, the controller may be configured to cause a voltage output from the source driver in response to the scanning of the U-th gate signal line to be continuously output for a time period V*H from the source driver. U is an integer that is not less than 1 and is less than N, and V is an integer that is not less than 1 and is not greater than K.

According to such a configuration, the controller may be configured to repeatedly input a latch timing signal to the source driver, the latch timing signal being for controlling operational timing of the source driver, and input the image signals in synchronization with the input of the latch timing signal. The source driver may be configured to output voltages based on the input image signals via the source signal line in synchronization with a next input of the latch timing signal. In the low frequency control mode, when the gate driver first scans a U-th gate signal line and then a (U+V)-th gate signal line out of the N gate signal lines, the controller may be configured to cause a voltage output from the source driver in response to the scanning of the U-th gate signal line to be continuously output for a time period V*H from the source driver. Thus, while the gate signal lines are not scanned for (V−1) times horizontal synchronizing signal period, (V−1)*H, a voltage output from the source drivers is not changed. Thereby, it is possible to prevent power consumption from increasing.

In the low frequency control mode, the controller may be configured to cause the gate driver to scan a gate signal line corresponding to a region other than the specific region and being arranged adjacent to the specific region for W times out of K times of displaying sub-frame images. W is an integer that is not less than 2 and is less than K.

According to such a configuration, in the low frequency control mode, the controller may be configured to cause the gate driver to scan a gate signal line corresponding to a region other than the specific region and being arranged adjacent to the specific region for W (W is an integer that is not less than 2 and is less than K) times out of K times of displaying sub-frame images. On the other hand, in the low frequency mode, in the specific region of frame image, gate signal lines are scanned every time the sub-frame image is displayed, because the gate driver is configured to scan the gate signal lines progressively every time the sub-frame image is displayed. And in the low frequency mode, in a region other than the specific region of frame image, gate signal lines are subjected to interlaced scanning every time one sub-frame image is displayed out of K sub-frames displayed, because the gate driver is configured to perform interlaced scanning of the gate signal lines every K lines.

Thus, between a gate signal line scanned when one sub-frame is displayed among K sub-frames displayed and another gate signal line scanned every time a sub-frame is displayed, a middle gate signal line which is scanned when W sub-frames are displayed among K sub-frames is formed. A clear gap in luminescence is suppressed to be noticed in a boundary between the specific region and the region other than the specific region in compared to a case where the middle gate signal line is not formed.

In the low frequency control mode, during a horizontal scanning period corresponding to the gate signal line that is not scanned by the gate driver, the controller may be configured to cause a voltage output from the source driver in a horizontal scanning period corresponding to the gate signal line scanned immediately previously by the gate driver to be continuously output from the source driver.

According to such a configuration, in the low frequency control mode, during a horizontal scanning period corresponding to the gate signal line that is not scanned by the gate driver, the controller may be configured to cause a voltage output from the source driver in a horizontal scanning period corresponding to the gate signal line scanned immediately previously by the gate driver to be continuously output from the source driver. Thereby, during horizontal synchronizing signal period when the gate signal lines are not scanned, a voltage output from the source driver is not changed. Thus, it is possible to prevent power consumption from increasing.

The controller may include an interlaced scanning controller generating data enable signals indicating the gate signal lines scanned by the gate driver in the low frequency mode, a data delay controller generating K data enable signals by delaying the data enable signal by 1K~K*H, respectively and a data delay portion having a memory region storing (K−1) line data which includes image signal for one line of gate signal line delayed by 1H~(K−1)*H, respectively. In the low frequency control mode, the controller may be configured to output to the source driver, the image signal selected among the image signals for one line of gate signal line and the (K−1) line data depending on the data enable signal and the K data enable signal during a horizontal scanning period corresponding to the gate signal line indicated by the data enable signal.

According to such a configuration, in the low frequency control mode, the controller may be configured to output to the source driver, the image signal selected among the image signals for one line of gate signal line and the (K−1) line data depending on the data enable signal and the K data enable signal during a horizontal scanning period corresponding to the gate signal line indicated by the data enable signal. Thereby, proper image signals can be output to the source driver, even when the gate signal lines are subjected to mixing operation of interlaced scanning and progressively scanned.

The specific region which turns on the regional signal may be a region corresponding to a moving element displayed in the frame image.

According to such a configuration, the specific region which turns on the regional signal may be a region corresponding to the moving element displayed in the frame image. When the gate signal lines corresponding to the moving element are subjected to interlaced scanning, a quality of image is deteriorated excessively. But, according to the above configuration, the gate signal lines corresponding to the moving element are progressively scanned. As a result, a quality of image can be prevented from deteriorating excessively.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein. The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A display device comprising:
 a display portion including a plurality of source signal lines, a plurality of gate signal lines, and a plurality of pixel electrodes, each pixel electrode being connected to one of the plurality of source signal lines and one of the plurality of gate signal lines, the display portion being configured to display a frame image in a frame frequency for every vertical synchronizing signal, the frame image being represented by image signals corresponding to pixel electrodes;
 a source driver configured to apply voltages to pixel electrodes corresponding to the image signals via the plurality of source signal lines;
 a gate driver configured to scan the plurality of gate signal lines by outputting a gate signal to each of the plurality of gate signal lines; and
 a controller configured to control the source driver and the gate driver based on a control mode for displaying the frame image on the display portion, the control mode including a basic control mode and a low frequency control mode, in the basic control mode the frame frequency being determined to be a first frame frequency F1, and the low frequency control mode the frame frequency being determined to be a second frame frequency F2 (F2<F1), wherein:
 the controller is configured to control the gate driver such that a horizontal scanning period (H) is constant regardless of the control mode being the basic control mode or the low frequency control mode,
 in the basic control mode, the controller is configured to display the frame image on the display portion by causing the gate driver to progressively scan the plurality of gate signal lines,
 in the low frequency control mode, the controller is configured to determine whether a regional signal is on in a specific region corresponding to specific gate signal lines in a frame image,
 when it is determined that the regional signal is off, the controller is configured to display a sub-frame image on the display portion by causing the gate driver to perform interlaced scanning of the plurality of gate signal lines every K lines in the first frame frequency F1, where K is an integer expressed by F1/F2, and the controller is configured to display the frame image constituted by K sub-frame images on the display portion by repeating display of the sub-frame image for K times,
 when it is determined that the regional signal is on, the controller is configured to cause the gate driver to progressively scan the specific gate signal lines every time the sub-frame image is displayed.

2. The display device according to claim 1, wherein
 a gate signal line that is to be scanned by the gate driver is defined to be a scan target signal line, and
 the controller is configured to:
  input the image signals to the source driver, and
  input the gate start signal to the gate driver after a predetermined delay time from rising of a vertical synchronizing signal such that the corresponding image signal is input to the scan target signal line that is being selected, and input the image signals to the source driver by delaying the image signals by a time period C*H, where C is an integer expressed by 0≤C≤(K−1), the gate signal instructs the gate driver to start scanning the plurality of gate signal lines.

3. The display device according to claim 2, wherein
 in the low frequency control mode, the controller is configured to:
 delay timing for inputting the gate start signal to the gate driver at least by a time period (K−1)*H as compared to the basic control mode, and
 control the source driver such that one of the image signals first input to the source driver after the vertical synchronizing signal is output from the source driver when a time period K*H passes from the input.

4. The display device according to claim 3, wherein
 the controller is configured to repeatedly input a latch timing signal to the source driver, the latch timing signal being for controlling operational timing of the source driver, and input the image signals in synchronization with the input of the latch timing signal,
 the source driver is configured to output voltages based on the input image signals via the source signal line in synchronization with a next input of the latch timing signal,
 in the low frequency control mode, when a scan target signal line that is being selected is an L-th line from a previous scan target signal line, the controller is configured to input, to the source driver, one of the image signals corresponding to the scan target signal line that is being selected by delaying the image signal by a time period (K−L)*H, where L is an integer that is not less than 1 and not greater than K.

5. The display device according to claim 1, wherein
 the controller is configured to repeatedly input a latch timing signal to the source driver, the latch timing signal being for controlling operational timing of the source driver, and input the image signals in synchronization with the input of the latch timing signal,
 the source driver is configured to output voltages based on the image signals that have been input in synchronization with the input of the latch timing signal, via the source signal line in synchronization with a next input of the latch timing signal,
 in the low frequency control mode, the controller is configured to change an interval between latch timing signals to be input to the source driver within a range of (1 to K)*H according to an interval between lines of the scanning for outputting the gate signal to the gate signal lines, and
 a relation of I(J)=O(J)+P is established when an interval between a J-th latch timing signal and a (J+1)-th latch timing signal from the vertical synchronizing signal is P*H, where J is an integer that is not less than 2 and P is an integer that is not less than 1 and not greater than K,
 where, I(J) is a number of a gate signal line, counted in a sub scanning direction, corresponding to the image signal input to the source driver in synchronization with the J-th latch timing signal, and O(J) is a number of a gate signal line, counted in the sub scanning direction, corresponding to the voltage output from the source driver in synchronization with the J-th latch timing signal.

6. The display device according to claim 1, wherein
the display portion includes N adjacent gate signal lines as the plurality of gate signal lines, where N is an integer not less than 2K,
the controller is configured to repeatedly input a latch timing signal to the source driver, the latch timing signal being for controlling operational timing of the source driver, and input the image signals in synchronization with the input of the latch timing signal,
the source driver is configured to output voltages based on the input image signals via the source signal line in synchronization with a next input of the latch timing signal,
in the low frequency control mode, when the gate driver first scans a U-th gate signal line and then a (U+V)-th gate signal line out of the N gate signal lines, the controller is configured to cause a voltage output from the source driver in response to the scanning of the U-th gate signal line to be continuously output for a time period V*H from the source driver, where:

U is an integer that is not less than 1 and is less than N, and
V is an integer that is not less than 1 and is not greater than K.

7. The display device according to claim 6, wherein
in the low frequency control mode, during a horizontal scanning period corresponding to the gate signal line that is not scanned by the gate driver, the controller is configured to cause a voltage output from the source driver in a horizontal scanning period corresponding to the gate signal line scanned immediately previously by the gate driver to be continuously output from the source driver.

8. The display device according to claim 1, wherein
in the low frequency control mode, the controller is configured to cause the gate driver to scan a gate signal line corresponding to a region other than the specific region and being arranged adjacent to the specific region for W times out of K times of displaying sub-frame images, where:

W is an integer that is not less than 2 and is less than K.

9. The display device according to claim 1, wherein
the controller includes:
an interlaced scanning controller generating data enable signals indicating the plurality of gate signal lines scanned by the gate driver in the low frequency mode,
a data delay controller generating K data enable signals by delaying the data enable signal by 1K~K*H, respectively, and
a data delay portion having a memory region storing (K−1) line data which includes image signal for one line of gate signal line delayed by 1H~(K−1)*H, respectively, wherein
in the low frequency control mode, the controller is configured to output to the source driver, the image signal selected among the image signals for one line of gate signal line and the (K−1) line data depending on the data enable signal and the K data enable signal during a horizontal scanning period corresponding to the gate signal line indicated by the data enable signal.

10. The display device according to claim 1, wherein
the specific region which turns on the regional signal is a region corresponding to a moving element including the frame image.

\* \* \* \* \*